US012785505B2

(12) United States Patent
Ganzermiller et al.

(10) Patent No.: US 12,785,505 B2
(45) Date of Patent: Nov. 3, 2026

(54) POWER TOOL WITH COMPACT MOTOR AND TRANSMISSION ASSEMBLIES

(71) Applicant: Black & Decker Inc., New Britain, CT (US)

(72) Inventors: Austin Ganzermiller, Reisterstown, MD (US); Edward William Mehl, IV, Sykesville, MD (US); Abraham Sanchez, Lutherville, MD (US)

(73) Assignee: Black & Decker Inc., New Britain, CT (US)

( * ) Notice: Subject to any disclaimer, the term of this patent is extended or adjusted under 35 U.S.C. 154(b) by 233 days.

(21) Appl. No.: 18/521,760

(22) Filed: Nov. 28, 2023

(65) Prior Publication Data

US 2024/0204614 A1 Jun. 20, 2024

Related U.S. Application Data

(60) Provisional application No. 63/476,297, filed on Dec. 20, 2022.

(51) Int. Cl.

| | |
|---|---|
| ***H02K 7/14*** | (2006.01) |
| ***B25B 21/02*** | (2006.01) |

(Continued)

(52) U.S. Cl.

CPC ............. *H02K 7/145* (2013.01); *H02K 1/276* (2013.01); *H02K 7/083* (2013.01); *H02K 9/06* (2013.01);

(Continued)

(58) Field of Classification Search

CPC ........ H02K 7/145; H02K 7/116; H02K 7/083; H02K 9/06; H02K 1/276; B25B 23/1475; B25B 21/026; B25F 5/001

See application file for complete search history.

(56) References Cited

U.S. PATENT DOCUMENTS

| | | |
|---|---|---|
| 3,701,911 A | 10/1972 | Lennart |
| 3,805,134 A | 4/1974 | Osamu et al. |

(Continued)

FOREIGN PATENT DOCUMENTS

| | | |
|---|---|---|
| CN | 1575932 A | 2/2005 |
| CN | 100337793 C | 9/2007 |

(Continued)

OTHER PUBLICATIONS

European Search Report for European Patent Application No. 23216279.2, mailed on Nov. 26, 2024, 9 pages.

(Continued)

*Primary Examiner* — Oluseye Iwarere
*Assistant Examiner* — Daniel K Schlak
(74) *Attorney, Agent, or Firm* — Brake Hughes Bellermann LLP

(57) ABSTRACT

A power tool includes a motor assembly coupled to a transmission assembly to drive an output device. The motor assembly includes a stator assembly coupled to a rotor that rotates about a central axis of the power tool, with a plurality of magnets received in magnet pockets defined in the rotor. At least a portion of a motor bearing, and at least a portion of a cam carrier bearing of the transmission mechanism, are received within a motor envelope defined by the motor assembly.

18 Claims, 40 Drawing Sheets

(51) Int. Cl.

| | |
|---|---|
| ***B25B 23/147*** | (2006.01) |
| ***B25F 5/00*** | (2006.01) |
| ***H02K 1/276*** | (2022.01) |
| ***H02K 7/08*** | (2006.01) |
| ***H02K 7/116*** | (2006.01) |
| ***H02K 9/06*** | (2006.01) |

(52) U.S. Cl.
CPC ............. *B25B 21/02* (2013.01); *B25B 21/026* (2013.01); *B25B 23/1475* (2013.01); *B25F 5/001* (2013.01); *H02K 7/116* (2013.01)

(56) References Cited

U.S. PATENT DOCUMENTS 3,829,721 A 8/1974 Rosenthal
3,881,243 A 5/1975 Bannon
4,099,104 A 7/1978 Muller
4,110,644 A 8/1978 Roddy
4,333,026 A 6/1982 Bock et al.
4,429,263 A 1/1984 Mueller
4,438,542 A 3/1984 Schuh
4,482,849 A 11/1984 Doemen et al.
4,535,262 A 8/1985 Newberg
4,535,373 A 8/1985 Schuh
4,547,714 A 10/1985 Rolf
4,682,066 A 7/1987 Abbratozzato et al.
4,791,328 A 12/1988 Lakin
4,793,054 A 12/1988 Abbratozzato et al.
4,908,538 A 3/1990 Geberth, Jr.
5,148,069 A 9/1992 Nonaka et al.
5,402,025 A 3/1995 Saito et al.
5,528,095 A 6/1996 Strobl
5,679,990 A 10/1997 Ushiro
5,730,232 A 3/1998 Mixer
5,731,648 A 3/1998 Gaughan et al.
5,738,177 A 4/1998 Schell et al.
5,783,881 A 7/1998 Best et al.
5,808,390 A 9/1998 Miyazawa et al.
5,898,990 A 5/1999 Henry
6,166,470 A 12/2000 Miyazawa et al.
6,274,957 B1 8/2001 Mahn et al.
6,394,191 B1 5/2002 Nakane
6,411,002 B1 6/2002 Smith et al.
6,457,535 B1 10/2002 Tanaka
6,474,114 B1 11/2002 Ito et al.
6,509,668 B2 1/2003 Berger
6,628,021 B2 9/2003 Shinohara et al.
6,719,067 B2 4/2004 Taga
7,012,346 B2 3/2006 Hoffman et al.
7,048,075 B2 5/2006 Saito et al.
7,080,696 B2 7/2006 Soika et al.
7,131,503 B2 11/2006 Furuta et al.
7,372,181 B2 5/2008 Kinashi et al.
7,455,121 B2 11/2008 Saito et al.
7,562,542 B2 7/2009 Choi
7,588,095 B2 9/2009 Puzio et al.
7,598,636 B2 10/2009 Nakamura
7,723,877 B2 5/2010 Hiwaki et al.
7,768,168 B2 8/2010 Aschoff et al.
7,845,427 B2 12/2010 Wan et al.
7,918,286 B2 4/2011 Nagasaka et al.
8,040,015 B2 10/2011 Zaps
8,049,382 B2 11/2011 Nakagawa et al.
8,069,929 B2 12/2011 Sugimoto et al.
8,169,112 B2 5/2012 Zhang
8,278,803 B2 10/2012 Lin et al.
8,283,841 B2 10/2012 Lin et al.
8,698,363 B2 4/2014 Utsumi et al.
8,760,013 B2 6/2014 Esenwein
9,114,521 B2 8/2015 Yoshikawa
9,308,638 B2 4/2016 Kondo et al.
9,450,472 B2 9/2016 Hatfield et al.
9,616,558 B2 4/2017 Nishikawa et al.
9,643,300 B2 5/2017 Kumagai et al.
9,755,490 B2 9/2017 Lnuzuka
9,868,201 B2 1/2018 Kamiya
9,869,327 B2 1/2018 Kodato et al.
9,948,162 B2 4/2018 Nagahama et al.
RE46,827 E 5/2018 Rudolph et al.
10,056,806 B2 8/2018 Hatfield et al.
10,075,048 B2 9/2018 Jeong et al.
10,093,487 B2 10/2018 Ramezani
10,205,365 B2 2/2019 Beyerl et al.
10,213,907 B2 2/2019 Kumagai et al.
10,213,912 B2 2/2019 Kumagai et al.
10,236,742 B2 3/2019 Smith et al.
10,245,711 B2 4/2019 Nagasaka
10,348,158 B2 7/2019 Niwa et al.
10,385,863 B2 8/2019 Hidaka et al.
10,432,065 B2 10/2019 Beyerl et al.
10,830,320 B2 11/2020 Matsuto et al.
2003/0067228 A1 4/2003 Vanjani
2003/0107273 A1 6/2003 Ikeda et al.
2004/0124727 A1 7/2004 Lau
2004/0211576 A1 10/2004 Milbourne et al.
2005/0067058 A1 3/2005 Fujimori et al.
2006/0010612 A1* 1/2006 Kim ........................ D06F 37/36 68/12.24
2006/0055270 A1 3/2006 Petersen
2006/0261690 A1 11/2006 Petersen
2008/0106159 A1* 5/2008 Yoshida ................. A01G 3/088 310/64
2008/0265695 A1 10/2008 Yoshida
2011/0083869 A1 4/2011 Lin
2011/0152029 A1 6/2011 Rudolph et al.
2011/0187211 A1 8/2011 Matsunaga et al.
2012/0000684 A1* 1/2012 Sugimoto ............... B25B 21/02 173/205
2013/0008680 A1 1/2013 Nagasaka et al.
2013/0048325 A1 2/2013 Kuehne et al.
2013/0052058 A1 2/2013 Motohashi et al.
2013/0205604 A1 8/2013 Esenwein et al.
2013/0207491 A1 8/2013 Hatfield et al.
2013/0270934 A1 10/2013 Smith et al.
2013/0313926 A1 11/2013 Bekavac et al.
2014/0091648 A1* 4/2014 Kumagai ............... H02K 7/145 310/50
2014/0145524 A1 5/2014 Tanimoto et al.
2014/0182869 A1 7/2014 Kumagai et al.
2014/0190717 A1 7/2014 Simpson
2014/0251649 A1 9/2014 Kondo
2014/0251650 A1 9/2014 Kondo
2015/0041169 A1 2/2015 Kumagai et al.
2015/0061441 A1 3/2015 Figgins et al.
2015/0303777 A1 10/2015 Osborne et al.
2016/0149463 A1 5/2016 Smith et al.
2016/0149474 A1 5/2016 Smith et al.
2016/0336838 A1 11/2016 Kouda et al.
2016/0354911 A1 12/2016 Aoki et al.
2016/0380510 A1 12/2016 Niwa et al.
2017/0144278 A1 5/2017 Nishikawa et al.
2017/0214292 A1 7/2017 Nagahama
2017/0259412 A1 9/2017 Nishikawa et al.
2017/0288499 A1 10/2017 Beyerl et al.
2017/0294819 A1 10/2017 Crosby et al.
2017/0317548 A1 11/2017 Suzuki et al.
2017/0326720 A1 11/2017 Kuroyanagi et al.
2018/0015602 A1 1/2018 Machida
2018/0152062 A1 5/2018 Chang et al.
2018/0222022 A1 8/2018 Kumagai et al.
2019/0074751 A1 3/2019 Chen
2019/0118352 A1 4/2019 Weber et al.
2019/0134800 A1 5/2019 Kumagai et al.
2019/0140516 A1 5/2019 Beyerl et al.
2019/0143491 A1 5/2019 Kumagai et al.
2019/0157929 A1 5/2019 Cho et al.
2019/0160636 A1 5/2019 Hirabayashi et al.
2019/0173349 A1 6/2019 Smith et al.
2019/0255687 A1 8/2019 Schneider et al.
2019/0260245 A1 8/2019 Leroy-Somer
2019/0262978 A1 8/2019 Tejima et al.
2019/0273421 A1 9/2019 Velderman et al.
2019/0280560 A1 9/2019 Niwa et al.
2020/0215678 A1* 7/2020 Nakashima ............. B25F 5/006

(56) References Cited

U.S. PATENT DOCUMENTS

| | | | | |
|---|---|---|---|---|
| 2020/0217412 | A1* | 7/2020 | Nakashima | F16H 57/082 |
| 2021/0016428 | A1* | 1/2021 | Nakashima | B25F 5/02 |
| 2021/0138624 | A1* | 5/2021 | Kamiya | B25B 21/026 |
| 2021/0187707 | A1* | 6/2021 | Smith | B25B 21/02 |
| 2021/0194319 | A1 | 6/2021 | Smith et al. | |
| 2021/0194320 | A1 | 6/2021 | Smith et al. | |
| 2021/0277983 | A1* | 9/2021 | Matsuto | H02K 7/06 |
| 2021/0283762 | A1* | 9/2021 | Kusumoto | H02K 7/145 |
| 2021/0301977 | A1* | 9/2021 | Seko | H02K 5/10 |
| 2022/0060084 | A1* | 2/2022 | Kishida | F16D 3/02 |
| 2022/0118589 | A1* | 4/2022 | Takahagi | B25B 21/026 |
| 2022/0145783 | A1* | 5/2022 | Ishikawa | F01L 1/022 |
| 2022/0393534 | A1* | 12/2022 | Lu | H02K 1/30 |
| 2023/0179062 | A1* | 6/2023 | Kraft | H02K 7/083<br>310/68 B |
| 2023/0191567 | A1 | 6/2023 | Opsitos, Jr. et al. | |
| 2023/0234193 | A1 | 7/2023 | Xu et al. | |
| 2023/0256580 | A1* | 8/2023 | Yang | B25B 21/02<br>173/93 |
| 2023/0415309 | A1* | 12/2023 | Kawai | B25B 21/002 |
| 2024/0033893 | A1* | 2/2024 | Kuehne | B25F 5/001 |
| 2024/0039348 | A1* | 2/2024 | Holmqvist | H02K 7/085 |
| 2024/0157521 | A1* | 5/2024 | Hattori | B25B 21/02 |
| 2024/0316732 | A1* | 9/2024 | Marten | B25B 21/026 |
| 2024/0367502 | A1* | 11/2024 | Cai | H02K 5/1732 |

FOREIGN PATENT DOCUMENTS

| | | | | |
|---|---|---|---|---|
| CN | 104205584 | A | 12/2014 | |
| CN | 207588668 | U | 7/2018 | |
| CN | 108462350 | A | 8/2018 | |
| DE | 102017211778 | A1 * | 1/2018 | B25B 21/02 |
| DE | 102019218437 | A1 | 6/2021 | |
| EP | 1690637 | A1 | 8/2006 | |
| EP | 1912315 | A2 | 4/2008 | |
| EP | 3035508 | A2 | 6/2016 | |
| EP | 3229350 | A1 | 10/2017 | |
| EP | 2251148 | B1 | 11/2017 | |
| EP | 3163718 | B1 | 9/2018 | |
| EP | 3534504 | A1 | 9/2019 | |
| EP | 3845342 | A1 | 7/2021 | |
| GB | 2418544 | B | 8/2006 | |
| JP | H0775295 | A | 3/1995 | |
| JP | 2005045917 | A | 2/2005 | |
| JP | 2007330030 | A | 12/2007 | |
| JP | 2008267519 | A | 11/2008 | |
| JP | 2012189015 | A | 10/2012 | |
| JP | 2013017391 | A | 1/2013 | |
| JP | 2016151290 | A | 8/2016 | |
| KR | 20090048630 | A | 5/2009 | |
| KR | 20160110157 | A | 9/2016 | |
| KR | 101830159 | B1 | 2/2018 | |
| WO | 1999019942 | A1 | 4/1999 | |
| WO | 2009019942 | A1 | 2/2009 | |
| WO | 2014048453 | A1 | 4/2014 | |
| WO | 2015150702 | A2 | 10/2015 | |
| WO | 2015150702 | A3 | 10/2015 | |
| WO | 2017173075 | A1 | 10/2017 | |

OTHER PUBLICATIONS

EP EESR dated Jun. 14, 2021 in corresponding EP application No. 20215172.6.

EP EESR dated Jun. 15, 2021 in corresponding EP application No. 20215177.5.

EP EESR dated Jun. 8, 2021 in corresponding EP application No. 20215174.2.

European Partial Search Report for EP Application No. 23216279.2 dated Sep. 5, 2024, 11 pages.

* cited by examiner

POWER TOOL WITH COMPACT MOTOR AND TRANSMISSION ASSEMBLIES

CROSS-REFERENCE TO RELATED APPLICATION

This application claims priority to U.S. Provisional Application No. 63/476,297, filed on Dec. 20, 2022, entitled "POWER TOOL WITH COMPACT MOTOR AND TRANSMISSION ASSEMBLIES," the disclosure of which is incorporated herein in its entirety.

TECHNICAL FIELD

This disclosure relates to a power tool, and in particular to a power tool having a compact motor assembly.

BACKGROUND

Power tools such as impact drivers, impact wrenches and the like may be used for driving threaded fasteners into workpieces. In some situations, these types of power tools may lack sufficient power to drive a threaded fastener into a workpiece, or may be too large in length and/or girth to fit into a desired location. In such power tools, it is desirable to reduce the girth and/or the length of the tool, including the motor assembly and related components, without sacrificing power and/or performance of the power.

SUMMARY

In one general aspect, a power tool includes a housing having a rear end portion and a front end portion opposite the rear end portion, the front end portion corresponding to a working end of the power tool; and a motor assembly received in the housing. The motor assembly may include a rotor configured to rotate about a central axis of the power tool; a stator assembly operably coupled to the rotor, and magnets received in magnet pockets defined in the rotor. The power tool may also include a rotor shaft extending along the central axis, the rotor shaft being coupled to the rotor so as to be driven by the rotor; a transmission assembly coupled to the rotor shaft and configured to transmit a torque generated by the motor assembly to an output spindle; a first bearing configured to support the rotor shaft; and a second bearing configured to support a component of the transmission assembly. At least a portion of the second bearing may be radially aligned with at least a portion of the first bearing.

In some implementations, the first bearing and the second bearing are at least partially received within a motor envelope defined by a first plane corresponding to a rearmost portion of the motor assembly and a second plane corresponding to a frontmost portion of the motor assembly In some implementations, the first bearing includes an inner race positioned on the rotor shaft such that the inner race of the first bearing rotates together with the rotor shaft at a first speed; and an outer race supported on a first side surface of a cam carrier plate of the transmission assembly such that the outer race of the first bearing rotates together with the cam carrier plate at a second speed that is less than the first speed and the second bearing includes an inner race positioned on a second side surface of the cam carrier plate, opposite the first side surface thereof, such that the inner race of the second bearing rotates together with cam carrier plate at the second speed; and an outer race supported on radial projection of a ring gear mount coupled to the housing, such that the outer race of the second bearing is substantially stationary.

In some implementations, the power tool includes a third bearing coupled to an end portion of the rotor shaft, opposite an end portion of the rotor shaft to which the first bearing is coupled, and configured to support the rotor shaft, wherein the third bearing is received in a bearing pocket defined in a corresponding portion of the housing; and a fan coupled to the rotor shaft, positioned axially between the third bearing and the motor assembly.

In some implementations, the first bearing is mounted on the rotor shaft, positioned axially between the motor assembly and a cam carrier of the transmission assembly, such that an axial position of the first bearing is constrained by the cam carrier.

In another general aspect, a power tool includes a housing having a rear end portion and a front end portion opposite the rear end portion, the front end portion corresponding to a working end of the power tool; and a motor assembly received in the housing. The motor assembly may include a rotor having a rear end portion and a front end portion configured to rotate about a central axis of the power tool; a stator assembly operably coupled to the rotor, and magnets received in magnet pockets defined in the rotor. The power tool may also include a rotor shaft extending along the central axis, the rotor shaft being coupled to the rotor so as to be driven by the rotor, a transmission assembly coupled to the rotor and configured to transmit a force generated by the motor assembly to an output spindle, the transmission assembly including a carrier, a gear carried by the carrier, and an output member coupled for rotation with the carrier and extending toward the front end portion; a first bearing configured to support the front end portion of the rotor shaft, the first bearing in a bearing pocket defined in a cam shaft at least partially axially forward of the gear carried by the carrier, and a second bearing configured to support the carrier, the second bearing being received between the carrier and the housing, such that the second bearing is such that the second bearing is located between the motor assembly and the first bearing along the central axis and positioned axially rearward of the first bearing.

In some implementations, the power tool also includes a pinion having a proximal end portion coupled to the rotor shaft, and a distal end portion positioned in a bearing pocket defined in a cam shaft of a cam carrier of the transmission assembly.

In some implementations, the second bearing is radially aligned with end windings of the stator assembly, and is at least partially received within a motor envelope defined by a first plane corresponding to a rearmost portion of the motor assembly and a second plane corresponding to a frontmost portion of the motor assembly.

In some implementations, the second bearing is positioned axially rearward of a gear assembly of the transmission assembly.

In some implementations, the first bearing includes an inner race positioned on the distal end portion of the rotor shaft such that the inner race of the first bearing rotates together with the rotor shaft, via the pinion, at a first speed; and an outer race supported on an inner wall of the bearing pocket defined in the cam shaft such that the outer race of the first bearing rotates together with the carrier at a second speed that is less than the first speed, and the second bearing includes an inner race positioned on a rear plate portion of the cam carrier such that the inner race of the second bearing rotates at the second speed together with cam carrier; and an outer race supported on radial projection of a ring gear mount, such that the outer race of the second bearing is substantially stationary.

In some implementations, the power tool includes a third bearing coupled to a proximal end portion of the rotor shaft and configured to support the rotor shaft, wherein the third bearing is received in a bearing pocket defined in a corresponding portion of the housing; and a fan coupled to the rotor shaft, positioned axially between the third bearing and the motor assembly.

In another general aspect, a power tool includes a housing having a rear end portion and a front end portion opposite the rear end portion, the front end portion corresponding to a working end of the power tool; and a motor assembly received in the housing, the motor assembly including a rotor configured to rotate about a central axis of the power tool; a stator assembly operably coupled to the rotor, and magnets received in magnet pockets defined in the rotor. The power tool may also include a rotor shaft extending along the central axis, the rotor shaft being coupled to the rotor so as to be driven by the rotor; a transmission assembly, including a cam carrier, coupled to the rotor shaft and configured to transmit a force generated by the motor assembly to an output spindle, and an annular rearward projection coaxial with the central axis; a fan coupled to a front axial end of the rotor, a first bearing mounted on the annular rearward projection within a first bearing pocket and configured to support the fan; and a second bearing mounted on the annular rearward projection within a second bearing pocket and configured to support the cam carrier, the second bearing pocket being positioned axially forward of the first bearing pocket.

In some implementations, a central hub portion of the fan is radially aligned with stator end windings of the stator assembly.

In some implementations, at least the first bearing pocket and first bearing mounted therein are at least partially received within a motor envelope defined by a first plane corresponding to a rearmost portion of the motor assembly and a second plane corresponding to a frontmost portion of the motor assembly.

In some implementations, the second bearing pocket is axially aligned with the first bearing pocket.

In some implementations, the first bearing pocket is defined by a central hub portion of the fan and a rear plate portion of the cam carrier, such that the first bearing is radially aligned with the central hub portion of the fan and stator end windings of the stator assembly; and the second bearing pocket is defined by a radial portion of a ring gear mount coupled to the housing and a rear plate portion of the cam carrier, such that the second bearing is radially aligned with blades of the fan.

In some implementations, the first bearing includes an inner race positioned on a rear plate portion of the cam carrier such that the inner race of the first bearing rotates at a first speed together with the cam carrier, and an outer race supported on an inner wall of a central hub portion of the fan such that the outer race of the first bearing rotates at a second speed together with the fan, and the second bearing includes an inner race positioned on the rear plate portion of the cam carrier such that the inner race of the second bearing rotates together with cam carrier at the first speed; and an outer race supported on radial projection of a ring gear mount fixed to the housing, such that the outer race of the second bearing is substantially stationary.

In some implementations, the power tool includes a pinion that mounts the fan on the rotor shaft, wherein the pinion mounting of the fan on the rotor shaft supports an axial position of the first bearing relative to the rotor.

In some implementations, the power tool includes a third bearing coupled to a rear end portion of the rotor shaft, such that the rotor is positioned between the third bearing and the fan, wherein the third bearing is received in a bearing pocket defined in a corresponding portion of the housing.

In some implementations, the first bearing pocket and the first bearing received therein are radially aligned with a central hub portion of the fan and stator end windings of the stator assembly; and the second bearing pocket and the second bearing received therein are radially aligned with blades of the fan.

In some implementations, a central hub portion of the fan has a stepped configuration; and a ring gear mount positioned axially forward from the central hub portion of the fan and coupled to the housing has a stepped configuration corresponding to the stepped configuration of the central hub portion.

In some implementations, the first bearing pocket is defined by a first stepped portion of the ring gear mount corresponding to a first stepped portion of the central hub portion of the fan; and the second bearing pocket is defined by a second stepped portion of the ring gear mount corresponding to a second stepped portion of the central hub portion of the fan.

In some implementations, the first bearing includes an inner race positioned on a pinion mounted on the rotor shaft such that the inner race of the first bearing rotates at a first speed together with the rotor shaft via the pinion; and an outer race supported on the first stepped portion of the ring gear mount such that the outer race of the first bearing is substantially stationary, and the second bearing includes an inner race positioned on a rear plate portion of the cam carrier such that the inner race of the second bearing rotates at a second speed together with the cam carrier, and an outer race supported on the second stepped portion of the ring gear mount such that the outer race of the second bearing is substantially stationary.

In another general aspect, a power tool includes a housing having a rear end portion and a front end portion opposite the rear end portion, the front end portion corresponding to a working end of the power tool; and a motor assembly received in the housing, the motor assembly including a rotor configured to rotate about a central axis of the power tool; and a stator assembly operably coupled to the rotor; and a plurality of magnets respectively received in a plurality of magnet pockets axially arranged in the rotor. The power tool may also include a transmission assembly coupled to the motor assembly and configured to transmit a force generated by the motor assembly to an output spindle; a drive pin extending between the transmission assembly and the rotor so as to transmit a rotational force from the rotor to the transmission assembly; a fan mounted to a rear portion of the rotor via an interlocking device configured to rotational fix the fan to the rotor; a first bearing mounted in a first bearing pocket and configured to support the drive pin; and a second bearing mounted in a second bearing pocket and configured to support a cam carrier of the transmission assembly.

In some implementations, the drive pin includes a gear portion in meshed engagement with planet gears of the transmission assembly; and a shaft portion configured to be fitted in a central opening in the rotor such that the drive pin rotates together with the rotor.

In some implementations, the first bearing includes an inner race positioned on the shaft portion of the drive pin such that the inner race of the first bearing rotates at a first speed together with the drive pin and the rotor, and an outer race supported on a first side surface of a rear plate portion of the cam carrier such that the outer race of the first bearing rotates at a second speed together with the cam carrier, and the second bearing includes an inner race positioned on a second side surface of the rear plate portion of the cam carrier such that the inner race of the second bearing rotates at the second speed together with cam carrier, and an outer race supported on a radial portion of a ring gear mount fixed to the housing such that the outer race of the second bearing is substantially stationary.

In some implementations, the second bearing is radially aligned with the first bearing, and wherein the first bearing and the second bearing are at least partially received within a motor envelope defined by a first plane corresponding to a rearmost portion of the motor assembly and a second plane corresponding to a frontmost portion of the motor assembly.

In some implementations, the fan includes a plate portion; a central opening formed in a central portion of the plate portion, wherein the central opening is configured to receive a protruded rear portion of the rotor for mounting the fan on the rotor; a plurality of protrusions formed on a portion of a first side of the plate portion, at positions respectively corresponding to axial end portions of the plurality of magnet pockets formed in the rotor, and a plurality of blades arranged radially on the first side of the plate portion.

In some implementations, the plurality of protrusions are configured to be received in axial end portions of the plurality of magnet pockets to interlock a position of the fan relative to the rotor.

In some implementations, a contour of each protrusion of the plurality of protrusions corresponds to a contour of a respective axial end portion of a magnet pocket of the plurality of magnet pockets in which it is received so as to restrict rotation of the fan relative to the rotor.

In some implementations, an axial length of the plurality of magnet pockets is greater than an axial length of the plurality of magnets, and wherein the plurality of protrusions are received in axial end portions of the plurality of magnet pockets not occupied by the plurality of magnets.

In some implementations, a contour of each protrusion of the plurality of protrusions corresponds to a respective corner portion of the axial end portion of a magnet pocket of the plurality of magnet pockets in which it is received so as to restrict rotation of the fan relative to the rotor.

In some implementations, the power tool includes a recessed area formed in a second side of the plate portion; and a third bearing mounted on the protruded rear portion of the rotor and configured to support the rotor, between the recessed area of the plate portion and a bearing pocket defined in a corresponding portion of the housing, wherein the third bearing axially constrains a position of the fan.

In another general aspect, a power tool includes a housing having a rear end portion and a front end portion opposite the rear end portion, the front end portion corresponding to a working end of the power tool; a motor assembly received in the housing, the motor assembly including a stator and a rotor shaft configured to rotate about a central axis relative to the stator, the rotor shaft having a rear end portion and a front end portion; a transmission assembly including an input gear rotatably driven by the rotor shaft and an output shaft that is rotatably driven upon rotation of the input gear; a rotary impact mechanism including a hammer received over the output shaft, and an anvil configured to be driven continuously or by rotational impacts by the hammer; an output spindle coupled to a tool holder and rotatably driven by the anvil; a first bearing configured to support the rotor shaft; and a second bearing received in a pocket inside the anvil and configured to support a front end portion of the output shaft that is received in the pocket, wherein the second bearing is the sole bearing that rotatably supports the transmission assembly.

In some implementations, the first bearing is the sole bearing the supports the rotor shaft.

In some implementations, the transmission assembly further includes a carrier coupled to the output shaft and at least one planet gear supported by a pin coupled to the carrier, the planet gear meshing with the input gear.

In some implementations, the power tool includes a rolling disc disposed between the rotor shaft and a stationary component.

In some implementations, the stationary component is a ring gear of the transmission assembly that is meshed with the at least one planet gear.

In some implementations, the stationary component is a portion of the housing.

In some implementations, the stationary component is a ring gear mount configured to support a stationary ring gear of the transmission assembly.

In some implementations, the rolling disc is supported by the pin that supports the at least one planet gear.

The details of one or more implementations are set forth in the accompanying drawings and the description below. Other features will be apparent from the description and drawings, and from the claims.

DETAILED DESCRIPTION

Example implementations will now be described more fully with reference to the accompanying drawings. It is to be understood that both the foregoing general description and the following detailed description are provided for purposes of discussion and illustration only, and are intended to provide an explanation of various implementations of the present teachings.

Figure 1A:
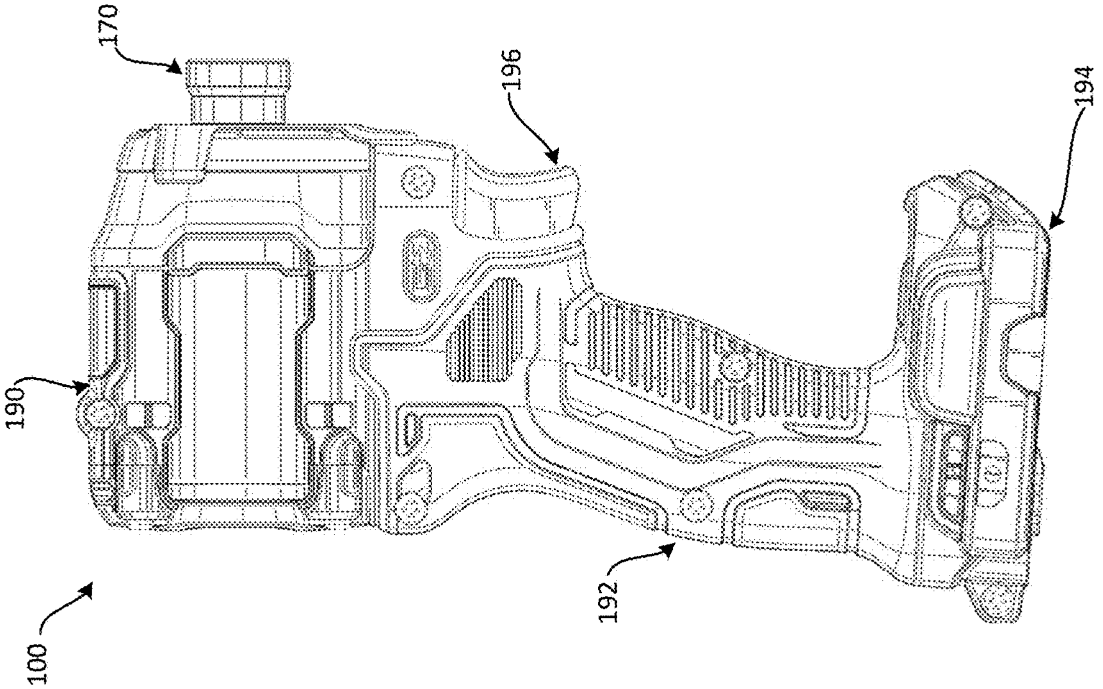
FIG. 1A is a side view of an example power tool.
Figure 1B:
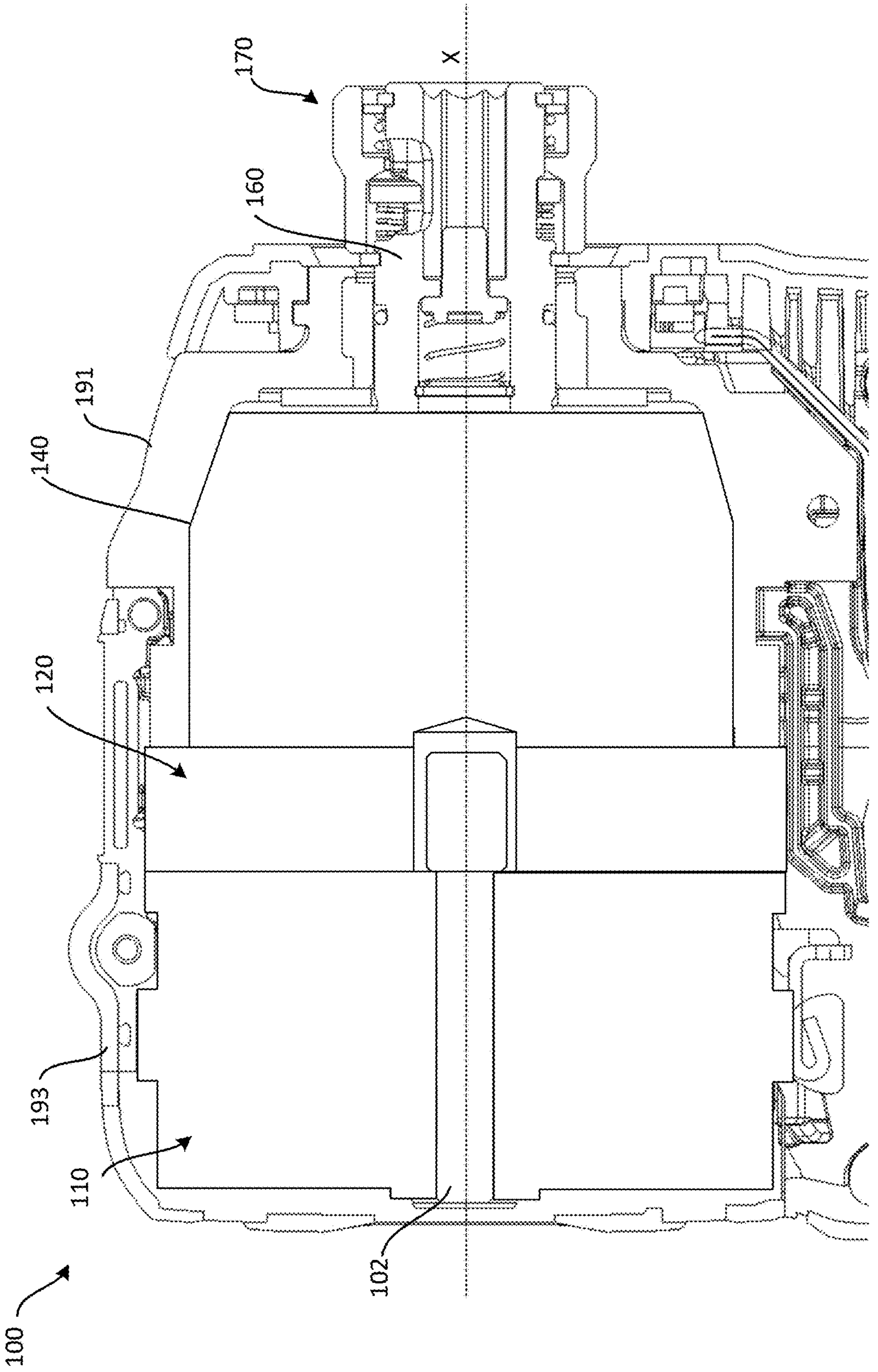
FIG. 1B is a schematic partial cross-sectional view of the example power tool shown in FIG. 1A.
Figure 1C:
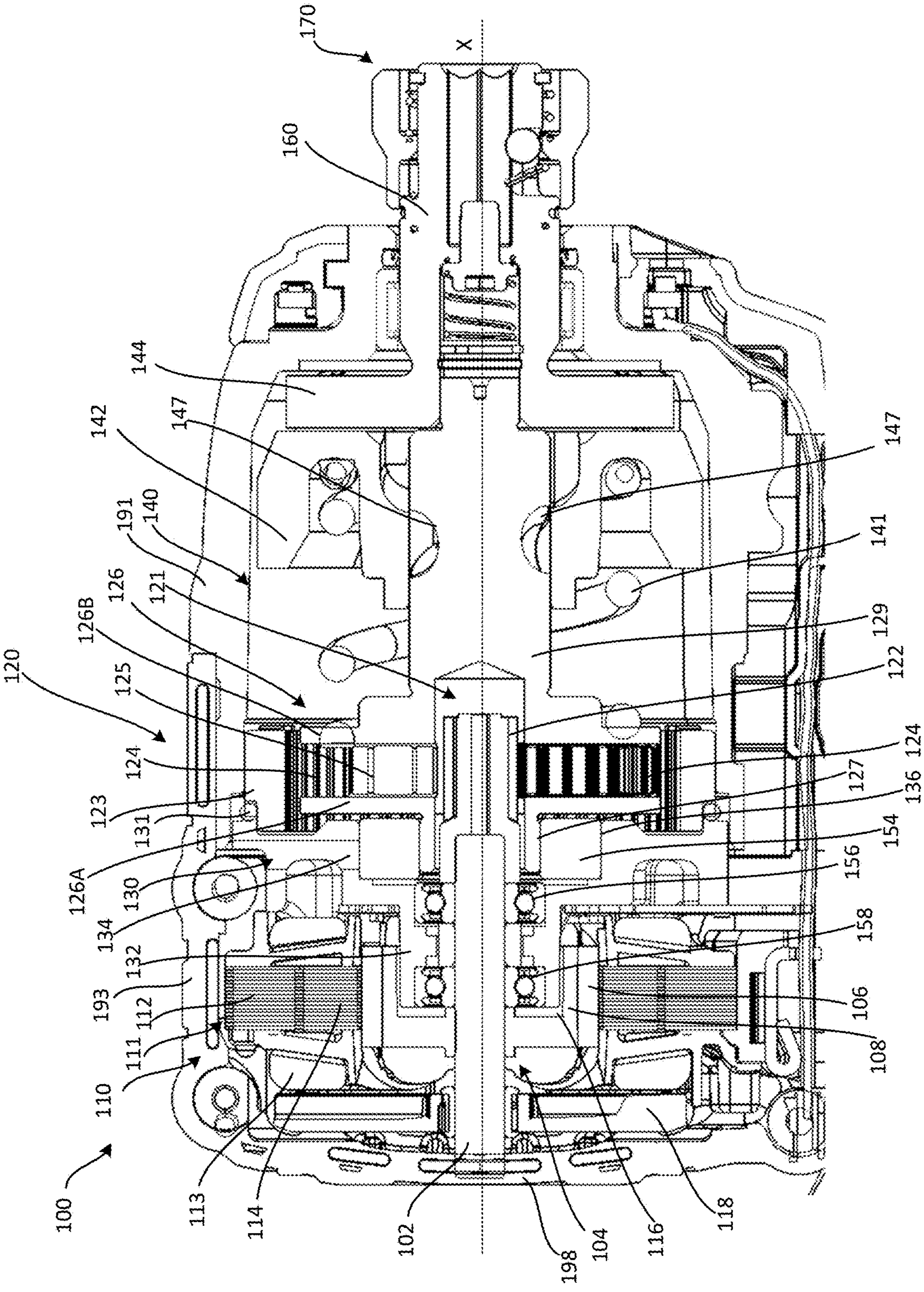
FIG. 1C is a partial cross-sectional view of the example power tool shown in FIG. 1A.
Figure 1D:
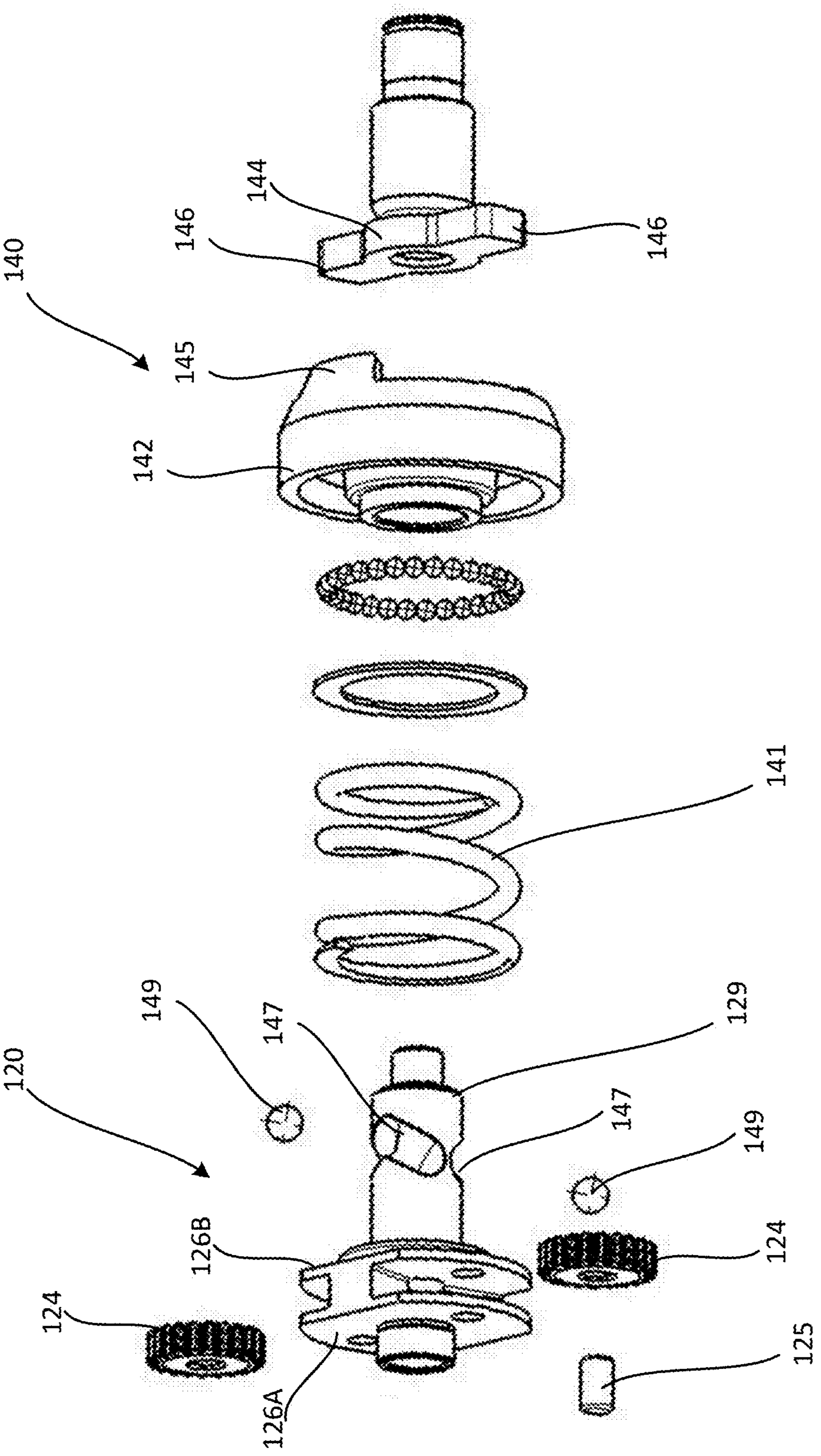
FIG. 1D is an exploded perspective view of an example hammer mechanism of the example power tool shown in FIGS. 1A-1C.

FIG. 1A is a side view of an example power tool 100, in the form of an example impact tool. FIG. 1B is a partial cross-sectional schematic view of the example power tool 100 shown in FIG. 1A. FIG. 1C is a partial cross-sectional view of the example power tool 100 shown in FIG. 1A. FIG. 1D is an exploded view of an example transmission assembly and an example impact mechanism 140 of the example power tool 100 shown in FIG. 1A.

In the example shown in FIGS. 1A and 1B, the example power tool 100 includes a housing 190 having a motor housing portion 193 and a transmission housing portion 191 coupled to the motor housing portion 193. The motor housing portion 193 includes two clamshells that come together to house a motor assembly 110 that rotatably drives a rotor shaft 102. The transmission housing portion 191 houses a transmission assembly 120 and an impact mechanism 140 that together selectively impart a rotary motion and/or a rotary impact motion to an output spindle 160. Example implementations described herein include an impact mechanism 140, simply for purposes of discussion and illustration. The principles described herein may be applied to rotary power driven tools that do not include an impact mechanism. For example, in some implementations, the power tool may be a drill that does not include an impact mechanism, such that the power tool imparts only rotary motion to the output spindle, or may be a hammer drill and may include an axially oriented impact mechanism so that rotary motion and axial impacts are transmitted to the output spindle. A tool holder 170 is coupled to the output spindle 160. The tool holder 170 is configured to retain an accessory tool (e.g., a drill bit, a screw driving bit, a socket wrench, and other such accessory tools, not shown). Further details regarding example tool holders are set forth in U.S. patent application Ser. No. 12/394,426, the disclosure of which is incorporated herein by reference in its entirety. In alternative implementations, the tool holder may comprise a keyed or keyless chuck or a collet.

The example power tool 100 includes a handle 192 that extends transverse to the housing 190. The handle 192 may accommodate a trigger 196, a control and/or power module (not shown) that includes control electronics and switching components for driving the motor assembly 110, and a battery receptacle 194 that receives a removeable power tool battery pack for supplying electric power to the motor assembly 110. The handle 192 has a proximal portion coupled to the housing 190 and a distal portion coupled to the battery receptacle 194. The motor assembly 110 may be powered by an electrical power source, such as a DC power source or battery (not shown), that is coupled to the battery receptacle 194, or by an AC power source. In some examples, the trigger 196 is coupled at a portion of the handle 192 adjacent the housing 190. The trigger 196 connects the electrical power source to the motor assembly 110 via the control and/or power module, which controls power delivery to the motor assembly 110. The rotor shaft 102 rotates in response to power supplied to the motor assembly 110. Rotation of the rotor shaft 102 generates a rotational force that is transmitted to an accessory tool coupled to the example power tool by the tool holder 170, via the transmission assembly 120 and the output spindle 160, to perform an operation on a workpiece.

As shown in FIGS. 1C and 1D, in some examples, the transmission assembly 120 may be a planetary transmission including, among other features, a pinion or sun gear 122 that is coupled to an end of the rotor shaft 102 of the motor assembly 110, and that extends along a tool axis X into a cavity 121 formed in the cam shaft 129 of the carrier 126 and defining a bearing pocket for the front motor bearing within the cam shaft 129. One or more planet gears 124 are positioned surrounding the sun gear 122. Teeth on an outer circumferential surface of the one or more planet gears 124 mesh with the teeth on an outer circumferential surface of the sun gear 122. An outer ring gear 123 is rotationally fixed to the housing 190 and centered on the tool axis X. Teeth formed on an inner circumferential surface of the outer ring gear 123 mesh with the teeth on the planet gears 124.

A carrier 126 (which may be part of a cam carrier) includes a pair of carrier plates, i.e., a first, or rear carrier plate 126A and a second, or front carrier plate 126B, that support the one or more planet gears 124. Each of the planet gears 124 is mounted on a pin 125 extending between the rear carrier plate 126A and the front carrier plate 126B, so that the planet gears 124 can rotate about the pins 125. In other implementations, the carrier 126 may only have a single carrier plate with the pins coupled to the single carrier plate. The carrier 126 includes a rearward projection 127 having an annular body that extends axially rearward from the rear carrier plate 126A along the tool axis X. The carrier may be integrally or non-integrally coupled to a cam shaft 129 that extends axially forward from the front carrier plate 126B along the tool axis X to form the cam carrier. In other implementations the carrier 126 may be integrally or non-integrally coupled directly to the output spindle or may be coupled to other transmission components such as a sun gear for another planetary transmission stage, a clutch, or a spindle lock assembly.

In response to the application of power to the motor assembly 110, the rotor shaft 102 and the sun gear 122 rotate about the axis X. Rotation of the sun gear 122 causes the planet gears 124 to orbit the sun gear 122 about the axis X, which in turn causes the carrier 126 to rotate about the axis X at a reduced speed relative to the rotational speed of the rotor shaft 102. In the example shown in FIGS. 1C and 1D, the transmission assembly 120 includes a single planetary stage, simply for purposes of discussion and illustration. The principles to be described herein can be applied to an arrangement including multiple planetary stages that may provide for multiple speed reductions, and that each stage can be selectively actuated to provide for multiple different output speeds of the carrier 126. In some examples, the transmission assembly 120 may include a different type of gear system such as, for example, a parallel axis transmission, a spur gear transmission, and the like.

In the example arrangement shown in FIGS. 1C and 1D, the impact mechanism 140 includes the cam shaft 129, with a generally cylindrical hammer 142 received over the cam shaft 129. In some examples, the hammer 142 may selectively engage the output spindle 160, based on a position of the hammer 142 on the cam shaft 129. That is, the hammer 142 may be movably coupled on the cam shaft 129. The hammer 142 may include lugs 145 configured to engage corresponding projections 146 extending radially from an anvil 144 fixedly coupled on the output spindle 160. A pair of rear-facing V-shaped cam grooves 147 may be formed on an outer surface of the cam shaft 129. Open end portions of the V-shaped cam grooves 47 may be oriented toward the transmission assembly 120. The hammer 142 may be movably coupled to the cam shaft 129, with relative movement therebetween guided by, for example, balls 149 received in the V-shaped cam grooves 147. In this example, a compression spring 141 is received in a cylindrical recess in the hammer 142, abutting a forward face of the front carrier plate 126B. The spring 141 biases the hammer 142 toward the anvil 144 so that the lugs 145 engage the corresponding projections 146 formed on the anvil 144. An example of an impact mechanism is further described in U.S. Pat. App. Pub. No. 2019/0344411, filed Jul. 26, 2019, which is incorporated by reference.

At low torque levels, the impact mechanism 140 transmits torque from the transmission assembly 120 to the output spindle 160 in a rotary mode of operation of the power tool 100. In the rotary mode, the compression spring 141 maintains the hammer 142 in a forward position so that the lugs 145 continuously engage the projections 146. This causes the cam shaft 129, the hammer 142, the anvil 144, and the output spindle 160 to rotate together as a unit about the axis X. As torque increases, the impact mechanism 140 may transition to transmitting torque to the output spindle 160 in an impact mode. During operation of the example power tool 100 in the impact mode, the hammer 142 moves axially rearward against the force of the spring 141, decoupling the lugs 145 from the projections 146. The anvil 44 continues to spin freely about the axis X, though driven by the motor assembly 110 and the transmission assembly 120, so that the anvil 144 coasts to a slower speed than the hammer 142. The hammer 142 continues to be driven at a higher speed by the motor assembly 110 and transmission assembly 120, while the hammer 142 moves axially rearward relative to the anvil 144 by the movement of the balls 149 in the V-shaped cam grooves 147. When the balls 149 reach a rearmost position in the V-shaped cam grooves 147, the spring 141 drives the hammer 142 axially forward with a rotational speed that exceeds the rotational speed of the anvil 144. This causes the lugs 145 to rotationally strike the projections 146, imparting a rotational impact to the output spindle 160.

In some examples, the motor assembly 110 is a brushless direct-current (BLDC) motor that includes an inner rotor 104 having surface-mount rotor magnets 106 on a rotor core 108, and a stator assembly 111 located around the rotor 104. The stator assembly 111 includes a stator core 112 having a series of teeth 114 projecting radially inward from the stator core 112, and a series of conductive windings 113 wound around the stator teeth 114 to define three phases connected in a wye or a delta configuration. As the phases of the stator assembly 111 are sequentially energized, they interact with the rotor magnets 106 to cause rotation of the rotor 104 relative to the stator assembly 111.

In some examples, the rotor core 108 is mounted on the rotor shaft 102 and includes an annular recess 116 around the rotor shaft 102, on one side of the rotor core 108. In the example shown in FIGS. 1C and 1D, the rotor 104 is provided with what is referred to in this disclosure as an open-core construction, where the rotor magnet 106 is mounted around the core 112 and the annular recess 116 is provided within the core 112 for positioning of one or more of the rotor bearings. The core 112 may be made of a solid core piece of metal or lamination stack that includes a series of parallel laminations. The annular recess 116 may be carved or stamped out of the core 112, or it may be formed using ring-shaped laminations.

Figure 1E:
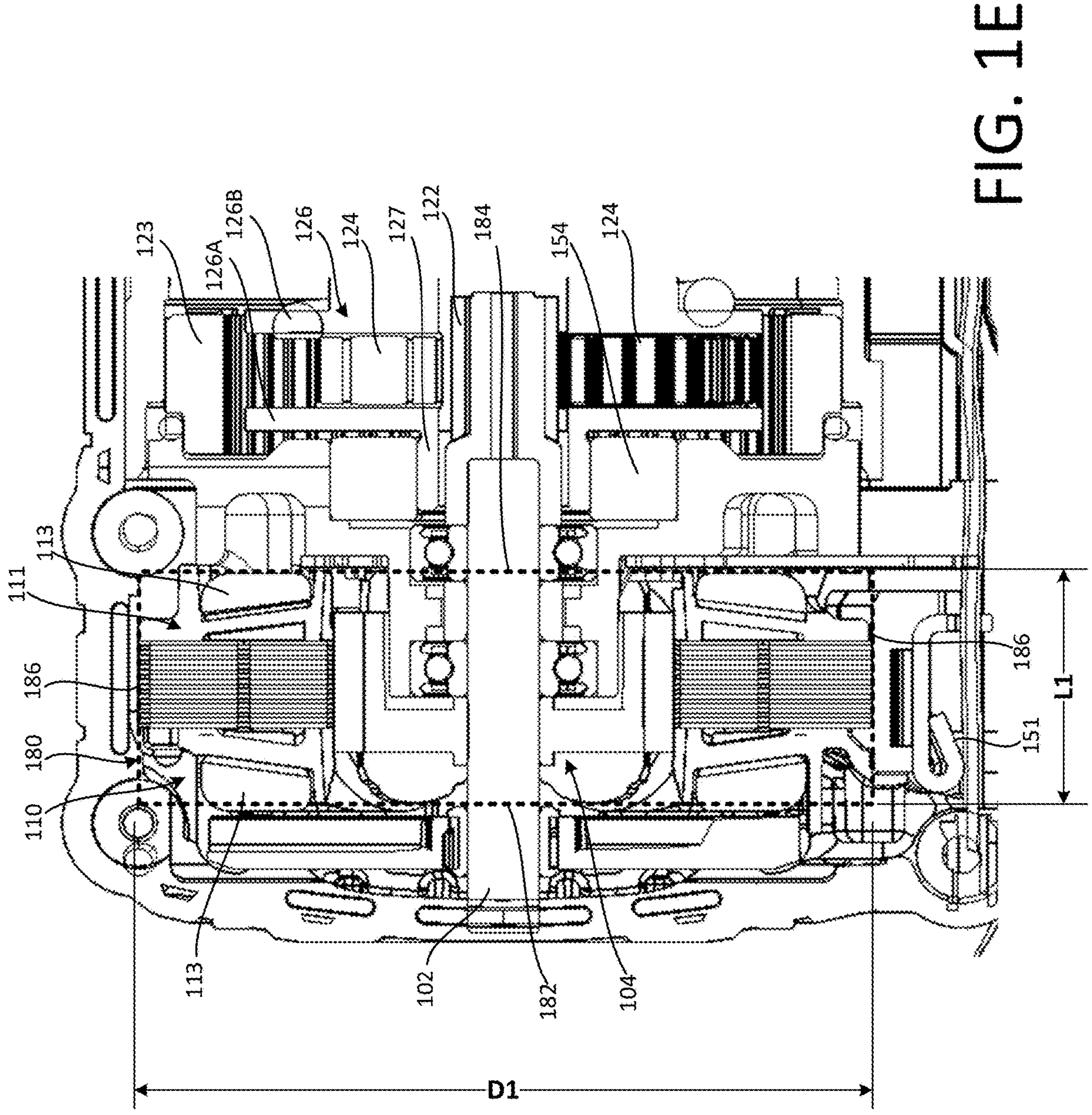
FIG. 1E is a close-in view of an example motor assembly of the example power tool shown in FIGS. 1A-1C.

In the example shown in FIGS. 1C-1E, the rotor magnet 106 has a ring configuration that is surface-mounted on the outer surface of the rotor core 108 and magnetized in a series of poles, e.g., four poles having a S-N-S-N orientation. In some examples, the rotor magnet 106 may be provided as a series of discrete magnet segments that may be pre-magnetized prior to assembly, with the outer surface of the rotor core 108 shaped for retention of the magnet segments. In some examples, the rotor magnets 106 may be fully or partially embedded within the rotor core 108.

In some examples, a fan 118 is mounted on the rotor shaft 102 behind the motor assembly 110. A tool cap 198 may be mounted to the end of the housing 190 to contain the end of the motor assembly 110. The tool cap 198 may be provided integrally with the housing 190 or as a separate piece. In some examples, the fan 118 is positioned between the motor assembly 110 and the tool cap 198. The fan 118 generates airflow through the motor assembly 110 and the transmission assembly 120 to cool the components.

In some examples, a ring gear mount 130 supports a front motor bearing 156 and a rear motor bearing 158 supporting the rotor shaft 102. In the example shown in FIG. 1C, at least the rear motor bearing 158 is located within the stator assembly 111 and within the annular recess 116 defined by the rotor core 108 along the axial direction of the motor assembly 110, such that the rear motor bearing 158 intersects a portion of the rotor core 108 along a radial plane. The ring gear mount 130 includes a cylindrical portion 132 that receives the outer races of the motor bearings 156 and 158 and a radial portion 134 that extends radially from the cylindrical portion 132 and includes radial ends supported by the tool housing 190. The stator assembly 111 is also supported by the tool housing 190, thus being axially and radially secure with respect to the ring gear mount 130. In this manner, the ring gear mount 130 axially and radially supports the rotor 104 within the stator assembly 111. In some examples, the ring gear mount 130 and the stator assembly 111 may be independently supported by the tool housing 190. In some examples, the ring gear mount 130 may be formed integrally as a part of two clamshells that form the tool housing 190. In some examples, the ring gear mount 130 may be piloted to and retained by the stator assembly 111 directly and independently of the tool housing 190.

As shown in FIG. 1C, in some examples, the ring gear mount 130 includes a front lip 131 that supports a component of the transmission assembly 120, such as, for example, the ring gear 123, to inhibit axial and rotational movement of the ring gear 123 relative to the housing 190. In some examples, the ring gear mount 130 supports a cam carrier bearing 154 that supports the carrier 126 relative to the ring gear mount 130, and therefore relative to the motor assembly 110 and the tool housing 190. The cam carrier bearing 154 is nested within the ring gear mount 130 adjacent the motor assembly 110. Specifically, in this example arrangement, the ring gear mount 130 is positioned between the motor assembly 110 and the transmission assembly 120, and provides support for the motor bearings 156 and 158 on one side, and provides support for the cam carrier bearing 154 on the other side. In some examples, the ring gear mount 130 includes a recessed portion 136 having a larger diameter than the radial portion 134, such that the recessed portion 136 is sized to receive the cam carrier bearing 154 therein. The cam carrier bearing 154 is thus located axially forward of the motor assembly 110.

At least a portion of the ring gear mount 130 is received within the stator assembly 111 and within the rotor core 108. In this example, the rear cylindrical projection of the ring gear mount 130 that supports the motor bearings 156 and 158 is at least partially received within the stator assembly 111 and within the rotor core 108. In this example, the nested arrangement of motor bearings 156 and 158 and the ring gear mount 130 provide a compact motor assembly 110 compared to conventionally available brushless motors. Disposition of the motor bearings 156 and 158 and at least a portion of the ring gear mount 130 within the stator assembly 111 and within the rotor core 108 reduces the length of the motor assembly 110, reduces the overall length of the power tool 100, and improves power density.

In some examples, the motor assembly 110 defines a motor envelope 180 bounded by a rear plane 182 at a rearmost portion of the motor assembly 110 (i.e., at the rearmost point of the stator assembly 111), a front plane 184 at a frontmost portion of the motor assembly 110 (i.e., at the frontmost point of the stator assembly 111), and a generally cylindrical boundary 186 extending from the rear plane 182 to the front plane 184 and surrounding a radially outermost portion of the motor assembly 110 (e.g., a radially outermost portion of the stator assembly 111) not including terminal block 151. In the example shown in FIG. 1E, the rear plane 182 is at a rearmost portion of the stator assembly 111 (including the windings 113), the front plane 184 is at a frontmost point of the stator assembly 11 (including the windings 113), and the generally cylindrical boundary 186 surrounds a radially outermost portion of the stator assembly 111. In some examples, the rear plane may be defined at a rearmost point of the rotor 104, if the rotor 104 extends further rearward than the stator assembly 111, the front plane may be defined at a frontmost point of the rotor 104, if the rotor 104 extends further frontward than the stator assembly 111, and the generally cylindrical boundary may defined be at an outermost point of the rotor 104, if the rotor 104 extends further radially outward than the stator assembly 11 (for example, as would be the case in an outer rotor motor). The motor envelope 180 may have a length L1 from the rear plane 182 to the front plane 184. The motor envelope 180 may have a diameter D1 corresponding to the cylindrical boundary 186. In some examples, at least a portion of at least one of the motor bearings 156 and 158 and at least a portion of the ring gear mount 130 are received within the motor envelope 180.

Figure 2A:
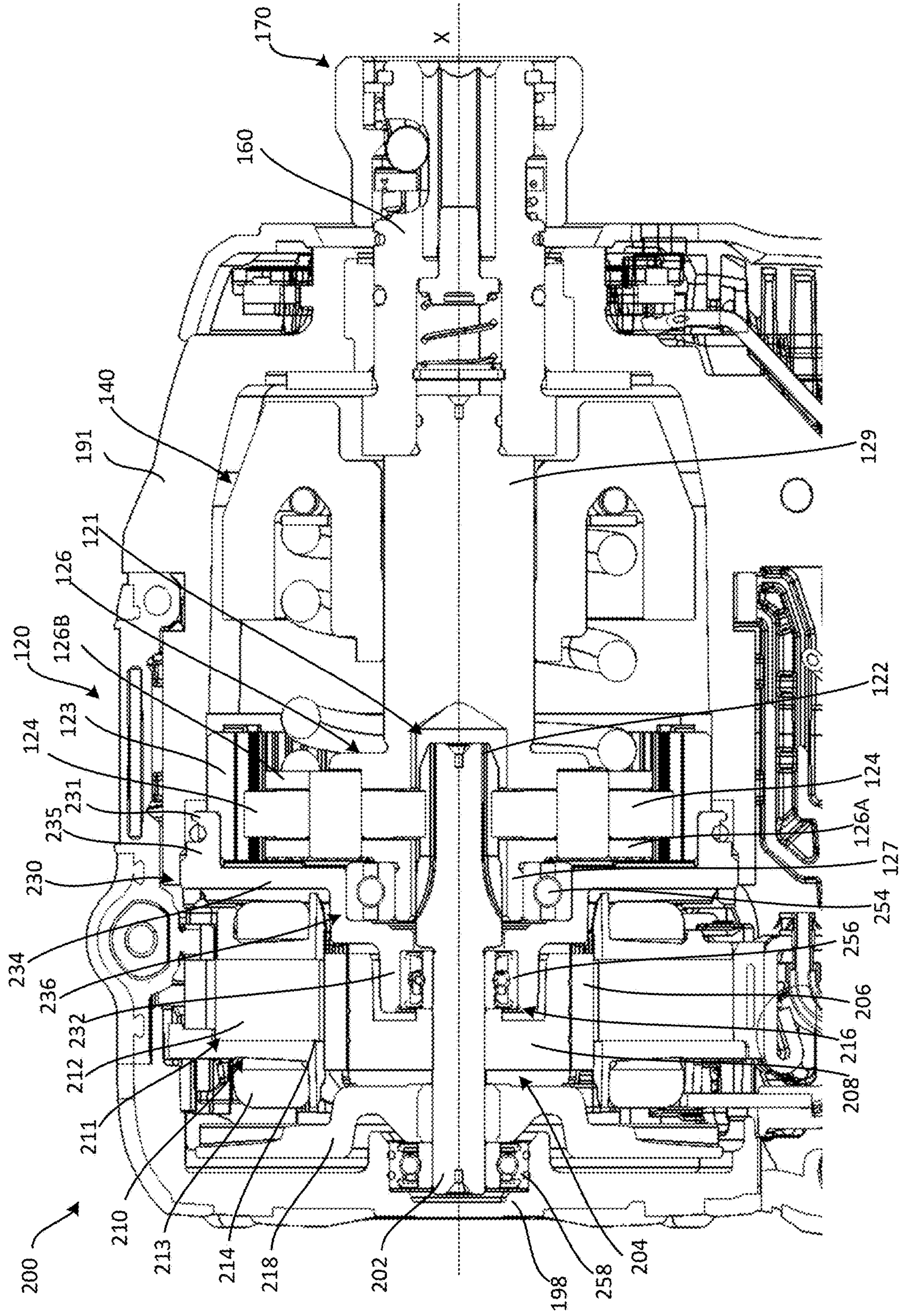
FIG. 2A is a partial cross-sectional view of an example power tool, in accordance with implementations described herein.
Figure 2B:
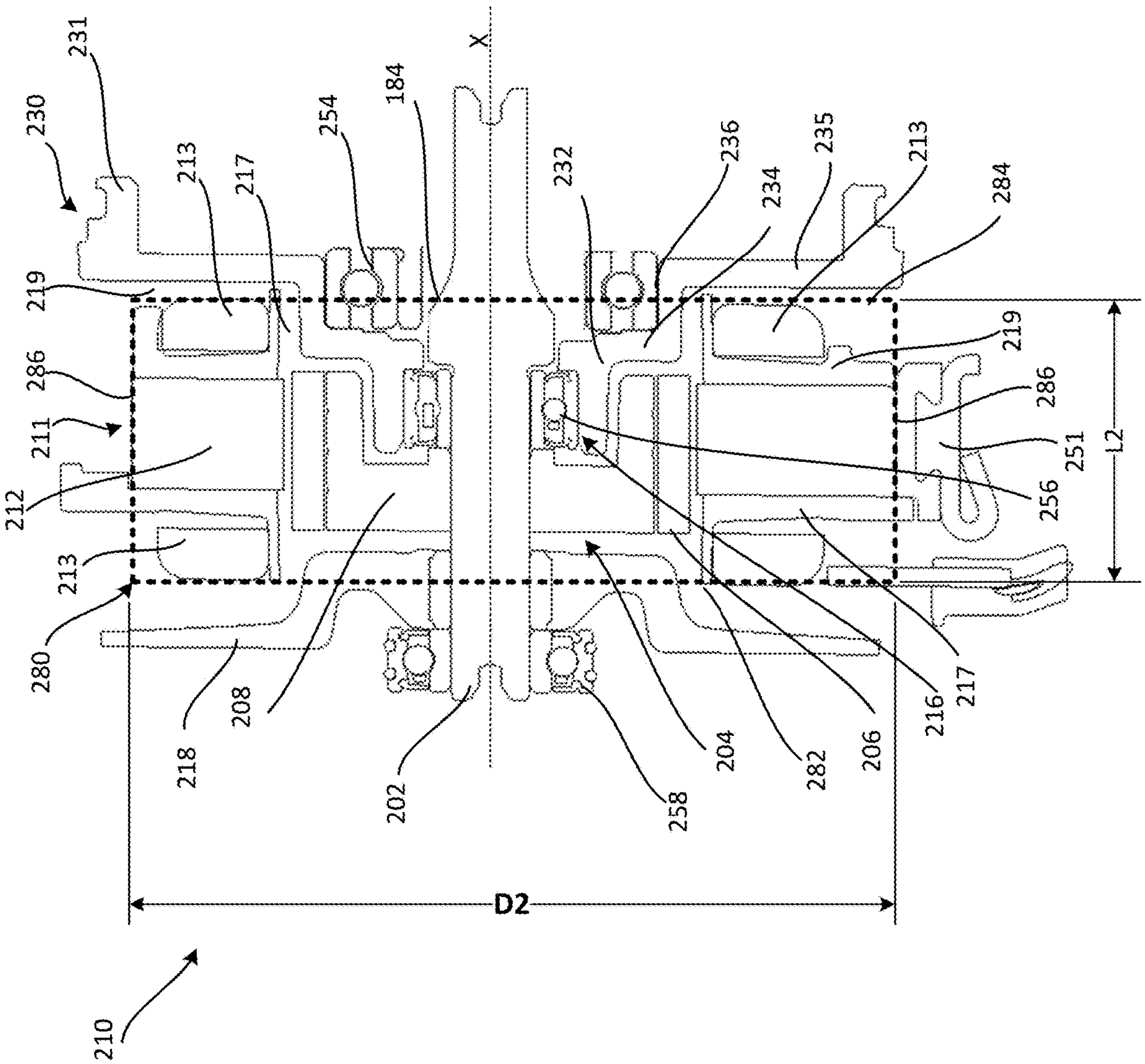
FIG. 2B is a close-in view of an example motor assembly of the example power tool shown in FIG. 2A.

FIGS. 2A and 2B present an example power tool 200, in accordance with implementations described herein. In particular, FIG. 2A is a partial cross-sectional view of the example power tool 200, and FIG. 2B is a zoomed-in partial cross-sectional view of the example power tool 200.

The example power tool 200 shown in FIGS. 2A and 2B includes a motor assembly 210 and a ring gear mount 230 that are physically configured to provide for a reduced overall length of the power tool 200 (for example, compared to an overall length of the power tool 100 described above with respect to FIGS. 1A-1E). Many features of the example power tool 200 are similar to features of the power tool 100 described above with respect to FIGS. 1A-1E, such as, for the example the transmission assembly 120, the impact mechanism 140, the output spindle 160, the tool holder 170, the housing 190 including the handle 192, the trigger 196, the receptacle 194, and the like. Thus, duplicative detailed description thereof will not be repeated except as necessary.

In the example shown in FIGS. 2A and 2B, the ring gear mount 230 is configured to position the cam carrier bearing along substantially the same radial plane as at least an end of the stator windings, so that the cam carrier bearing is positioned at least partially within an envelope defined by the ends of the motor assembly 210. In some examples, the motor assembly 210 includes a rotor shaft 202, an inner rotor 204 mounted on the rotor shaft 202 with a ring shaped surface-mount rotor magnet 206 on a rotor core 208, and a stator assembly 211 positioned around the rotor 204. The stator assembly 211 includes a stator core 212, a series of stator teeth 214 radially projecting inwardly from the core 212, and a series of conductive windings 113 wound around the stator teeth 214 to define three phases connected in a wye or a delta configuration.

In this arrangement, the motor assembly 210 defines the tool axis X extending along a longitudinal centerline of the rotor shaft 202, from a rear end portion of the power tool 300 (i.e., an end portion of the power tool 200 corresponding to the tool cap 198) to a front end portion of the power tool 200 (i.e., an end portion of the power tool 200 corresponding to the tool holder 170). In this disclosure, the terms "rear" and "front" are used to describe relative positions of various components along the tool axis X. Thus, as an example, in the arrangement shown in FIGS. 2A and 2B, the motor assembly 210 is disposed rearward of the transmission assembly 120.

In the example shown in FIGS. 2A and 2B, the rotor core 208 is mounted on the rotor shaft 202. An annular recess 216 is formed around the rotor shaft 202, on one side of the rotor core 208, for positioning of one or more of a first, or front motor bearing 256 and/or a second, or rear motor bearing 258. The core 212 may be made of a solid core piece of metal or lamination stack that includes a series of parallel laminations. In some examples, the annular recess 216 is carved or stamped out of the core 212. In some examples, the annular recess 216 is formed using ring-shaped laminations. The rotor magnet 206 may be ring-shaped or segmented, and it may be surface-mounted or embedded within the rotor core 208.

In this example arrangement, the ring gear mount 230 includes a first bearing pocket 232 formed as a cylindrical or rim-shaped projection extending from a radial portion 234 of the ring gear mount 230, for supporting at least the front motor bearing 256. The first bearing pocket 232 of the ring gear mount 230 at least partially projects into and is received within the annular recess 216 of the rotor 204. This allows the front motor bearing 256 to be received at least partially within the stator assembly 211 and within an envelope defined by the radial surfaces of the rotor core 208.

In the example shown in FIGS. 2A and 2B, the ring gear mount 230 includes a second bearing pocket 236 for supporting a cam carrier bearing 254. The second bearing pocket 236 may be formed as a recessed portion of the radial portion 234 of the ring gear mount 230 facing away from the first bearing pocket 232. In some examples, the second bearing pocket 236 is formed as an intermediate annular portion formed between the radial portion 234 and a radial wall 235, where the radial portion 234 is located along a radial plane that intersects a portion of the stator assembly 211, and the radial wall 235 is located adjacent a front end portion of the stator assembly 211. As such, the radial portion 234 extends between a front end of the first bearing pocket 232 and a rear end of the second bearing pocket 236. In some examples, the radial wall 235 extends radially outward from the front end of the second bearing pocket 236 and is supported by either the tool housing 190 or the stator assembly 211. In some examples, the ring gear mount 230 includes an outer rim portion or a lip 231 projecting axially forward from an outer circumference of the radial wall 235 for coupling with a corresponding portion of the transmission housing portion 191 and/or the tool housing 190 and for receiving and supporting a component of the transmission assembly 120, such as the ring gear 123 of the transmission assembly 120.

In some examples, an inner diameter of the second bearing pocket 236 is greater than an inner diameter of the first bearing pocket 232. In some examples, the inner diameter of the second bearing pocket 236 is substantially the same as the outside surface of the rotor core 208. In some examples, the outer surface of the second bearing pocket 236 is received within the opening of the stator assembly 211, i.e., within the inner diameter formed by front end portions of the stator windings 213 adjacent the rotor 204. In some examples, the outer annular surface of the second bearing pocket 236 may be in physical contact with the stator windings 213 or a front end insulator 219 of the stator assembly 211. In some examples, a relatively small air gap 217 radially separates the outer annular surface of the second bearing pocket 236 from the stator windings 213 and the front end insulator 219 of the stator assembly 211.

In some examples, the cam carrier bearing 254 is received within the second bearing pocket 236 so that it is at least partially nested within the stator assembly 211 along a radial plane that intersects the front end portions of the stator windings 213.

In some examples, the motor assembly 210 defines a motor envelope 280 similar to the motor envelope 180 of the motor assembly 110 described above. The motor envelope 280 is bounded by a rear plane 282 at a rearmost portion of the motor assembly 210 (i.e., at the rearmost portion of the stator assembly 211), a front plane 284 at a frontmost portion of the motor assembly 210, and a generally cylindrical boundary 286 extending from the rear plane 282 to the front plane 284 and surrounding a radially outermost portion of the motor assembly 210 (e.g., a radially outermost portion of the stator assembly 211). In the example arrangement shown in FIGS. 2A and 2B, the rear plane 282 is at a rearmost portion of the stator assembly 211 (including the stator windings 213), the front plane 284 is at a frontmost point of the stator assembly 211 (including the stator windings 213), and the generally cylindrical boundary 286 surrounds a radially outermost portion of the stator assembly 211 (not including the terminal block 251). In some examples, the rear plane may be at a rearmost portion of the rotor 204 (if the rotor 204 extends further rearward than the stator assembly 211), the front plane may be at a frontmost portion of the rotor 204 (if the rotor 204 extends further frontward than the stator assembly 211), and the generally cylindrical boundary may be at an outermost portion of the rotor 204 (if the rotor 204 extends further radially outward than the stator assembly 211, such as, for example, in an outer rotor motor). As shown in FIG. 2B, the motor envelope 280 may have a length L2 from the rear plane 282 to the front plane 284 and a diameter D2 of the cylindrical boundary 286. In some examples, at least a portion of the front motor bearing 256 and at least a portion of the ring gear mount 230 are received within the motor envelope 280.

In the example arrangements shown in FIGS. 1C-IE, 2A and 2B, depending on a length of the rotor core 208, the configuration, for example, the shape and/or the contour, of the ring gear mount 230 together with the open rotor core 208, allows one or both of the motor bearings 256 and 258 to be at least partially received within the annular recess 216 formed by the core 212. In particular, in the arrangement shown in FIGS. 2A and 2B, the front motor bearing 256 is supported within the annular recess 216 of the core 212, with the front motor bearing 256 positioned within the motor envelope 280, and the cam carrier bearing 254 at least partially positioned within the motor envelope 280. In the example arrangement shown in FIGS. 2A and 2B, the rear motor bearing 258 is supported by the tool cap 198 coupled to the rear end portion of the tool housing 190. In some examples, the tool cap 198 includes a radial body that includes a central bearing pocket for supporting the rear motor bearing 258.

In some examples, a fan 218 is mounted on the rotor shaft 202 to rotate with the rotation of the motor assembly 210. The fan 218 includes a radial main body and a plurality of blades facing the stator assembly 211. In some examples, an inner portion of the fan 218 is recessed to allow the rear motor bearing 258 to be at least partially nested in the axial direction within the fan 218, and to be radially aligned with the main body of the fan 218. The bearing pocket defined by the tool cap 198 may be axially received within the recessed portion of the fan 218, around the rear motor bearing 258, so that positioning of the rear motor bearing 258 within the rear tool cap 198 does not pose a significant increase in the overall length of the motor assembly 210.

Figure 3A:
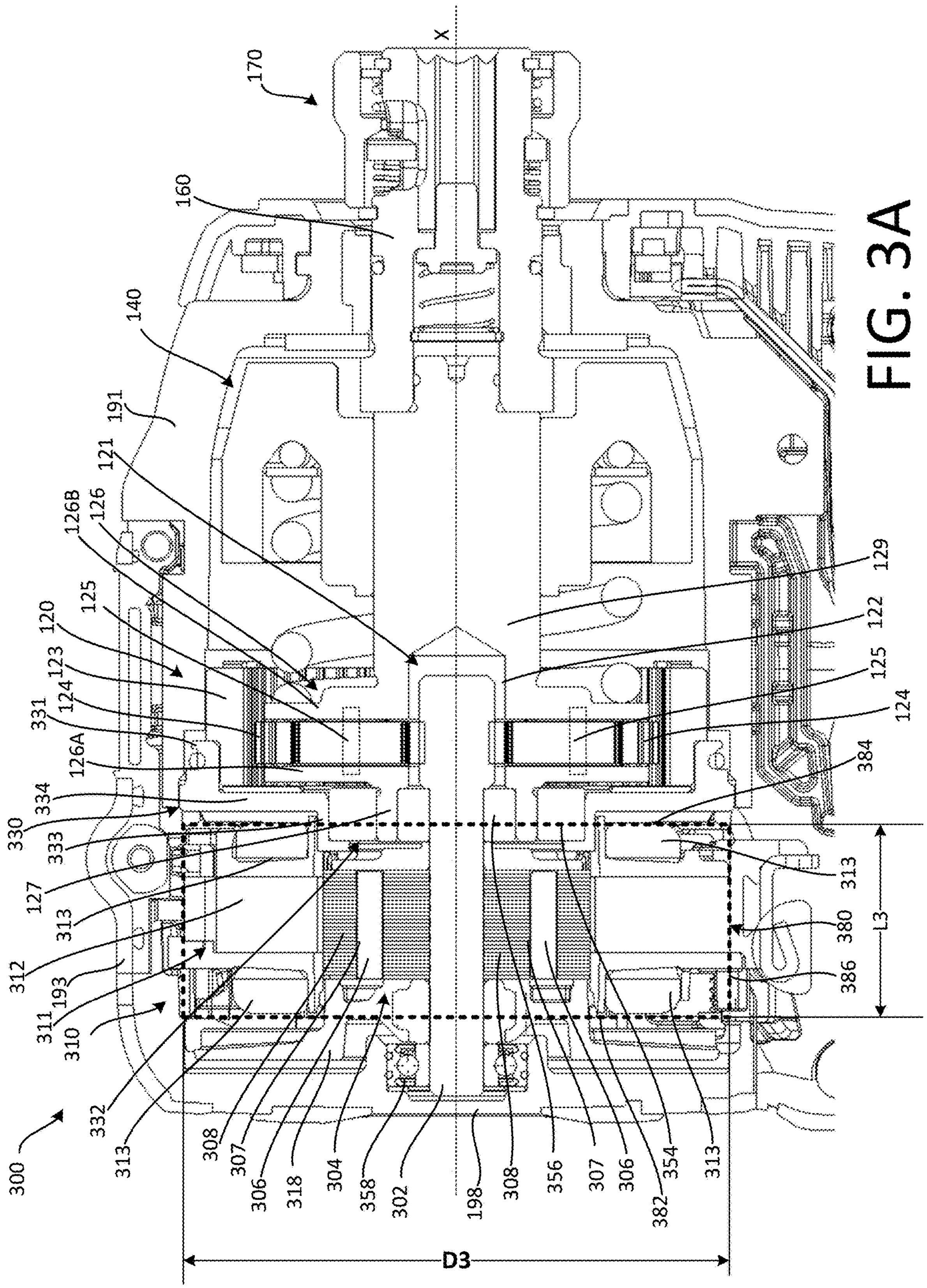
FIG. 3A is a partial cross-sectional view of an example power tool, in accordance with implementations described herein.
Figure 3B:
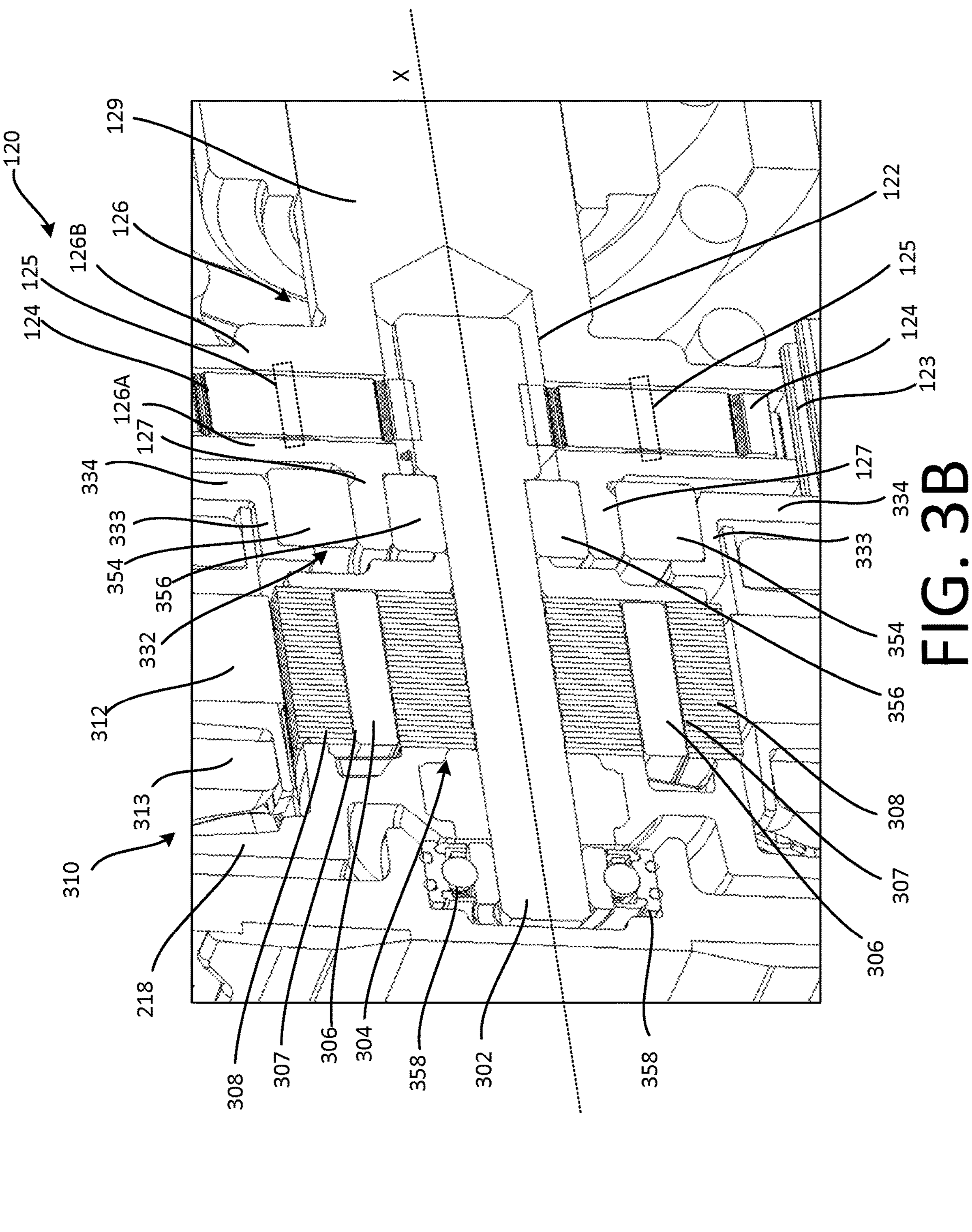
FIG. 3B is a close-in view of an example motor assembly of the example power tool shown in FIG. 3A.

FIGS. 3A and 3B present an example power tool 300, in accordance with implementations described herein. In particular, FIG. 3A is a partial cross-sectional view illustrating internal components of the example power tool 300, and FIG. 3B is a zoomed-in partial cross-sectional view of internal components of the example power tool 300.

The example power tool 300 shown in FIGS. 3A and 3B includes a motor assembly 310 and a ring gear mount 330 that are physically configured to provide for a reduced overall length and/or girth of the power tool 300 (for example, compared to an overall length and/or girth of the power tool 100 described above with respect to FIGS. 1A-1E). Many features of the example power tool 300 are similar to features of the example power tool 100 described above with respect to FIGS. 1A-1E and/or the example power tool 200 described above with respect to FIGS. 2A and 2B, such as, for the example the transmission assembly 120, the impact mechanism 140, the output spindle 160, the tool holder 170, the housing 190 including the handle 192, the trigger 196, the receptacle 194, and the like. Thus, duplicative detailed description thereof will not be repeated except as necessary.

In the example shown in FIGS. 3A and 3B, the motor assembly 310 includes a solid core rotor configuration, rather than the open core rotor configuration of the example motor assembly 210 described above with respect to FIGS. 2A and 2B and/or the example motor assembly 110 described above with respect to FIGS. 1C-IE. In the example shown in FIGS. 3A and 3B, the motor assembly 310 includes an embedded magnet configuration, rather than the surface mounted ring configuration of the magnet of the example motor assembly 210 shown in FIGS. 2A and 2B.

As described above, the open core rotor configuration, together with the surface mounted ring configuration of the magnet, of the example motor assembly 210, allows for the front motor bearing 256 to be received in the annular recess 216 formed within the rotor core 208, piloted by the ring gear mount 230, such that at least one of the front motor bearing 256 and/or the rear motor bearing 258 can be received within the envelope 280 defined by the motor assembly 210. In contrast, in the example motor assembly 310 shown in FIGS. 3A and 3B, the solid core rotor configuration including the embedded magnets does not form an annular recess in which the front motor bearing and/or the rear motor bearing and/or the cam carrier bearing can be accommodated. Rather, the example motor assembly 310 shown in FIGS. 3A and 3B includes a ring gear mount 330 configured such that a front motor bearing can be radially aligned with a cam carrier bearing, and for both the front motor bearing and the cam carrier bearing to be substantially radially aligned with corresponding end portion(s) of stator windings of the motor assembly 310. In the example arrangement shown in FIGS. 3A and 3B, the cam carrier (rather than the ring gear mount 230 as in the example arrangement shown in FIGS. 2A and 2B) indexes, or sets a location for, or supports a position of the front motor bearing. The configuration of the ring gear mount 330 allows for a reduced overall length of the example power tool 300 (for example compared to the overall length of the example power tool 100 described above with respect to FIGS. 1A-1E) and/or an overall length that is less than or equal to the overall length of the example power tool 200 shown in FIGS. 2A and 2B, but with the motor assembly 310 including the solid core rotor configuration and embedded magnet configuration.

In some examples, the motor assembly 310 includes a rotor 304 including magnets 306 mounted in magnet pockets 307 formed in a rotor core 308. The example motor assembly 310 shown in FIGS. 3A and 3B has an internal permanent magnet configuration in which the rotor magnets 306 are mounted in the magnet pockets 307 defined in the rotor core 308, such that the rotor magnets 306 are embedded in the rotor core 308. The rotor core 308 is mounted on the rotor shaft 302. A stator assembly 311 is positioned around the rotor 304. The stator assembly 311 includes a stator core 312 having a series of teeth projecting radially inward from the stator core 312, and a series of conductive windings 313 wound around the stator teeth. As the phases of the stator assembly 311 are sequentially energized, they interact with the rotor magnets 306 to cause rotation of the rotor 304 relative to the stator assembly 311.

In the example shown in FIGS. 3A and 3B, the ring gear mount 330 includes a cylindrical or rim-shaped portion 333, and a radial portion 334 extending radially outward from the rim-shaped portion 333 of the ring gear mount 330. The ring gear mount 330 includes an outer rim portion or a lip 331 projecting axially forward from the radial portion 334, for coupling with a corresponding portion of the transmission housing portion 191 and/or the tool housing 190, and for receiving and supporting a component of the transmission assembly 120, such as the ring gear 123. The rim-shaped portion 333 (for example, together with corresponding portions of the rear carrier plate 126A and the rearward projection 127 of the carrier 126) defines a bearing pocket 332 in which a cam carrier bearing 354 is received. In this example arrangement, the cam carrier bearing 354 is supported by the ring gear mount 330, and in particular, the outer race of the cam carrier bearing 354 is supported by the rim-shaped portion 333 of the ring gear mount 330.

In the example arrangement shown in FIGS. 3A and 3B, a front motor bearing 356 is mounted on the rotor shaft 302, and is piloted, located, set in position, and/or supported, by the rearward projection 127 of the rear carrier plate 126A of the carrier 126. In this example arrangement, the rearward projection 127 is fitted between the front motor bearing 356 and the cam carrier bearing 354. Thus, in this example arrangement, an outer race of the cam carrier bearing 354 is supported by the (stationary) ring gear mount 330, with an inner race being supported by and rotating with the rearward projection 127 of the carrier 126. The outer race of the front motor bearing 356 is supported by the rearward projection 127, that rotates with the carrier 126. That is, in this example, the outer race of the front motor bearing 356 rotates together with the carrier 126, at a somewhat lower speed than the inner race of the front motor bearing 356 that rotates together with the rotor shaft 302.

In the example arrangement shown in FIGS. 3A and 3B, a rear motor bearing 358 is supported by the tool cap 198 coupled to the rear end portion of the tool housing 190. In some examples, a fan 318 is mounted on the rotor shaft 302 to rotate with the rotation of the motor assembly 310. In some examples, the fan 318 includes a radial main body and a plurality of blades facing the stator assembly 311. In some examples, a central hub portion of the fan 318 is recessed to allow the rear motor bearing 358 to be at least partially nested in the axial direction within the fan 318, and to be radially aligned with the main body of the fan 318. The bearing pocket defined by the tool cap 198 may be axially received within the recessed portion of the fan 318, around the rear motor bearing 358, so that positioning of the rear motor bearing 358 within the rear tool cap 198 does not pose a significant increase in the overall length of the motor assembly 310.

In the example arrangement shown in FIGS. 3A and 3B, the front motor bearing 356 has been moved axially rearward, such that the front motor bearing 356 is substantially radially aligned with the cam carrier bearing 354, and substantially radially aligned with the conductive windings 313, and the front motor bearing 356 and the cam carrier bearing 354 are at least partially received within a motor envelope 380 of the motor assembly 310. As described above, the motor envelope 380 may be bounded by a rear plane 382 at a rearmost portion of the motor assembly 310 (i.e., at the rearmost portion of the stator assembly 311), a front plane 384 at a frontmost portion of the motor assembly 310, and a generally cylindrical boundary 386 extending from the rear plane 382 to the front plane 384 and surrounding a radially outermost portion of the motor assembly 310 (e.g., a radially outermost portion of the stator assembly 311). The motor envelope 380 may have a length L3 from the rear plane 382 to the front plane 384 and a diameter D3 of the cylindrical boundary 386. In some examples, at least a portion of the front motor bearing 356 and at least a portion of the cam carrier bearing 354 are received within the motor envelope 380. In some examples, the length L3 associated with the motor assembly 310 shown in FIGS. 3A and 3B may be less than or equal to the length L2 associated with the motor assembly 210 shown in FIGS. 2A and 2B. In some examples, the diameter D3 associated with the motor assembly 310 shown in FIGS. 3A and 3B may be less than or equal to the diameter D2 associated with the motor assembly 210 shown in FIGS. 2A and 2B.

In some implementations, the length L3 of the example motor assembly 310 may be between approximately 16.0 mm and 19.4 mm. In some examples, the length L3 may be smaller than or equal to approximately 17.7 mm. In some implementations, the diameter D3 of the example power tool 300 may be between approximately 46.0 mm and 56.0 mm. In some examples, the diameter D3 may be smaller than or equal to approximately 51.0 mm. In some implementations, an overall axial length of the example power tool 300 may be between approximately 89.0 mm and 109.0 mm. In some examples, the overall axial length of the example power tool 300 may be smaller than or equal to approximately 99.5 mm. In some implementations, an overall girth of the example power tool 300 may be between approximately 60.0 mm and 72.0 mm. In some examples, the overall girth of the example power tool 300 may be smaller than or equal to approximately 66.0 mm. In some implementations, an axial length from a front end portion of the motor assembly 310 (i.e., frontmost part of the conductive windings 313) to a rear end portion of the carrier 126 (i.e., rearmost part of the rear carrier plate 126A) is between approximately 3.0 mm and 5.5 mm. In some examples, the axial length from the front end portion of the motor assembly 310 to the rear end portion of the carrier 126 is smaller than or equal to approximately 5.0 mm, preferably smaller than or equal to approximately 4.6 mm, more preferably smaller than or equal to approximately 4.2 mm. Accordingly, In some implementations, an axial length from a rear end portion of the motor assembly 310 to a front end portion of the tool holder 170 is between approximately 85.0 mm and 104.0 mm. In some examples, the axial length from the rear end portion of the motor assembly 310 to the front end portion of the tool holder 170 is smaller than or equal to approximately 94.37 mm. In some implementations, an inner diameter of the ring gear mount 330 is between approximately 21.6 mm and 26.4 mm. In some examples, the inner diameter of the ring gear mount 330 is smaller than or equal to approximately 24.0 mm. In some implementations, an outer diameter of the ring gear mount 330 is between approximately 46.8 mm and 57.2 mm. In some examples, the outer diameter of the ring gear mount 330 is smaller than or equal to approximately 52.0 mm. In some examples, a maximum operating voltage of the removeable power tool battery pack coupled to the power tool is in the range of approximately 20V to 80V, and a nominal voltage of the battery pack is in the range of 18V to 72V. In some examples, a maximum output power of the motor assembly 310 is between approximately 396.0 W and 484.0 W when using a 20V battery pack, with a current drawn by the motor assembly 310 between approximately 22.0 amps and 27.0 amps. In some examples, the output power of the motor assembly 310 is greater than or equal to approximately 440 W when using an 20V max battery pack, with current drawn by the motor assembly 310 being greater than or equal to approximately 24.5 amps. Thus, in power tool 300, a ratio of the maximum power output of the motor assembly 310 to the axial length from the front end portion of the motor assembly 310 to the rear end portion of the carrier 126 is greater than or equal to approximately 86 W/mm, preferably greater than or equal to approximately 90 W/mm, more preferably greater than or equal to approximately 94 W/mm. In some implementations, an output torque of the example power tool 300 is between approximately 1642.0 in-lbs and 2007 in-lbs when using a 20V max battery pack. In some examples, the output torque of the example power tool 300 is greater than or equal to approximately 1825 in-lbs when using a 20V max battery pack. In some examples, the output torque of the example power tool 300 is greater than or equal to 2400 in-lbs.

Figure 4A:
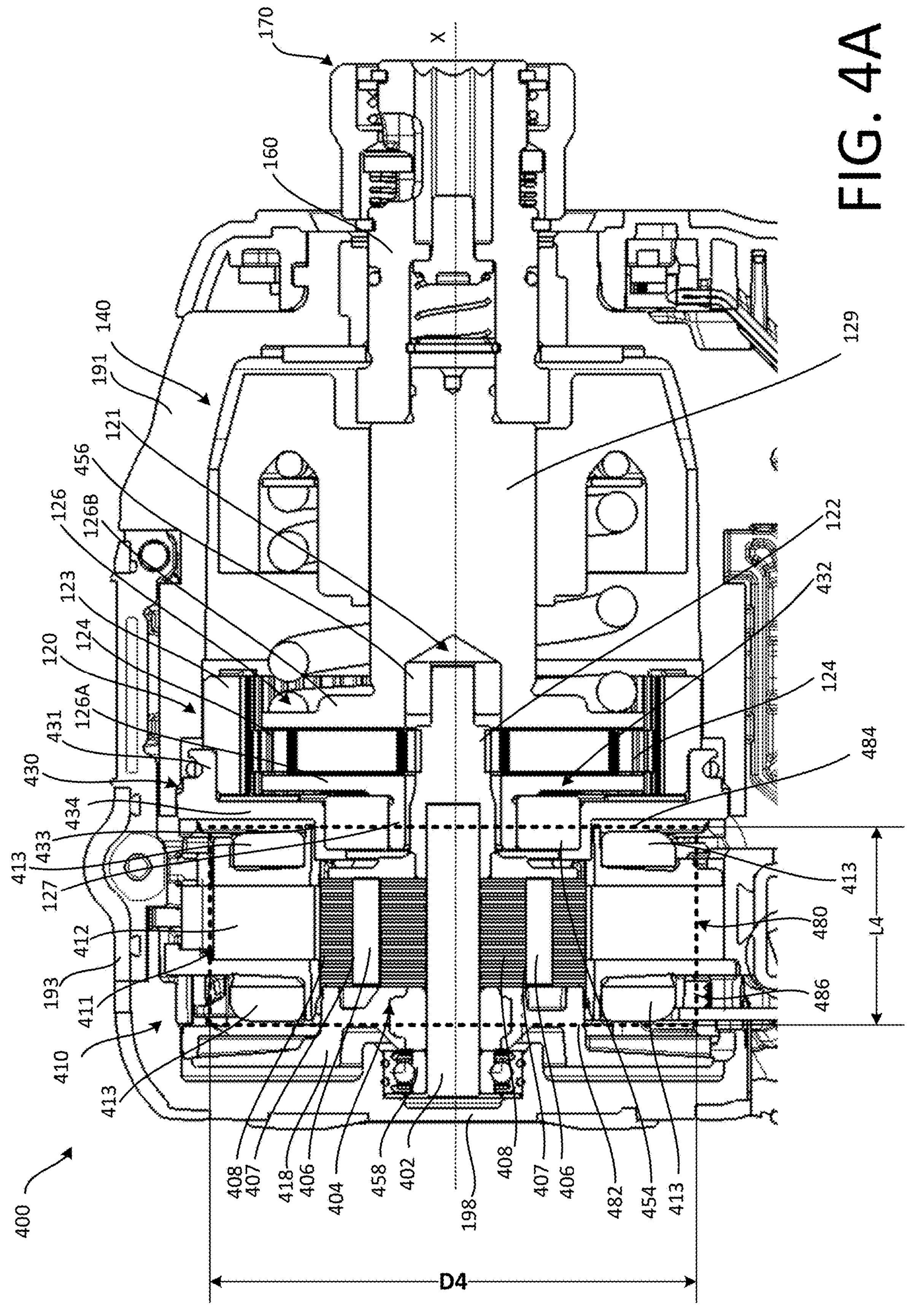
FIG. 4A is a partial cross-sectional view of an example power tool, in accordance with implementations described herein.
Figure 4B:
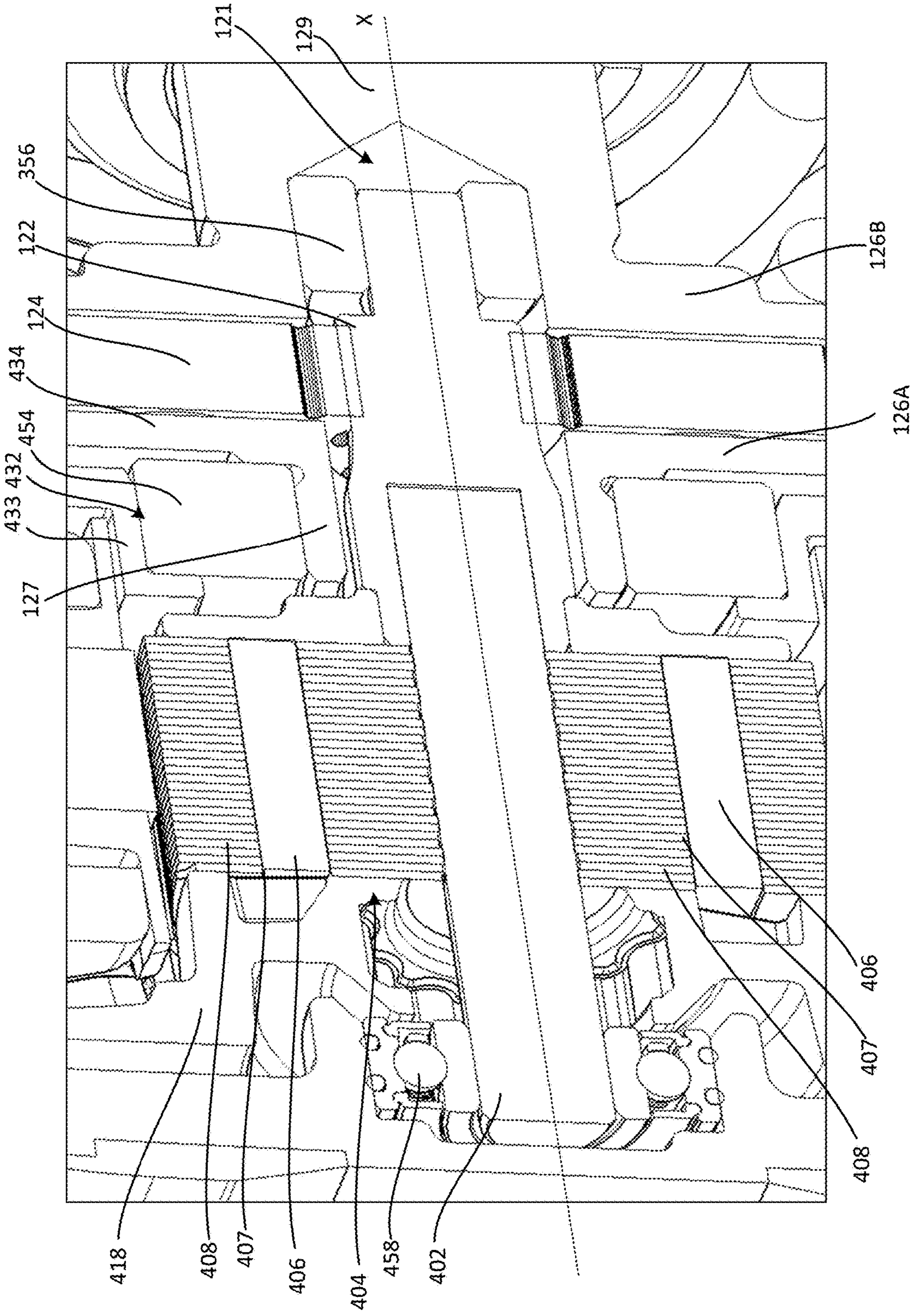
FIG. 4B is a close-in view of an example motor assembly of the example power tool shown in FIG. 4A.

FIGS. 4A and 4B present an example power tool 400, in accordance with implementations described herein. In particular, FIG. 4A is a partial cross-sectional view of internal components of the example power tool 400, and FIG. 4B is a zoomed-in partial cross-sectional view of the internal components the example power tool 400.

The example power tool 400 shown in FIGS. 4A and 4B includes a motor assembly and a ring gear mount that are physically configured to provide for a reduced overall length and/or girth of the power tool 400, together with the fitting of a front motor bearing in a cavity formed within a cam shaft and defining a bearing pocket for the front motor bearing (for example, compared to an overall length and/or girth of the power tool 100 described above with respect to FIGS. 1A-1E). Many features of the example power tool 400 are similar to features of the power tool 100 described above with respect to FIGS. 1A-1E and/or the example power tool 200 described above with respect to FIGS. 2A and 2B, and/or the example power tool 300 described above with respect to FIGS. 3A and 3B, such as, for the example the transmission assembly 120, the impact mechanism 140, the output spindle 160, the tool holder 170, the housing 190 including the handle 192, the trigger 196, the receptacle 194, and the like. Thus, duplicative detailed description thereof will not be repeated except as necessary.

In the example shown in FIGS. 4A and 4B, the motor assembly 410 includes a solid core rotor configuration, rather than the open core rotor configuration described above with respect to FIGS. 1C-2B. In the example shown in FIGS. 4A and 4B, the motor assembly 410 includes an embedded magnet configuration, rather than the surface mounted ring configuration of the magnet of the example motor assembly 210 shown in FIGS. 2A and 2B. As described above, due to the solid core rotor configuration including the embedded magnets of the example motor assembly 410 shown in FIGS. 4A and 4B, the rotor does not form an annular recess in which the front motor bearing and/or the rear motor bearing and/or the cam carrier bearing can be accommodated. Rather, in the example motor assembly 410 shown in FIGS. 4A and 4B, the front motor bearing is received in a cavity formed in the cam shaft of the cam carrier that defines a bearing pocket for the front motor bearing, with a ring gear mount 430 configured such that the cam carrier bearing can be substantially radially aligned with corresponding end portion(s) of stator windings of the motor assembly 410. The press fit of the front motor bearing in the cavity formed in the cam shaft 129 of the carrier 126, with the cam carrier bearing at least partially accommodated within a motor envelope of the motor assembly 410, allows for a reduced overall length of the example power tool 400 (for example compared to the overall length of the power tool 100 described above with respect to FIGS. 1A-1E) and/or an overall length that is less than or equal to the overall length of the example power tool 200 shown in FIGS. 2A and 2B and/or the example power tool 300 shown in FIGS. 3A and 3B.

The example motor assembly 410 includes a rotor 404 including magnets 406 mounted in magnet pockets 407 formed in a rotor core 408 mounted on a rotor shaft 402. In this internal permanent magnet configuration, the rotor magnets 406 are essentially embedded in the rotor core 408. A stator assembly 411 is positioned around the rotor 404. The stator assembly 411 includes a stator core 412 having a series of teeth projecting radially inward from the stator core 412, and a series of conductive windings 413 wound around the stator teeth. As the phases of the stator assembly 411 are sequentially energized, they interact with the rotor magnets 406 to cause rotation of the rotor 404 relative to the stator assembly 411.

In the example shown in FIGS. 4A and 4B, the ring gear mount 430 includes a cylindrical or rim-shaped portion 433, and a radial portion 434 extending radially outward from a first axial end portion of the rim-shaped portion 433. An outer rim portion or a lip 431 projects axially forward from the radial portion 434, for coupling with a corresponding portion of the transmission housing portion 191 and/or the tool housing 190, and for receiving and supporting a component of the transmission assembly 120, such as the ring gear 123.

In the example arrangement shown in FIGS. 4A and 4B, a front motor bearing 456 is received within the cavity 121 formed in the cam shaft 129 of the carrier 126 that defines the bearing pocket in the cam shaft 129. In particular, in this example arrangement, the front motor bearing 456 is fitted on an end portion of the pinion forming the sun gear 122, and is press fit within the walls of the cavity 121. In this example, the rim-shaped portion 433 (for example, together with corresponding portions of the rear carrier plate 126A and the rearward projection 127 of the carrier 126) defines a bearing pocket 432 in which a cam carrier bearing 454 is received. Thus, in this example arrangement, the cam carrier bearing 454 remains radially aligned with the conductive windings 413 of the stator assembly 411, at least partially received within the motor envelope 480, while the front motor bearing 456 has been positioned axially forward (for example, compared to the position of the front motor bearing 356 shown in FIGS. 3A and 3B).

Axial movement of the front motor bearing 456 in this manner makes additional space available in the area of the cam carrier bearing 454. In some examples, this additional space may be used to accommodate a larger, more robust cam carrier bearing 454, increasing surface area contact between the cam carrier cam carrier bearing 454 and the ring gear mount 430. In some examples, this additional space may be used to accommodate an increase in size of the rim-shaped portion 433 of the ring gear mount 430, to provide more robust support to the cam carrier bearing 454. In some examples, this additional space may be used to accommodate both a larger cam carrier bearing 454 and also a larger rim-shaped portion 433 of the ring gear mount 430. A more robust cam carrier bearing 454 and/or more robust support of the cam carrier bearing 454 (by a larger rim-shaped portion 433 of the ring gear mount 430) may provide improved resistance to axial rearward movement of the impact mechanism 140 during operation of the example power tool 400 in the impact mode of operation, i.e., rearward axial movement of the impact mechanism 140 toward/into the motor envelope 480. In some examples, a more robust cam carrier bearing 454 and/or more robust support of the cam carrier bearing 454 (by a larger rim-shaped portion 433 of the ring gear mount 430) may direct forces generated due to operation of the impact mechanism 140 back into the housing 190 via the ring gear mount 430, thus reducing vibration experienced by the user operating the power tool 400 in the impact mode of operation.

In this example arrangement, the outer race of the cam carrier bearing 454 is supported by the rim-shaped portion 433 of the ring gear mount 430, which is fixed to the housing 190 and thus remains substantially stationary. The inner race of the cam carrier bearing 454 is supported on the rearward projection 127 of the carrier 126, such that the inner race of the cam carrier cam carrier bearing 454 rotates together with the carrier 126, while the outer race of the cam carrier bearing 454 remains substantially stationary.

In the example arrangement shown in FIGS. 4A and 4B, the press fit of the front motor bearing 456 bearing pocket defined in the cavity 121 of the cam shaft 129 limits axial movement of the front motor bearing 456 relative to the carrier 126. The inner race of the front motor bearing 456 is fitted on a distal end portion of the pinion that is coupled on the rotor shaft 402, and that includes the sun gear 122, such that the inner race of the front motor bearing 456 rotates together with/at substantially the same rotational speed as the rotor shaft 402/sun gear 122. The outer race of the front motor bearing 456 is press fit in the bearing pocket defined in the cavity 121 formed in the cam shaft 129, such that the outer race of the front motor bearing 456 rotates together with/at substantially the same rotational speed as the carrier 126. Thus, the outer race of the front motor bearing 456 rotates at a slower speed than the inner race of the front motor bearing 456.

In the example arrangement shown in FIGS. 4A and 4B, a rear motor bearing 458 is supported by the tool cap 198 coupled to the rear end portion of the tool housing 190. In some examples, a fan 418 is mounted on the rotor shaft 402 to rotate with the motor assembly 410. In some examples, the fan 418 includes a radial main body and a plurality of blades facing the stator assembly 411. In some examples, an inner portion of the fan 418 is recessed to allow the rear motor bearing 458 to be at least partially nested in the axial direction within the fan 418, and to be radially aligned with the main body of the fan 418. The bearing pocket defined by the tool cap 198 may be axially received within the recessed portion of the fan 418, around the rear motor bearing 458, so that positioning of the rear motor bearing 458 within the rear tool cap 198 does not pose a significant increase in the overall length of the motor assembly 410.

In the example arrangement shown in FIGS. 4A and 4B, the front motor bearing 456 has been moved axially forward, to a position within the cavity 121 of the cam shaft 129. The cam carrier bearing 454 and the rearward projecting rim-shaped portion 433 of the ring gear mount 430 are substantially radially aligned with the conductive windings 413, and at least partially received within the motor envelope 480 of the motor assembly 410. As with the example motor assemblies 210, 310 described above with respect to FIGS. 2A-3B, the motor envelope 480 may be bounded by a rear plane 482 at a rearmost portion of the motor assembly 410 (i.e., at the rearmost portion of the stator assembly 411), a front plane 484 at a frontmost portion of the motor assembly 410, and a generally cylindrical boundary 486 extending from the rear plane 482 to the front plane 484 and surrounding a radially outermost portion of the motor assembly 410 (e.g., a radially outermost portion of the stator assembly 411). The motor envelope 480 may have a length L4 from the rear plane 482 to the front plane 484 and a diameter D4 of the cylindrical boundary 486. In some examples, the length L4 associated with the motor assembly 410 shown in FIGS. 4A and 4B may be less than or equal to the length L2 associated with the motor assembly 210 shown in FIGS. 2A and 2B and/or the length L3 associated with the motor assembly 310 shown in FIGS. 3A and 3B. In some examples, the diameter D4 associated with the motor assembly 410 shown in FIGS. 4A and 4B may be less than or equal to the diameter D2 associated with the motor assembly 210 shown in FIGS. 2A and 2B and/or the diameter D3 associated with the motor assembly 310 shown in FIGS. 3A and 3B.

In some implementations, the length L4 of the example motor assembly 410 may be between approximately 16.5 mm and 20.1 mm. In some examples, the length L4 may be smaller than or equal to approximately 18.3 mm. In some implementations, the diameter D4 of the example power tool 400 may be between approximately 46.0 mm and 56.0 mm. In some examples, the diameter D4 may be smaller than or equal to approximately 51.0 mm. In some implementations, an overall axial length of the example power tool 400 may be between approximately 89.6 mm and 109.0 mm. In some examples, the overall axial length of the example power tool 400 may be smaller than or equal to approximately 99.5 mm. In some implementations, an overall girth of the example power tool 400 may be between approximately 59.4 mm and 72.6 mm. In some examples, the overall girth of the example power tool 400 may be smaller than or equal to approximately 66.0 mm. In some implementations, an axial length from a front end portion of the motor assembly 410 (i.e., frontmost part of the conductive windings 413) to a rear end portion of the carrier 126 i.e., rearmost part of the rear carrier plate 126A) is between approximately 3.0 mm and 5.0 mm. In some examples, the axial length from the front end portion of the motor assembly 410 to the rear end portion of the carrier 126 is smaller than or equal to approximately 4.5 mm, preferably smaller than or equal to approximately 4.1 mm, more preferably smaller than or equal to approximately 3.7 mm. In some implementations, an axial length from a rear end portion of the motor assembly 410 to a front end portion of the tool holder 170 is between approximately 84.9 mm and 103.8 mm. In some examples, the axial length from the rear end portion of the motor assembly 410 to the front end portion of the tool holder 170 is smaller than or equal to approximately 93.4 mm. In some implementations, an inner diameter of the ring gear mount 430 is between approximately 21.5 mm and 26.4 mm. In some examples, the inner diameter of the ring gear mount 430 is smaller than or equal to approximately 24.0 mm. In some implementations, an outer diameter of the ring gear mount 430 is between approximately 46.8 mm and 57.2 mm. In some examples, the outer diameter of the ring gear mount 430 is smaller than or equal to approximately 52.0 mm. In some examples, a maximum operating voltage of the removeable power tool battery pack coupled to the power tool is in the range of approximately 20V to 80V, and a nominal voltage of the battery pack is in the range of 18V to 72V. In some examples, a maximum output power of the motor assembly 410 is between approximately 396.0 W and 484.0 W when using a 20V battery pack, with a current drawn by the motor assembly 410 between approximately 22.0 amps and 27.0 amps. In some examples, the output power of the motor assembly 410 is greater than or equal to approximately 440 W when using a 20V max battery pack, with current drawn by the motor assembly 410 being greater than or equal to approximately 24.5 amps. Thus, in power tool 400, a ratio of the maximum power output of the motor assembly 410 to the axial length from the front end portion of the motor assembly 410 to the rear end portion of the carrier 126 is greater than or equal to approximately 97.5 W/mm, preferably greater than or equal to approximately 102 W/mm, more preferably greater than or equal to approximately 107 W/mm. In some implementations, an output torque of the example power tool 400 is between approximately 1642.0 in-lbs and 2007 in-lbs when using a 20V max battery pack. In some examples, the output torque of the example power tool 400 is greater than or equal to approximately 1825 in-lbs when using a 20V max battery pack. In some examples, the output torque of the example power tool 400 is greater than or equal to 2400 in-lbs.

Figure 5A:
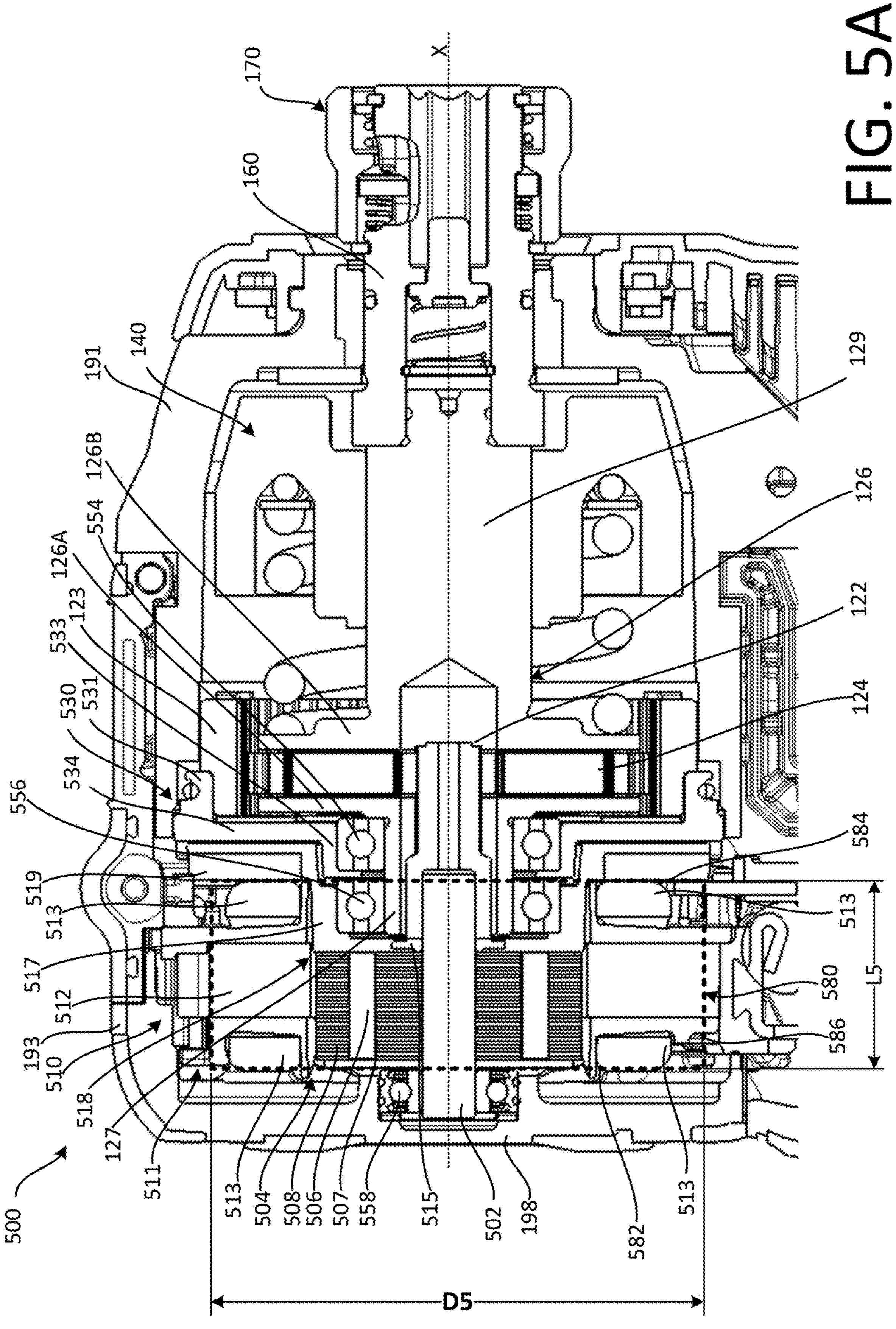
FIG. 5A is a partial cross-sectional view of an example power tool, in accordance with implementations described herein.
Figure 5B:
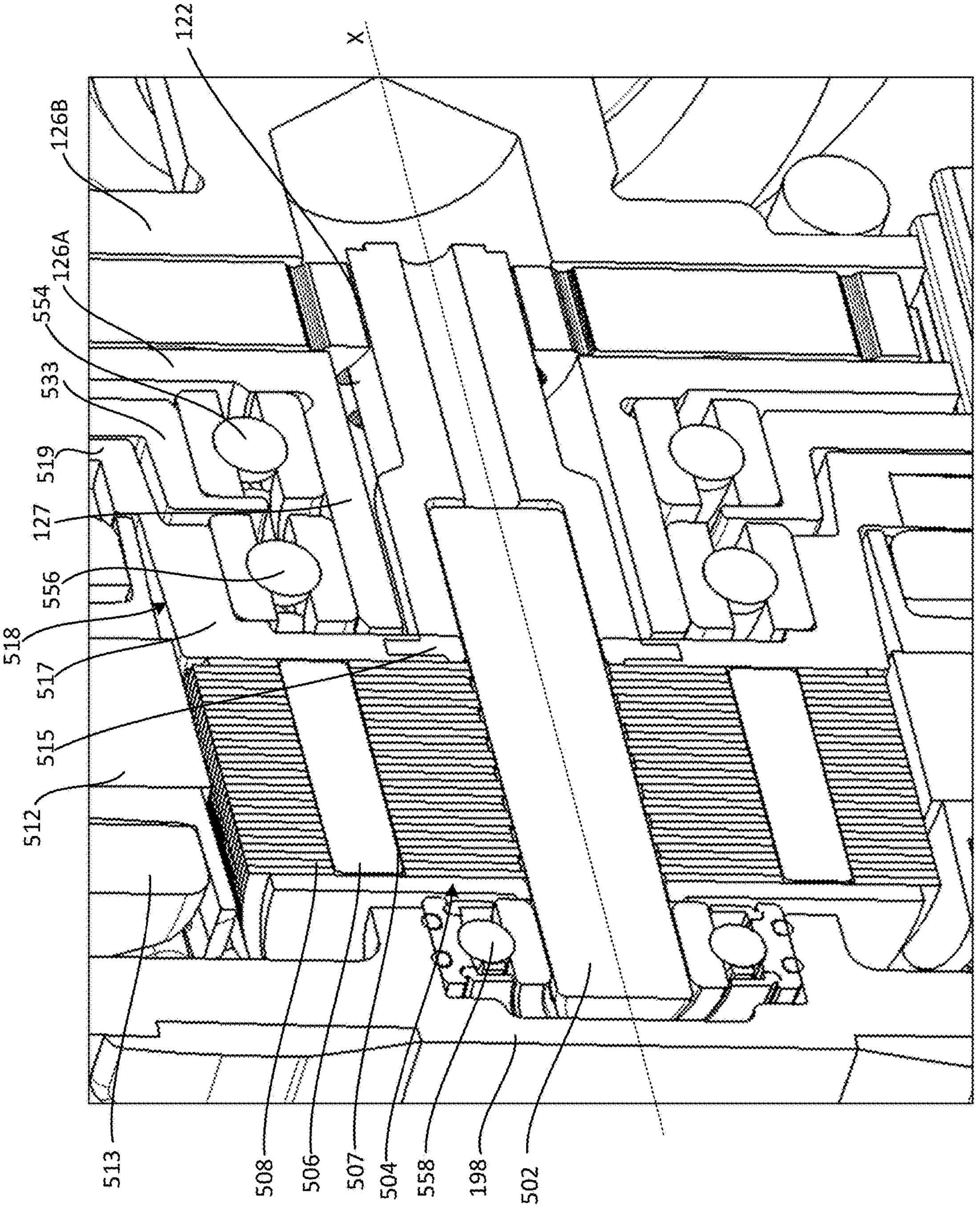
FIG. 5B is a close-in view of an example motor assembly of the example power tool shown in FIG. 5A.

FIGS. 5A and 5B present an example power tool 500, in accordance with implementations described herein. In particular, FIG. 5A is a partial cross-sectional view of internal components of the example power tool 500, and FIG. 5B is a zoomed-in partial cross-sectional view of the internal components of the example power tool 500.

The example power tool 500 shown in FIGS. 5A and 5B includes a motor assembly 510 and a fan 518 that are physically configured to provide for a reduced overall length and/or girth of the power tool 500 (for example, compared to an overall length and/or girth of the example power tool 100 described above with respect to FIGS. 1A-1E). Many features of the example power tool 500 are similar to features of the example power tool 100 described above with respect to FIGS. 1A-1E and/or the example power tool 200 described above with respect to FIGS. 2A and 2B, and/or the example power tool 300 described above with respect to FIGS. 3A and 3B, and/or the example power tool 400 described above with respect to FIGS. 4A and 4B, and thus, duplicative detailed description thereof will not be repeated except as necessary.

In the example shown in FIGS. 5A and 5B, the motor assembly 510 includes a solid core rotor configuration (rather than the open core rotor configuration described above with respect to FIGS. 1C-2B), with an embedded magnet configuration (rather than the surface mounted ring configuration described above with respect to FIGS. 2A and 2B). The solid core rotor configuration including the embedded magnets of the example motor assembly 510 shown in FIGS. 5A and 5B does not provide for an annular recess in the rotor core, in which the front motor bearing and/or the rear motor bearing and/or the cam carrier bearing can be accommodated. Rather, in the example motor assembly 510 shown in FIGS. 5A and 5B, the front motor bearing is received in a cavity formed in a central portion of the fan 518, such that the front motor bearing can be substantially radially aligned with corresponding end portion(s) of stator winding(s) of the motor assembly 510, and accommodated within a motor envelope of the motor assembly 510. In the example motor assembly 510 shown in FIGS. 5A and 5B, the front motor bearing and the cam carrier bearing are mounted on a corresponding rearward protrusion of the cam carrier, so that the cam carrier bearing is supported be the ring gear mount and substantially radially aligned with corresponding blades of the fan 518. This arrangement allows for a reduced overall length of the example power tool 500 (for example compared to the overall length of the power tool 100 described above with respect to FIGS. 1A-1E) and/or an overall length that is less than or equal to the overall length of the example power tool 200 shown in FIGS. 2A and 2B and/or the example power tool 300 shown in FIGS. 3A and 3B and/or the example power tool 400 shown in FIGS. 4A and 4B.

The example motor assembly 510 includes a rotor 504 including magnets 506 mounted in magnet pockets 507 formed in a rotor core 508 mounted on a rotor shaft 502. In this internal permanent magnet configuration, the rotor magnets 506 are essentially embedded in the rotor core 508. A stator assembly 511 is positioned around the rotor 504, including a stator core 512 and a series of conductive windings 513. The ring gear mount 530 includes a cylindrical or rim-shaped portion 533, and a radial portion 534 extending radially outward from a first axial end portion of the rim-shaped portion 533. An outer rim portion or a lip 531 projects axially forward from the radial portion 534.

In the example arrangement shown in FIGS. 5A and 5B, the fan 518 is coupled to the rotor shaft 502 via a pinion 515. The fan 518 includes a plurality of blades 519 extending radially outward from a contoured central hub portion 517 between the conductive windings 513 and the radial portion 534, the central hub portion 517 defining a recessed portion of the fan 518. In the example arrangement shown in FIGS. 5A and 5B, a front motor bearing 556 is received within the recess defined by the central hub portion 517 of the fan 518. Thus, in this example arrangement, the front motor bearing 556 received in the central hub portion 517 of the fan 518 remains radially aligned with the conductive windings 513 of the stator assembly 511, and may be accommodated within a motor envelope 580 of the motor assembly 510. In this example arrangement, the fan 518 (mounted on the rotor shaft 502 via the pinion 515) pilots, or provides support to, or supports a relative position of the rotor 504 and the front motor bearing 556.

In this example arrangement, an inner race of the front motor bearing 556 is mounted on the rearward projection 127 of the carrier 126, thus rotating together with the carrier 126. In this example arrangement, the rearward projection 127 of the carrier 126 extends sufficiently rearward so that the front motor bearing 556 can be mounted thereon. That is, in this example arrangement, the rearward projection 127 may be somewhat elongated, compared to the example arrangements shown in, for example, FIGS. 2A-4B. In the example arrangement shown in FIGS. 5A and 5B, the outer race of the front motor bearing 556 may abut a sidewall portion of the contoured central hub portion 517 of the fan 518, such that the outer race rotates together with the fan 518. In some examples, rotation of the inner race of the 556 with the carrier 126, and rotation of the outer race of the front motor bearing 556 with the fan 518 may produce a differential in rotational speeds between the inner race and the outer race of the front motor bearing 556. For example, the outer race may rotate at a slower speed than the inner race of the front motor bearing 556.

In the example arrangement shown in FIGS. 5A and 5B, a cam carrier bearing 554 is mounted on the rearward projection 127 of the carrier 126, supported by the cylindrical or rim-shaped portion 533 of the ring gear mount 530 fixed to the housing 190. In this example arrangement, an inner race of the cam carrier bearing 554 is mounted on the rearward projection 127 of the carrier 126, thus rotating together with the carrier 126. In this example arrangement, the outer race of the cam carrier bearing 554 may abut the cylindrical or rim-shaped portion 533 of the ring gear mount 530, which is in turn fixed to the housing 190. Thus, the inner race of the cam carrier bearing 554 rotates together with the carrier 126, while the outer race of the cam carrier bearing 554 remains substantially stationary. In this example arrangement, the cam carrier bearing 554 and the front motor bearing 556 are axially aligned, with both the cam carrier bearing 554 and the front motor bearing 556 being mounted on the carrier 126, and the cam carrier bearing 554 being radially aligned at least partially with the blades 519 of the fan 518.

In the example arrangement shown in FIGS. 5A and 5B, a rear motor bearing 558 is supported by the tool cap 198 coupled to the rear end portion of the tool housing 190. Axial movement of the fan 518, to a position that is axially forward of the rotor 504, shifts the rotor 504 axially rearward, allowing the front motor bearing 556 to be received in the contoured central hub portion 517 of the fan 518, and within the motor envelope 580 of the motor assembly 510, e.g., in radial alignment with the conductive windings 513. As with the example motor assemblies 210, 310, 410 described above with respect to FIGS. 2A-4B, the motor envelope 580 may be bounded by a rear plane 582 at a rearmost portion of the motor assembly 510 (i.e., at the rearmost portion of the stator assembly 511), a front plane 584 at a frontmost portion of the motor assembly 510, and a generally cylindrical boundary 586 extending from the rear plane 582 to the front plane 584 and surrounding a radially outermost portion of the motor assembly 510 (e.g., a radially outermost portion of the stator assembly 511). The motor envelope 580 may have a length L5 from the rear plane 582 to the front plane 584 and a diameter D5 of the cylindrical boundary 586. In some examples, the length L5 associated with the motor assembly 510 shown in FIGS. 5A and 5B may be less than or equal to the length L2 associated with the motor assembly 210 shown in FIGS. 2A and 2B and/or the length L3 associated with the motor assembly 310 shown in FIGS. 3A and 3B and/or the length L4 associated with the motor assembly 410 shown in FIGS. 4A and 4B. In some examples, the diameter D5 associated with the motor assembly 510 shown in FIGS. 5A and 5B may be less than or equal to the diameter D2 associated with the motor assembly 210 shown in FIGS. 2A and 2B and/or the diameter D3 associated with the motor assembly 310 shown in FIGS. 3A and 3B and/or the diameter D4 associated with the motor assembly 410 shown in FIGS. 4A and 4B.

In some implementations, the length L5 of the example motor assembly 510 may be between approximately 16.6 mm and 20.2 mm. In some examples, the length L5 may be smaller than or equal to approximately 18.4 mm. In some implementations, the diameter D5 of the example power tool 500 may be between approximately 45.9 mm and 56.1 mm. In some examples, the diameter D5 may be smaller than or equal to approximately 51.0 mm. In some implementations, an overall axial length of the example power tool 500 may be between approximately 88.8 mm and 108.6 mm. In some examples, the overall axial length of the example power tool 500 may be smaller than or equal to approximately 98.7 mm. In some implementations, an overall girth of the example power tool 500 may be between approximately 59.4 mm and 72.6 mm. In some examples, the overall girth of the example power tool 500 may be smaller than or equal to approximately 66.0 mm, an axial length from a front end portion of the motor assembly 510 (i.e., frontmost part of the conductive windings 513) to a rear end portion of the carrier 126 i.e., rearmost part of the rear carrier plate 126A) is between approximately 5.0 mm and 8.0 mm. In some examples, the axial length from the front end portion of the motor assembly 510 to the rear end portion of the carrier 126 is smaller than or equal to approximately 7.7 mm, preferably smaller than or equal to approximately 7.3 mm, more preferably smaller than or equal to approximately 6.9 mm. In some implementations, an axial length from a rear end portion of the motor assembly 510 to a front end portion of the tool holder 170 is between approximately 84.4 mm and 103.2 mm. In some examples, the axial length from the rear end portion of the motor assembly 510 to the front end portion of the tool holder 170 is smaller than or equal to approximately 93.8 mm. In some implementations, an inner diameter of the ring gear mount 530 is between approximately 16.2 mm and 21.6 mm. In some examples, the inner diameter of the ring gear mount 530 is smaller than or equal to approximately 18.0 mm. In some implementations, an outer diameter of the ring gear mount 530 is between approximately 46.8 mm and 57.2 mm. In some examples, the outer diameter of the ring gear mount 530 is smaller than or equal to approximately 52.0 mm. In some examples, a maximum operating voltage of the removeable power tool battery pack coupled to the power tool is in the range of approximately 20V to 80V, and a nominal voltage of the battery pack is in the range of 18V to 72V. In some examples, a maximum output power of the motor assembly 510 is between approximately 396.0 W and 484.0 W when using a 20V battery pack, with a current drawn by the motor assembly 510 between approximately 22.0 amps and 27.0 amps. In some examples, the output power of the motor assembly 510 is greater than or equal to approximately 440 W when using a 20V max battery pack, with current drawn by the motor assembly 510 being greater than or equal to approximately 24.5 amps. Thus, in power tool 500, a ratio of the maximum power output of the motor assembly 510 to the axial length from the front end portion of the motor assembly 510 to the rear end portion of the carrier 126 is greater than or equal to approximately 53.1 W/mm, preferably greater than or equal to approximately 55.6 W/mm, more preferably greater than or equal to approximately 58.4 W/mm. In some implementations, an output torque of the example power tool 500 is between approximately 1642.0 in-lbs and 2007 in-lbs when using a 20V max battery pack. In some examples, the output torque of the example power tool 500 is greater than or equal to approximately 1825 in-lbs when using a 20V max battery pack. In some examples, the output torque of the example power tool 500 is greater than or equal to 2400 in-lbs.

Figure 6A:
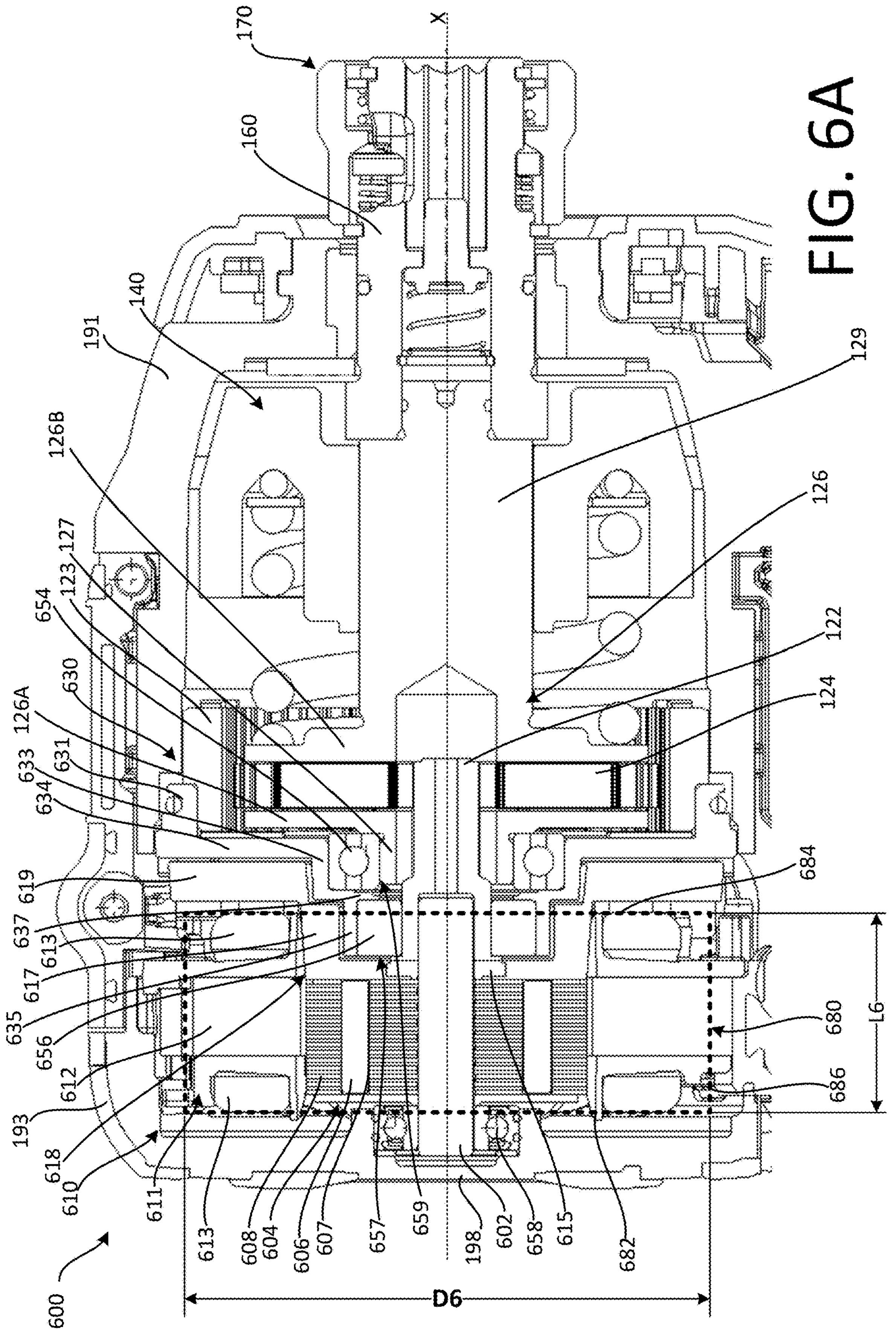
FIG. 6A is a partial cross-sectional view of an example power tool, in accordance with implementations described herein.
Figure 6B:
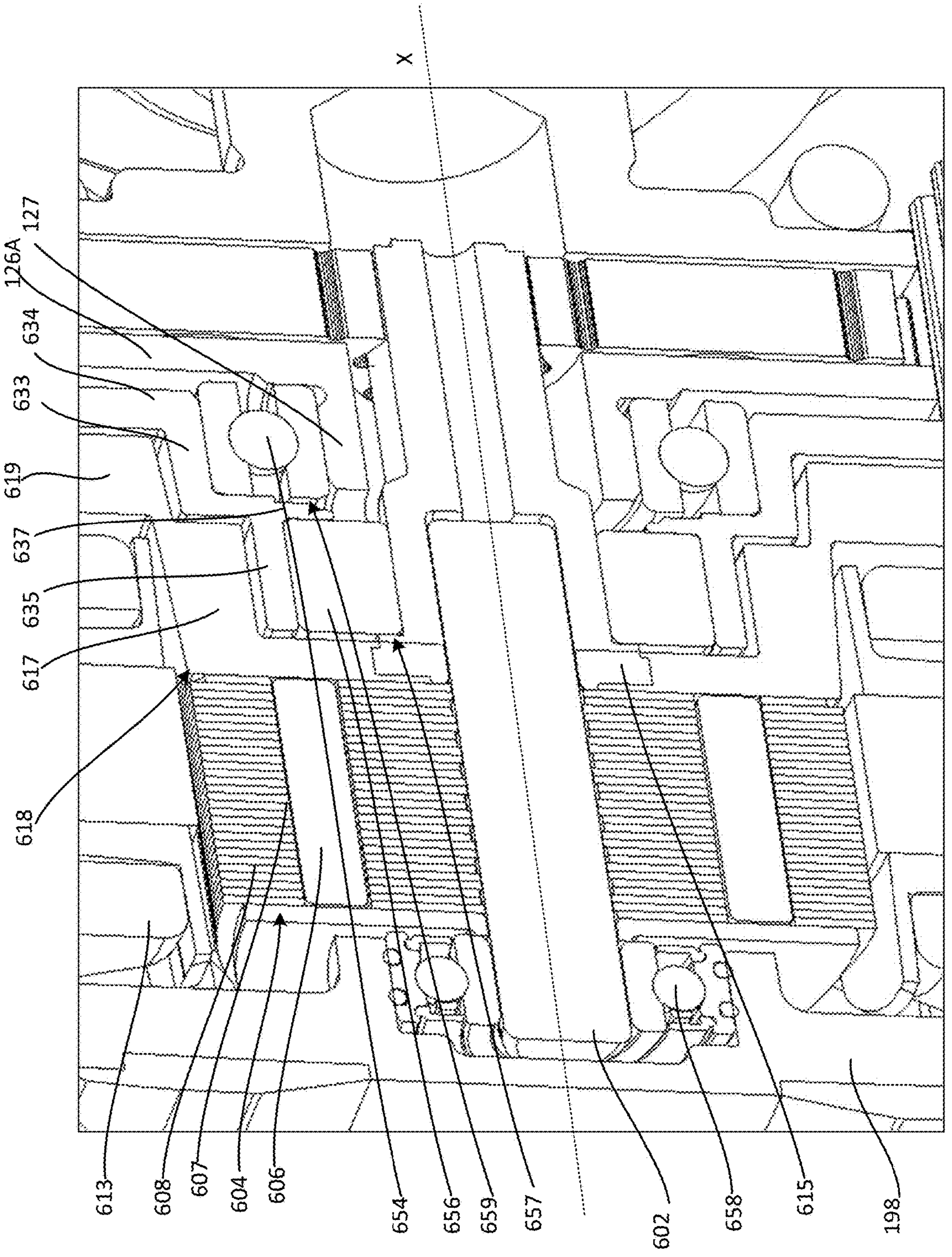
FIG. 6B is a close-in view of an example motor assembly of the example power tool shown in FIG. 6A.

FIGS. 6A and 6B present an example power tool 600, in accordance with implementations described herein. In particular, FIG. 6A is a partial cross-sectional view illustrating internal components of the example power tool 600, and FIG. 6B is a zoomed-in partial cross-sectional view of the internal components of the example power tool 600.

The example power tool 600 shown in FIGS. 6A and 6B includes a motor assembly 610, a fan 618, and a ring gear mount 630 that are physically configured to provide for a reduced overall length and/or girth of the power tool 600 (for example, compared to an overall length and/or girth of the power tool 100 described above with respect to FIGS. 1A-IE). Many features of the example power tool 600 are similar to features of the power tool 100 described above with respect to FIGS. 1A-1E and/or the example power tools 200, 300, 400, 500 described above with respect to FIGS. 2A-5B. Thus, duplicative detailed description thereof will not be repeated except as necessary.

In the example shown in FIGS. 6A and 6B, the motor assembly 610 includes a solid core rotor configuration (rather than the open core rotor configuration described above with respect to FIGS. 1C-2B), with an embedded magnet configuration (rather than the surface mounted ring configuration described above with respect to FIGS. 2A and 2B). As described above, the solid core rotor configuration/embedded magnet configuration of rotor does not provide for an annular recess in which the front motor bearing and/or the rear motor bearing and/or the cam carrier bearing can be accommodated. Rather, in the example motor assembly 610 shown in FIGS. 6A and 6B, the front motor bearing is received in a cavity formed in a central portion of the fan 618, such that the front motor bearing can be substantially radially aligned with corresponding end portion(s) of stator winding(s) of the motor assembly 610, and accommodated within a motor envelope of the motor assembly 610. This axial shifting of the motor assembly 610 and the fan 618, and positioning of the front motor bearing within a cavity defined by the fan, allows for a reduced overall length of the example power tool 600 (for example compared to the overall length of the power tool 100 described above with respect to FIGS. 1A-IE) and/or an overall length that is less than or equal to the overall length(s) of the example power tools 200, 300, 400, 500 shown in FIGS. 2A-5B.

The example motor assembly 610 includes a rotor 604 including magnets 606 mounted in magnet pockets 607 formed in a rotor core 608 mounted on a rotor shaft 602. In this internal permanent magnet configuration, the rotor magnets 606 are essentially embedded in the rotor core 608. A stator assembly 611 is positioned around the rotor 604, including a stator core 612 and a series of conductive windings 613. The ring gear mount 630 includes a cylindrical or rim-shaped portion 633, and a radial portion 634 extending radially outward from a first axial end portion of the rim-shaped portion 633. An outer rim portion or a lip 631 projects axially forward from the radial portion 634. A rear projection 635 projects axially rearward from a second end portion of the rim-shaped portion 633 of the ring gear mount 630, with a tab 637 projecting radially inward.

In the example arrangement shown in FIGS. 6A and 6B, the fan 618 is coupled to the rotor shaft 602 via a pinion 615. The fan 618 includes a plurality of blades 619 extending radially outward from a contoured central hub portion 617, the central hub portion 617 defining a recessed portion of the fan 618. In this example, a portion of the contour of the ring gear mount 630 follows, or corresponds to, a contour of a corresponding portion of the fan 618.

In the example arrangement shown in FIGS. 6A and 6B, a front motor bearing 656 is received within a bearing pocket 657 defined by the recess formed in the central hub portion 617 of the fan 618, together with the rear projection 635 and tab 637 of the ring gear mount 630. Thus, in this example arrangement, the front motor bearing 656 received in the bearing pocket 657 (defined by the central hub portion 617 of the fan 618 and the rear projection 635 of the ring gear mount 630) remains radially aligned with the conductive windings 613 of the stator assembly 611, and may be accommodated at least partially or predominantly within a motor envelope 680 of the motor assembly 610. In this example arrangement, the tab 637 of the ring gear mount 630 provides an axial stop for support of the front motor bearing 656.

In this example arrangement, an inner race of the front motor bearing 656 is mounted on the rotor shaft 602, thus rotating together with the rotor shaft 602. The outer race of the front motor bearing 656 may abut the rear projection 635 of the ring gear mount 630, which is fixed to the housing 190 and thus remains substantially stationary. Accordingly, the inner race of the front motor bearing 656 rotates together with the rotor shaft 602, while the outer race of the front motor bearing 656 remains substantially stationary.

In the example arrangement shown in FIGS. 6A and 6B, a cam carrier bearing 654 is received within a bearing pocket 659 defined by the rear carrier plate 126A and the rearward projection 127 of the carrier 126 together with the rim-shaped portion 633 of the ring gear mount 630. In this example arrangement, the cam carrier bearing 654 is radially aligned with the blades 619 of the fan 618. In this example arrangement, an inner race of the cam carrier bearing 654 is mounted on the rearward projection 127 of the carrier 126, thus rotating together with the carrier 126. An outer race of the cam carrier bearing 654 may abut the cylindrical or rim-shaped portion 633 of the ring gear mount 630, which is in turn fixed to the housing 190. Thus, the inner race of the cam carrier bearing 654 rotates together with the carrier 126, while the outer race of the cam carrier bearing 654 remains substantially stationary.

In the example arrangement shown in FIGS. 6A and 6B, a rear motor bearing 658 is supported by the tool cap 198 coupled to the rear end portion of the tool housing 190. Axial location of the fan 618 at a position that is axially forward of the rotor 604, where the central hub portion 617 penetrates within the body of the motor to approximately a front axial end of the stator core 612, allows the front motor bearing 656 to be received in the bearing pocket 657, and at least partially or predominantly within the motor envelope 680 of the motor assembly 610. As with the example motor assemblies 210, 310, 410, 510 described above with respect to FIGS. 2A-5B, the motor envelope 680 may be bounded by a rear plane 682 at a rearmost portion of the motor assembly 610 (i.e., at the rearmost portion of the stator assembly 611), a front plane 684 at a frontmost portion of the motor assembly 610, and a generally cylindrical boundary 686 extending from the rear plane 682 to the front plane 684 and surrounding a radially outermost portion of the motor assembly 610 (e.g., a radially outermost portion of the stator assembly 611). The motor envelope 680 may have a length L6 from the rear plane 682 to the front plane 684 and a diameter D6 of the cylindrical boundary 686. In some examples, the length L6 associated with the motor assembly 610 shown in FIGS. 6A and 6B may be less than or equal to the length L2 associated with the motor assembly 210 shown in FIGS. 2A and 2B and/or the length L3 associated with the motor assembly 310 shown in FIGS. 3A and 3B and/or the length L4 associated with the motor assembly 410 shown in FIGS. 4A and 4B and/or the length L5 associated with the motor assembly 510 shown in FIGS. 5A and 5B. In some examples, the diameter D6 associated with the motor assembly 610 shown in FIGS. 6A and 6B may be less than or equal to the diameter D2 associated with the motor assembly 210 shown in FIGS. 2A and 2B and/or the diameter D3 associated with the motor assembly 310 shown in FIGS. 3A and 3B and/or the diameter D4 associated with the motor assembly 410 shown in FIGS. 4A and 4B and/or the diameter D5 associated with the motor assembly 510 shown in FIGS. 5A and 5B. In an example, the front motor bearing 656 is radially aligned at least in part with the rear projection 635 of the ring gear mount 630, the central hub portion 617 of the fan 618, and a front end of the conductive windings 613.

In some implementations, the length L6 of the example motor assembly 610 may be between approximately 16.6 mm and 20.2 mm. In some examples, the length L6 may be smaller than or equal to approximately 18.4 mm. In some implementations, the diameter D6 of the example power tool 600 may be between approximately 45.9 mm and 56.1 mm. In some examples, the diameter D6 may be smaller than or equal to approximately 51.0 mm. In some implementations, an overall axial length of the example power tool 600 may be between approximately 88.8 mm and 108.6 mm. In some examples, the overall axial length of the example power tool 600 may be smaller than or equal to approximately 98.7 mm. In some implementations, an overall girth of the example power tool 600 may be between approximately 59.4 mm and 72.6 mm. In some examples, the overall girth of the example power tool 600 may be smaller than or equal to approximately 66.0 mm. In some implementations, an axial length from a front end portion of the motor assembly 610 (i.e., frontmost part of the conductive windings 613) to a rear end portion of the carrier 126 i.e., rearmost part of the rear carrier plate 126A) is between approximately 6.7 mm and 8.9 mm. In some examples, the axial length from the front end portion of the motor assembly 610 to the rear end portion of the carrier 126 is smaller than or equal to approximately 8.5 mm, preferably smaller than or equal to approximately 8.1 mm, more preferably smaller than or equal to approximately 7.7 mm. In some implementations, an axial length from a rear end portion of the motor assembly 610 to a front end portion of the tool holder 170 is between approximately 84.5 mm and 103.3 mm. In some examples, the axial length from the rear end portion of the motor assembly 610 to the front end portion of the tool holder 170 is smaller than or equal to approximately 93.8 mm. In some implementations, an inner diameter of the ring gear mount 630 is between approximately 21.5 mm and 26.4 mm. In some examples, the inner diameter of the ring gear mount 630 is smaller than or equal to approximately 24.0 mm. In some implementations, an outer diameter of the ring gear mount 630 is between approximately 46.8 mm and 57.2 mm. In some examples, the outer diameter of the ring gear mount 630 is smaller than or equal to approximately 52.0 mm. In some examples, a maximum operating voltage of the removeable power tool battery pack coupled to the power tool is in the range of approximately 20V to 80V, and a nominal voltage of the battery pack is in the range of 18V to 72V. In some examples, a maximum output power of the motor assembly 610 is between approximately 396.0 W and 484.0 W when using a 20V battery pack, with a current drawn by the motor assembly 510 between approximately 22.0 amps and 27.0 amps. In some examples, the output power of the motor assembly 610 is greater than or equal to approximately 440 W when using a 20V max battery pack, with current drawn by the motor assembly 510 being greater than or equal to approximately 24.5 amps. Thus, in power tool 600, a ratio of the maximum power output of the motor assembly 610 to the axial length from the front end portion of the motor assembly 610 to the rear end portion of the carrier 126 is greater than or equal to approximately 47.2 W/mm, preferably greater than or equal to approximately 49.5 W/mm, more preferably greater than or equal to approximately 51.9 W/mm. In some implementations, an output torque of the example power tool 600 is between approximately 1642.0 in-lbs and 2007 in-lbs when using a 20V max battery pack. In some examples, the output torque of the example power tool 600 is greater than or equal to approximately 1825 in-lbs when using a 20V max battery pack. In some examples, the output torque of the example power tool 600 is greater than or equal to 2400 in-lbs.

FIGS. 7A-7L illustrate features of an example power tool 700, in accordance with implementations described herein. The example power tool 700 includes a motor assembly 710 having a shaftless rotor structure. The shaftless rotor structure may provide for modular assembly of the front motor bearing and the cam carrier bearing with the cam assembly, thus facilitating assembly of the example power tool 700, while still maintaining a reduced overall length and/or girth of the example power tool 700. The shaftless rotor structure of the motor assembly 710 includes an integrated fan interlocking structure, that allows the fan to rotate together with the rotor structure, without connection to a rotor shaft. Some features of the example power tool 700 are similar to features of the example power tool 100 described above with respect to FIGS. 1A-1E and/or the example power tools 200, 300, 400, 500, 600 described above with respect to FIGS. 2A-6B. Accordingly, duplicative detailed description thereof will not be repeated except as necessary.

Figure 7A:
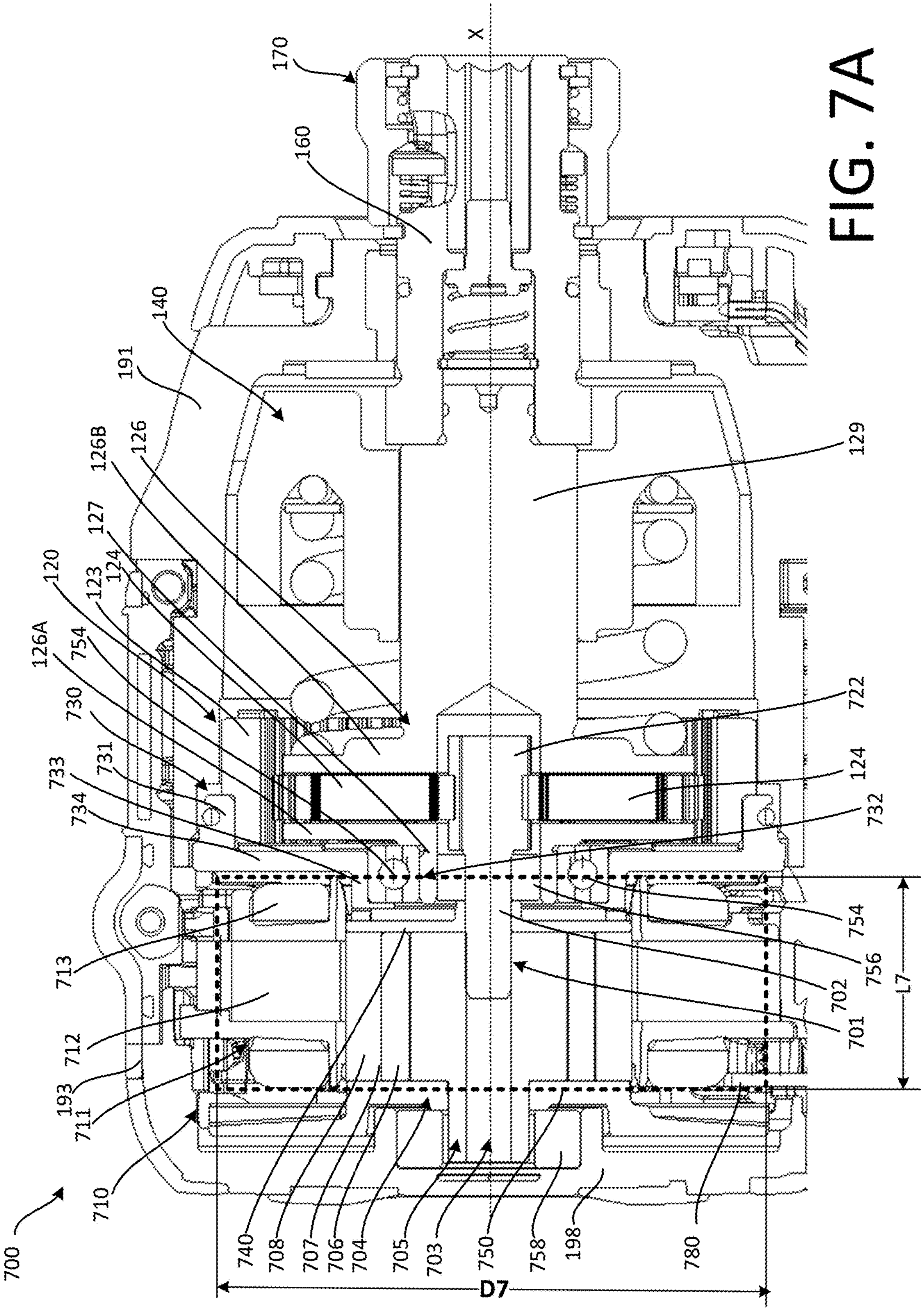
FIG. 7A is a partial cross-sectional view of an example power tool, in accordance with implementations described herein.
Figure 7B:
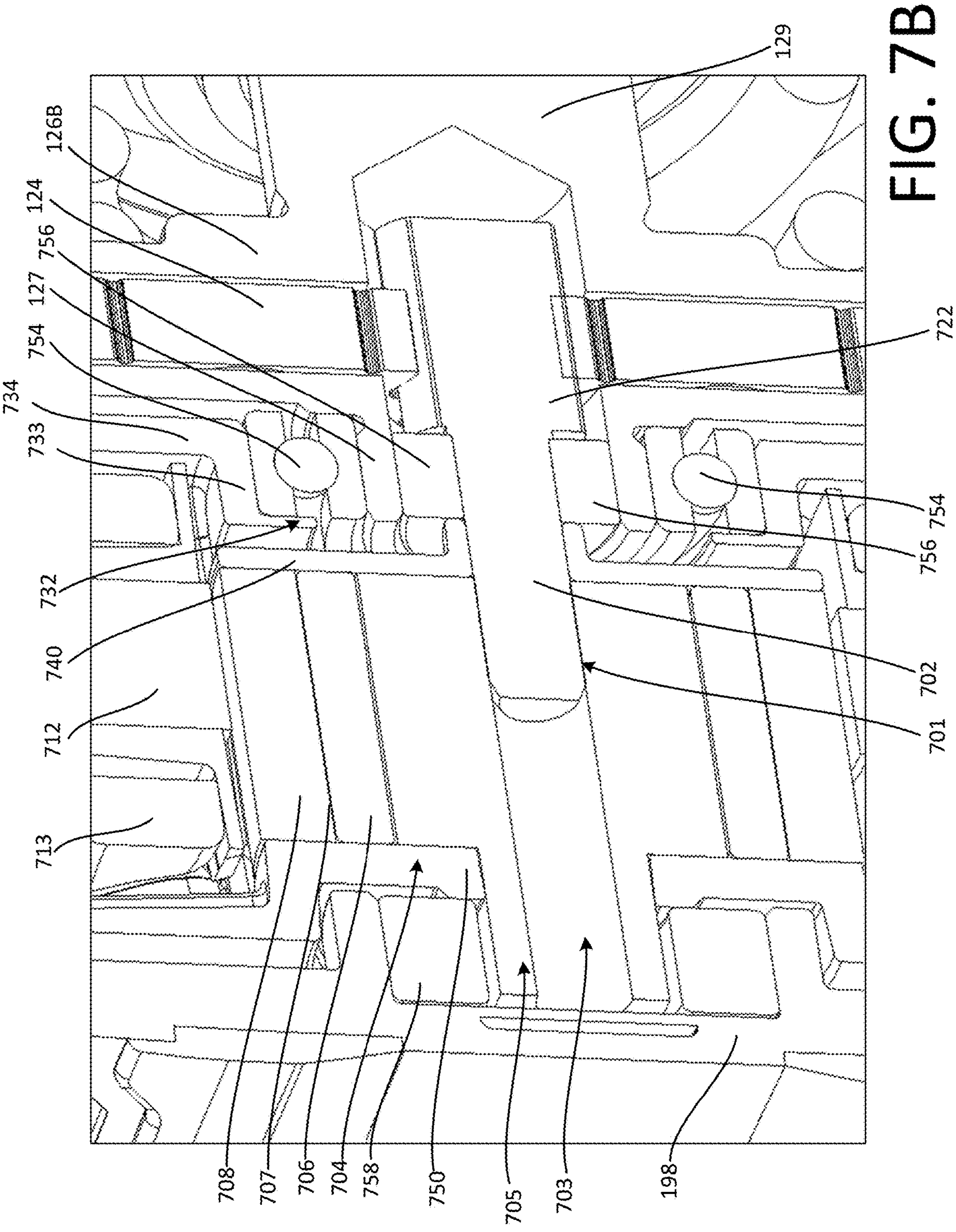
FIG. 7B is a close-in view of an example motor assembly of the example power tool shown in FIG. 7A.

FIG. 7A is a partial cross-sectional view, illustrating internal components of the example power tool 700, and FIG. 7B is a zoomed-in partial cross-sectional view of the internal components of the example power tool 700. As shown in FIGS. 7A and 7B, the example power tool 700 includes a motor assembly 710 and a ring gear mount 730 that are physically configured to provide for a reduced overall length and/or girth of the power tool 700 (for example, compared to an overall length and/or girth of the power tool 100 described above with respect to FIGS. 1A-IE). The motor assembly 710 includes a solid core rotor configuration, with embedded magnets.

As described above, the solid core rotor configuration including the embedded magnets does not form an annular recess in which the front motor bearing and/or the rear motor bearing and/or the cam carrier bearing can be accommodated. Rather, the example motor assembly 710 includes a ring gear mount 730 configured such that a front motor bearing can be radially aligned with a cam carrier bearing, and for both the front motor bearing and the cam carrier bearing to be substantially radially aligned with corresponding end portion(s) of stator windings of the motor assembly 710. In the example arrangement shown in FIGS. 7A and 7B, the cam carrier indexes, or sets a location for, or supports, a position of the front motor bearing. The configuration of the ring gear mount 730 allows for a reduced overall length of the example power tool 700 (for example compared to the overall length of the power tool 100 described above with respect to FIGS. 1A-IE) and/or an overall length that is less than or equal to the overall length of the example power tools 200, 300, 400, 500, 600 shown in FIGS. 2A-6B.

The example motor assembly 710 includes a rotor 704 including magnets 706 mounted in magnet pockets 707 formed in a rotor core 708. A stator assembly 711 positioned around the rotor 704 includes a stator core 712 including a series of conductive windings 713. As the phases of the stator assembly 711 are sequentially energized, they interact with the rotor magnets 706 to cause rotation of the rotor 704 relative to the stator assembly 711.

The ring gear mount 730 includes a cylindrical or rim-shaped portion 733, and a radial portion 734 extending radially outward from the rim-shaped portion 733 of the ring gear mount 730. The ring gear mount 730 includes an outer rim portion or a lip 731 projecting axially forward from the radial portion 734, for coupling with a corresponding portion of the housing 190. The rim-shaped portion 733 (for example, together with corresponding portions of the rear carrier plate 126A and the rearward projection 127 of the carrier 126) defines a bearing pocket 732 in which a cam carrier bearing 754 is received. In this example arrangement, the cam carrier bearing 754 is supported by the ring gear mount 730, and in particular, an outer race of the cam carrier bearing 754 is supported by the rim-shaped portion 733 of the ring gear mount 730. An inner race of the cam carrier bearing 754 is supported on the rearward projection 127 of the carrier 126, such that the inner race of the cam carrier bearing 754 rotates together with the carrier 126.

In the example shown in FIGS. 7A and 7B, a drive pin 701 has a first end portion that is fixedly coupled in the transmission assembly 120 during the manufacturing of the transmission assembly 120, and a second end portion that is received and fixedly coupled in the rotor 704 during the assembly of the motor and transmission into the power tool housing 190. In particular, the first end portion of the drive pin 701 defines a gear portion 722 that functions as a sun gear in the transmission assembly 120. In an example, the gear portion 722 of the drive pin 701 is in meshed engagement with the one or more planet gears 124 of the transmission assembly 120. The second end portion projects rearwardly through the rearward projection 127 of the cam carrier 126 and out of the transmission assembly 120. A shaft portion 702 formed at the second end portion of the drive pin 701 extends into an axial opening 703 formed in the rotor 704. In some examples, the shaft portion 702 of the drive pin 701 is press fit, or interference fit, into the axial opening 703 in the rotor 704 during the assembly step of the motor and transmission into the power tool housing 190. This ensures that the drive pin 701 is rotationally fixed to the rotor 704 within the power tool 700. In the example arrangement shown in FIGS. 7A and 7B, an axial length of the axial opening 703 in the rotor 704 is greater than an axial length of the shaft portion 702 of the drive pin 701.

In this example arrangement, a front motor bearing 756 is mounted on the shaft portion 702 of the drive pin 701, and is piloted, or set in position by the rearward projection 127 of the rear carrier plate 126A of the carrier 126. In particular, the rearward projection 127 is fitted between the front motor bearing 756 and the cam carrier bearing 754. In some examples, a rotor end cap 740, mounted on a front end of the rotor to retain the rotor magnets 706 within the magnet pockets 707 of the rotor core 708, may additionally engage a rear end of the front motor bearing 756, to provide for axial support of the front motor bearing 756 in an axial direction away from the transmission assembly 120. In this example arrangement, an outer race of the cam carrier bearing 754 is supported by the (stationary) ring gear mount 330, and an inner race of the cam carrier bearing 754 is supported by, and rotates with, the rearward projection 127 of the carrier 126. An outer race of the front motor bearing 756 is supported by the rearward projection 127 that rotates together with the carrier 126 and an inner race of the front motor bearing 756 is supported by and rotates with the shaft portion 702 of the drive pin 701. That is, in this example, the outer race of the front motor bearing 756 also rotates, but at a somewhat lower speed than the inner race of the front motor bearing 756.

In some examples, a fan 750 may be coupled to the rotor 704, so as to rotate together with the rotor 704. The fan 750 and/or the rotor 704 may include geometry that provides for interlocking of the fan 750 and the rotor 704, allowing the fan 750 to rotate together with the rotor 704, without the mounting of the fan 750 on a shaft extending from the rotor 704. This interlocking of the fan 750 and the rotor 704, rather than mounting the fan on a rotor shaft as is conventionally done, may facilitate the shaftless rotor structure. In an embodiment, the fan 750 is mounted on a protruded portion 705 of the rotor 704. In some examples, the fan 750 is contoured to allow a rear motor bearing 758, which is also seated on the protruded portion 705 of the rotor 704, to be located within a recessed portion 757 of the fan 750 and in radial alignment with at least a portion of the fan 750. In an embodiment, the rear motor bearing 758 is axially and radially supported by the tool cap 198 coupled to the rear end portion of the tool housing 190.

Figure 7C:
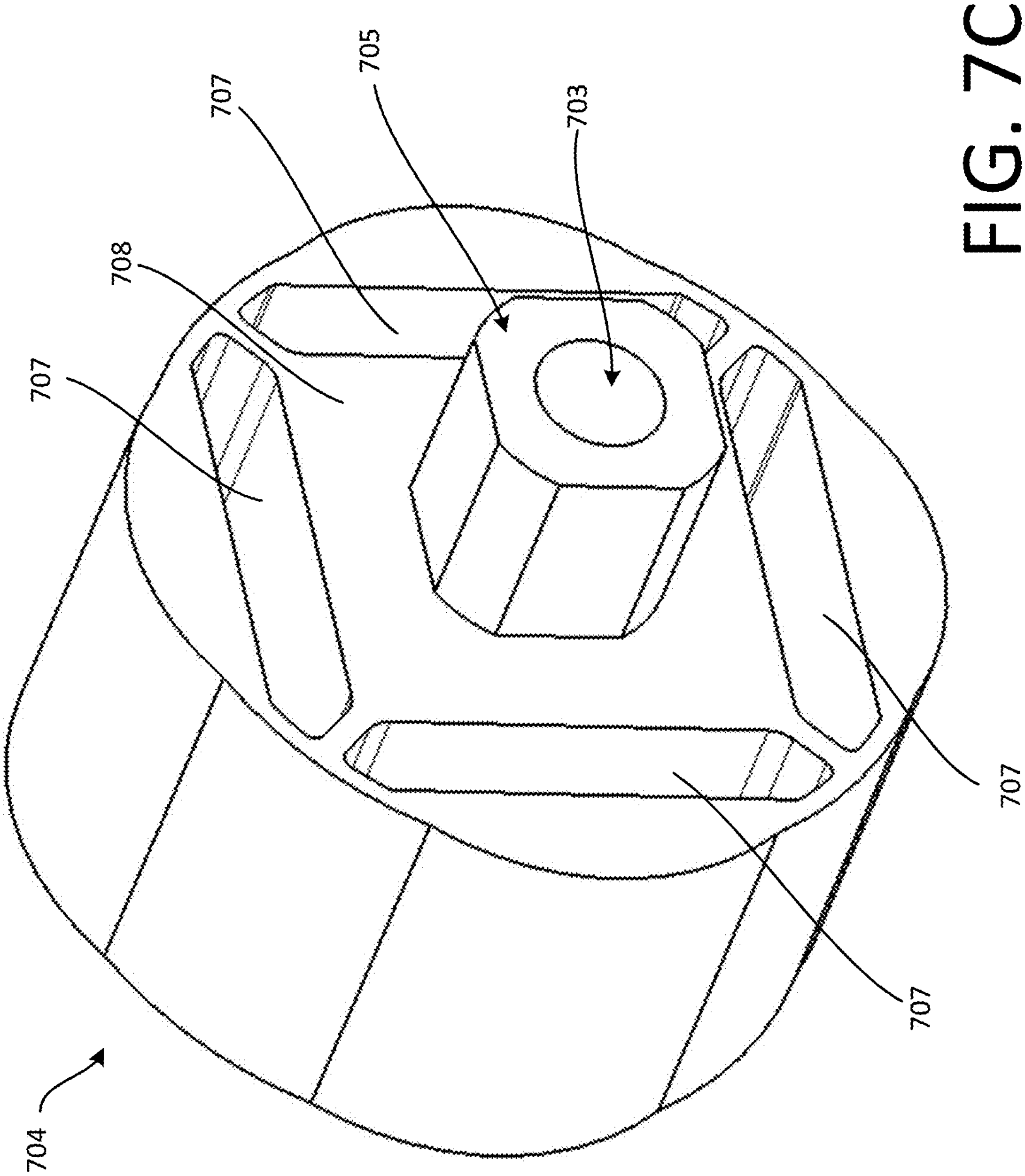
FIG. 7C is a perspective view of an example rotor of the example power tool shown in FIG. 7A.
Figure 7D:
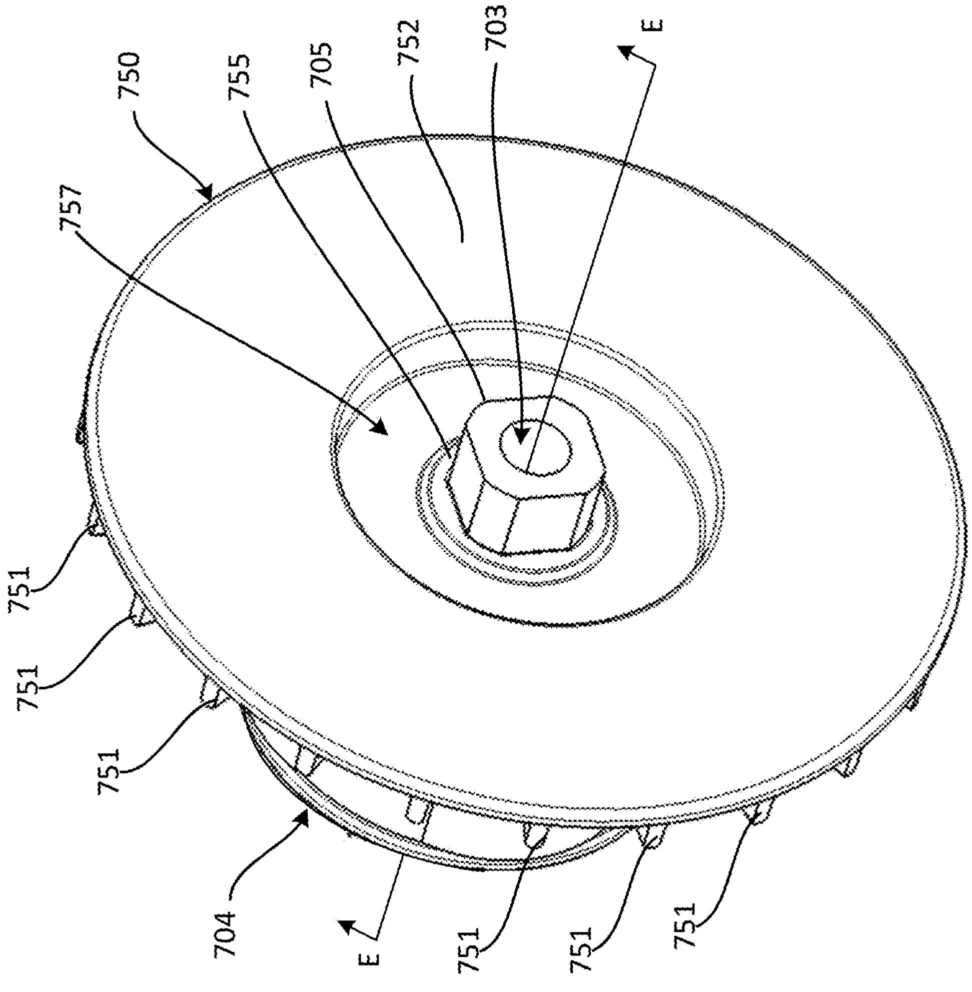
FIG. 7D is a perspective view of an example fan coupled to the example rotor shown in FIG. 7C.
Figure 7E:
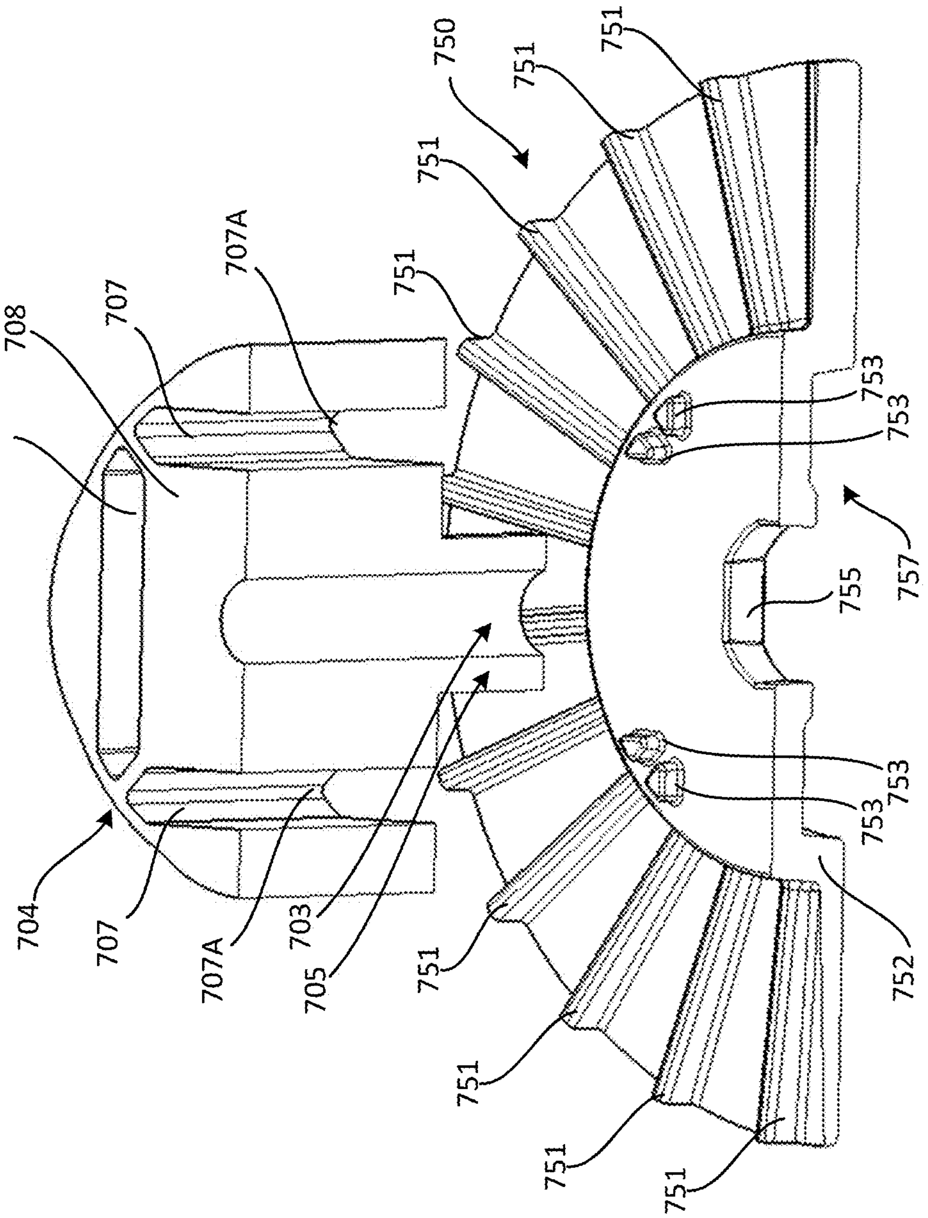
FIG. 7E is a disassembled cross-sectional view, taken along line E-E of FIG. 7D.
Figure 7F:
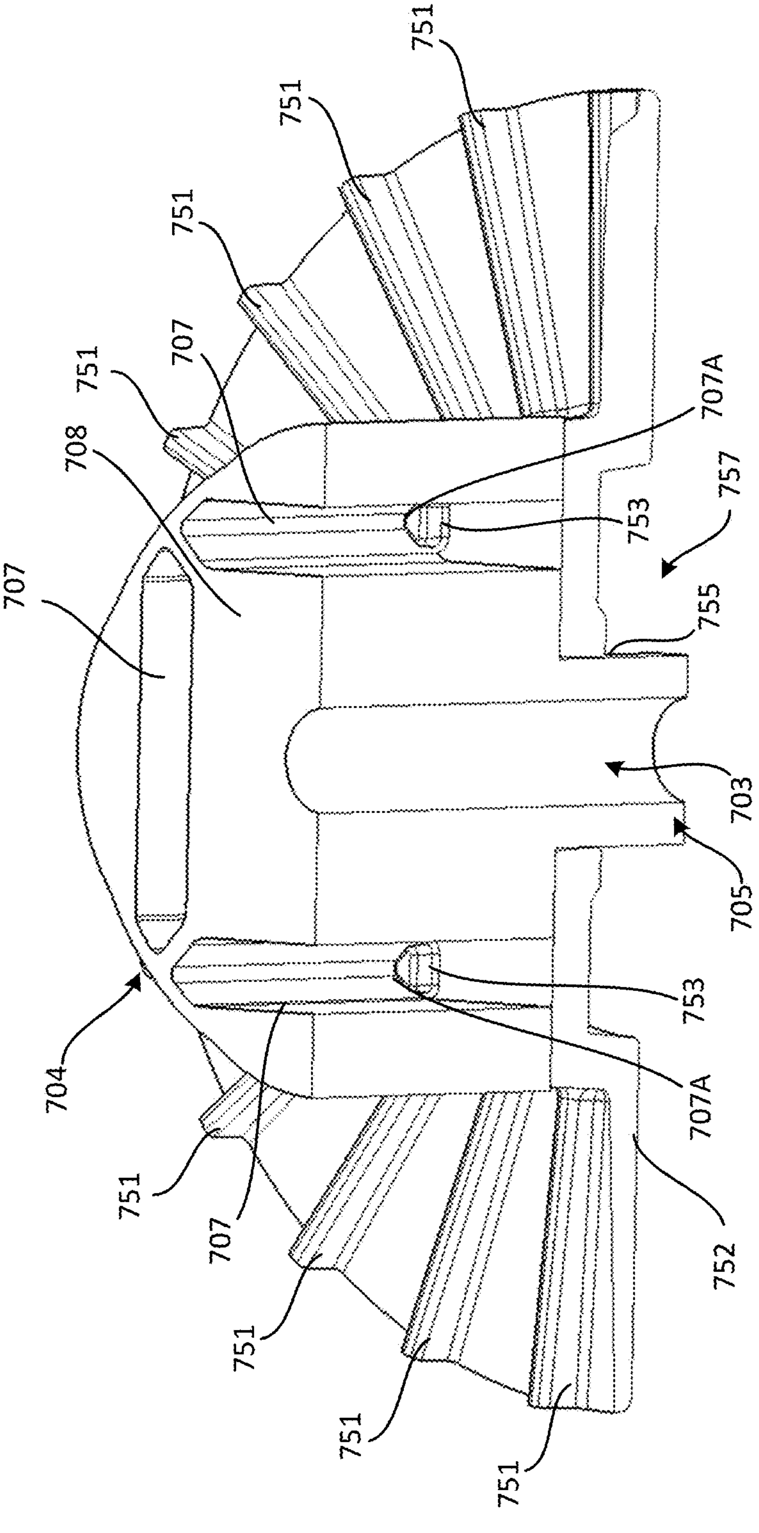
FIG. 7F is an assembled cross-sectional view, taken along line E-E of FIG. 7D.

FIG. 7C is a perspective view of the rotor 704. FIG. 7D is a perspective view of the fan 750 coupled to the rotor 704. FIG. 7E is a disassembled cross-sectional view, and FIG. 7F is an assembled cross-sectional view, of the fan 750 and the rotor 704, taken along line E-E of FIG. 7D.

As shown in FIGS. 7C-7F, the fan 750 includes a fan plate 752 having a central opening 755. In the assembled configuration, the protruded portion 705 of the rotor 704 is received through the central opening 755 in the fan plate 752. In an example, the protruded portion 705 includes a non-circular outer profile, in this example, with a square or circular outer cross-section. The center opening 755 of the fan plate 752 includes a corresponding profile. This arrangement allows transfer of rotational torque from the rotor 704 to the fan 750. The recessed portion 757 is formed on a first side of the fan plate 752, surrounding the central opening 755, to accommodate the rear motor bearing 758. The rear motor bearing 758 is received in the recessed portion 757 defined in the fan plate 752, so that positioning of the rear motor bearing 358 at the rear tool cap 198 does not pose a significant increase in the overall length of the motor assembly 710. A plurality of blades 751 are provided on a second side of the fan plate 752, for generating axial airflow through the example power tool 700 during operation. In some examples, a plurality of protrusions 753 are provided on the second side of the fan plate 752. The protrusions 753 may be positioned on a portion of the second side of the fan plate 752 corresponding to the recessed portion 757. The protrusions 753 may be positioned so as to correspond to positions of the magnet pockets 707 of the rotor 704 when the rotor 704 and the fan 750 are coupled. In some examples, a shape, or a contour, of each of the plurality of protrusions 753 may correspond to a shape, or a contour, of a corresponding end portion 707A of a magnet pocket 707 to which the protrusion 753 is to be coupled. Specifically, in an example, protrusions 753 are provided in pairs, each pair including two protrusions facing one another in a lateral direction and distance properly to fit into end portions 707A of a corresponding magnet pocket 707. Thus, the plurality of protrusions 753 may define geometric interlocking features that, together with the corresponding end portions 707A of the magnet pockets 707, provide for interlocking and coupling of the rotor 704 and the fan 750. This feature, alone or in cooperation with the protruded portion 705, ensures that the fan 750 is rotationally fixed to the rotor 704. Furthermore, in an example, each pair of protrusions 753 engages lateral sides of the rotor magnet 706 disposed within the corresponding magnet pocket 707 to mechanically retain the magnet 706, and protect the magnet against wobble and vibration within the magnet pocket 707.

Figure 7G:
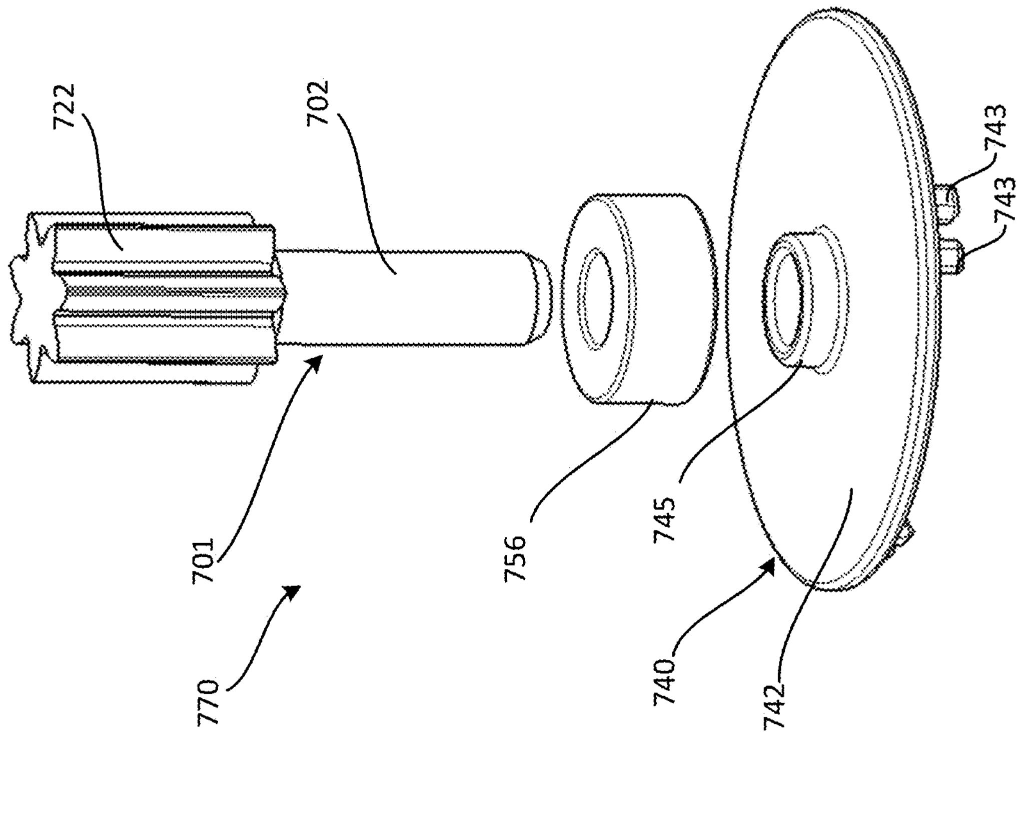
FIG. 7G is an exploded perspective view of an example drive assembly.
Figure 7H:
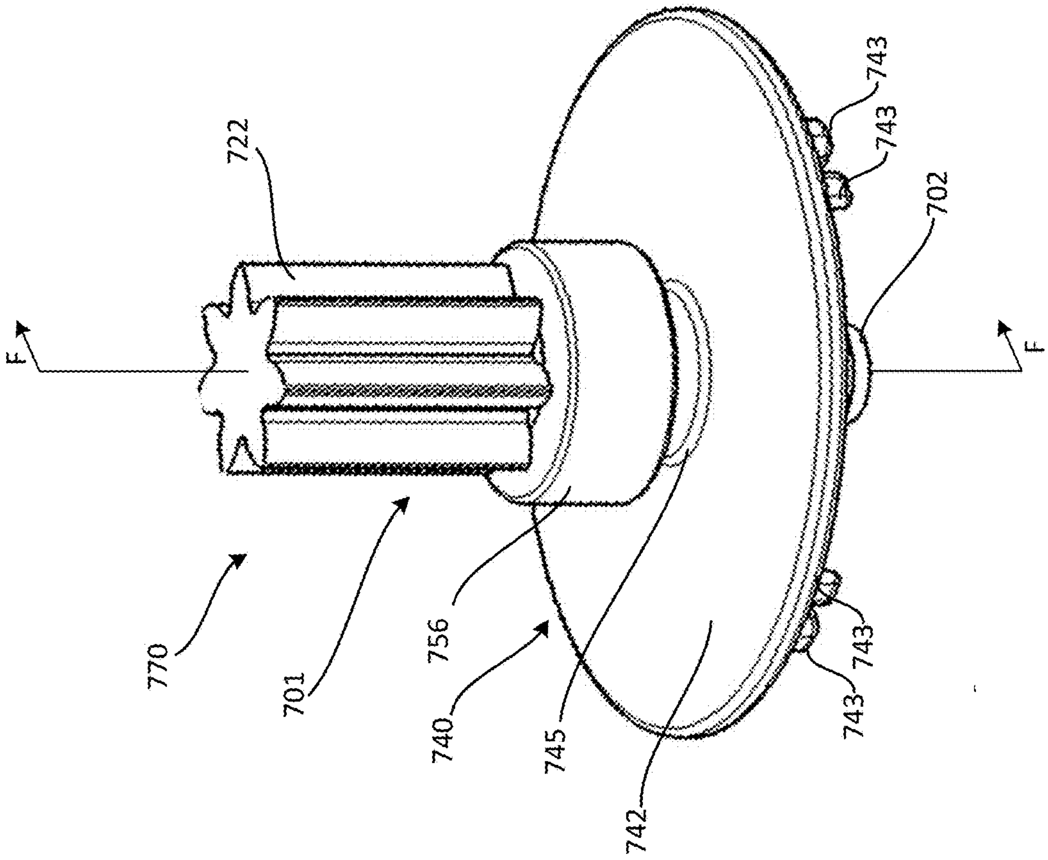
FIG. 7H is an assembled perspective view of the example drive assembly shown in FIG. 7F.
Figure 7I:
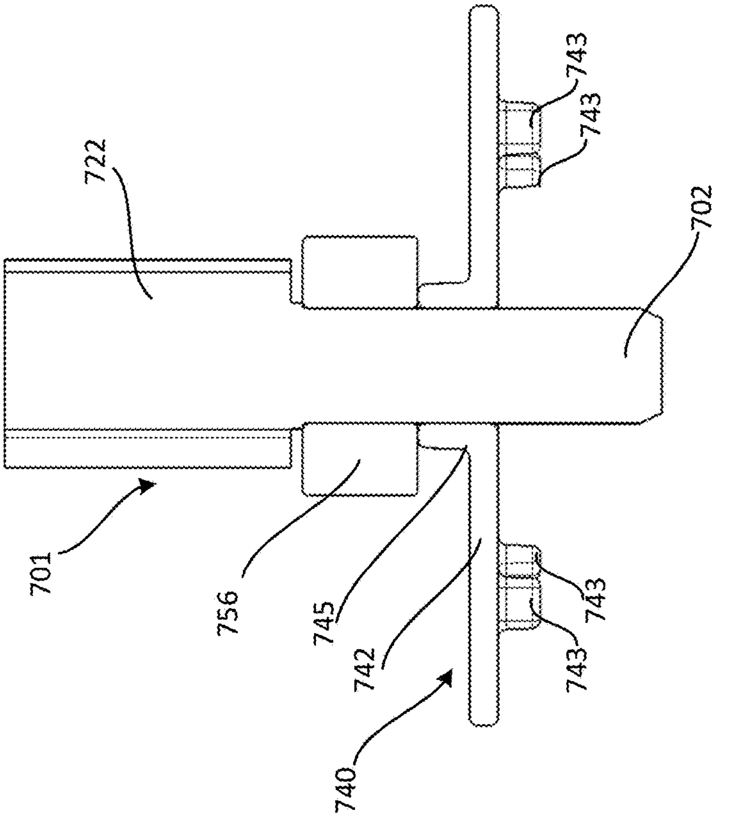
FIG. 7I is a cross-sectional view taken along line F-F of FIG. 7H.
Figure 7J:
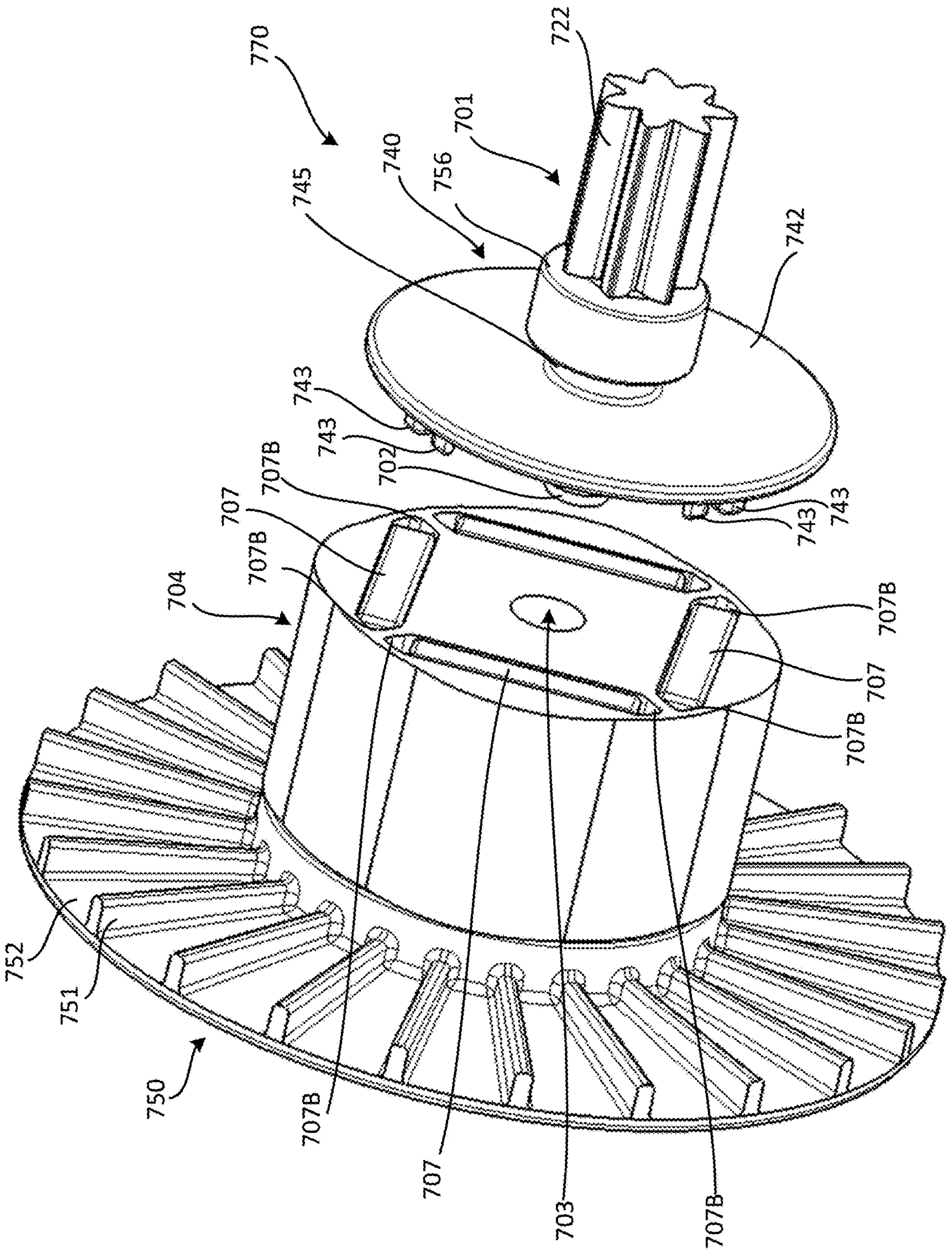
FIG. 7J is a partially assembled perspective view of an example fan, and example rotor, and the example drive assembly shown in FIGS. 7G and 7H.
Figure 7K:
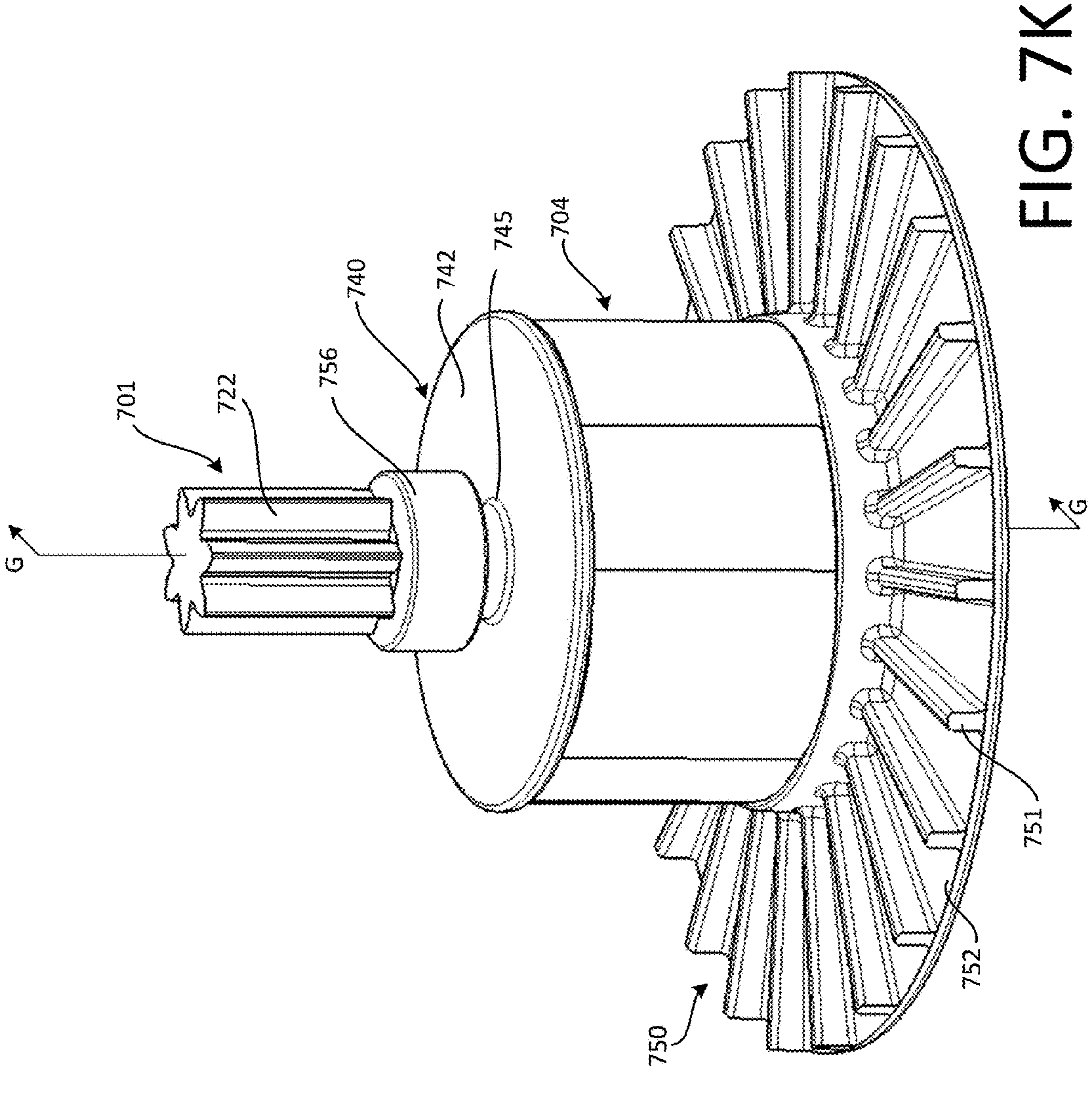
FIG. 7K is an assembled view of the example fan, the example rotor, and the example drive assembly.
Figure 7L:
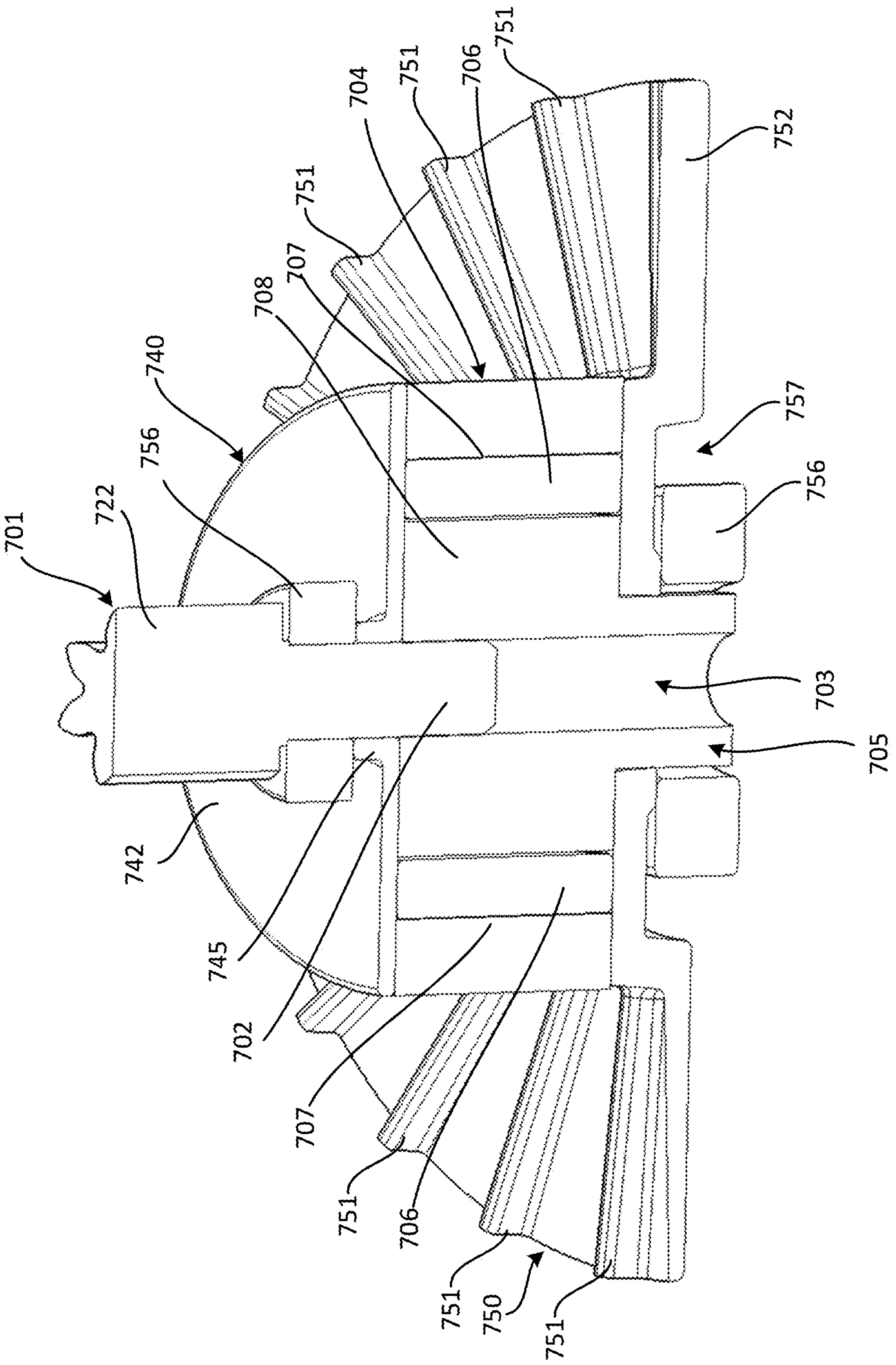
FIG. 7L is a cross-sectional view taken along line G-G of FIG. 7K.

FIG. 7G is an exploded perspective view, and FIG. 7H is an assembled perspective view, of a drive assembly 770 including the drive pin 701, the front motor bearing 756, and the rotor end cap 740. FIG. 7I is a cross-sectional view taken along line F-F of FIG. 7H. FIG. 7J is a partially assembled perspective view, and FIG. 7K is an assembled view, of the fan 750, the rotor 704, and the drive assembly. FIG. 7L is a cross-sectional view taken along line G-G of FIG. 7K.

As shown in FIGS. 7G-7K, the rotor end cap 740 includes a cap plate 742, with an opening 745 defined by an annular flange formed at a central portion of the cap plate 742. The shaft portion 702 of the drive pin 701 is received through the front motor bearing 756 and through the opening 745 in the central portion of the cap plate 742. In some examples, a plurality of protrusions 743 are formed on a side of the cap plate 742 configured to face the rotor 704. The protrusions 743 may be positioned similarly to, and in mirror opposite to, the protrusions 753 of the fan 750. In some examples, a shape, or a contour, of each of the plurality of protrusions 743 may correspond to a shape, or a contour, of a corresponding end portion 707B of a magnet pocket 707 to which the protrusion 743 is to be coupled. Thus, the plurality of protrusions 743 may define geometric interlocking features that, together with the corresponding end portions 707B of the magnet pockets 707, provide for interlocking and coupling of the rotor end cap 740 to the rotor 704. In an embodiment, the cap plate 742 may be securely mounted on the shaft portion 702 of the drive pin 701 via, e.g., press-fitting, so the rotor end cap 740 rotationally locks the drive pin 701 to the rotor 704.

The shaftless configuration of the rotor 704 provides for modular assembly of the drive system of the example power tool 700.

In the example power tool 700, the front motor bearing 756 is substantially radially aligned with the cam carrier bearing 754, and substantially radially aligned at least a front end of with the conductive windings 713, and the front motor bearing 756 and the cam carrier bearing 754 are at least partially received within a motor envelope 780 of the motor assembly 710. The motor envelope 780 may have a length L7 from the rear plane to the front plane and a diameter D7 defining a cylindrical boundary. In some examples, at least a portion of the front motor bearing 756 and at least a portion of the cam carrier bearing 754 are received within the motor envelope 780. In some examples, the length L7 associated with the motor assembly 710 of the example power tool 700 may be less than or equal to the length L2 associated with the motor assembly 210 shown in FIGS. 2A and 2B and/or the length L3 associated with the motor assembly 310 shown in FIGS. 3A and 3B and/or the length L4 associated with the motor assembly 410 shown in FIGS. 4A and 4B and/or the length L5 associated with the motor assembly 510 shown in FIGS. 5A and 5B and/or the length L6 associated with the motor assembly 610 shown in FIGS. 6A and 6B. In some examples, the diameter D7 associated with the motor assembly 710 of the example power tool 700 may be less than or equal to the diameter D2 associated with the motor assembly 210 shown in FIGS. 2A and 2B and/or the diameter D3 associated with the motor assembly 310 shown in FIGS. 3A and 3B and/or the diameter D4 associated with the motor assembly 410 shown in FIGS. 4A and 4B and/or the diameter D5 associated with the motor assembly 510 shown in FIGS. 5A and 5B and/or the diameter D6 associated with the motor assembly 610 shown in FIGS. 6A and 6B.

In some implementations, the length L7 of the example motor assembly 710 may be between approximately 16.5 mm and 20.1 mm. In some examples, the length L7 may be smaller than or equal to approximately 18.3 mm. In some implementations, the diameter D7 of the example power tool 700 may be between approximately 45.9 mm and 56.1 mm. In some examples, the diameter D7 may be smaller than or equal to approximately 51.0 mm. In some implementations, an overall axial length of the example power tool 700 may be between approximately 89.6 mm and 109.0 mm. In some examples, the overall axial length of the example power tool 700 may be smaller than or equal to approximately 99.5 mm. In some implementations, an overall girth of the example power tool 700 may be between approximately 59.4 mm and 72.6 mm. In some examples, the overall girth of the example power tool 700 may be smaller than or equal to approximately 66.0 mm. In some implementations, an axial length from a front end portion of the motor assembly 710 (i.e., frontmost part of the conductive windings 713) to a rear end portion of the carrier 126 i.e., rearmost part of the rear carrier plate 126A) is between approximately 3.2 mm and 5.2 mm. In some examples, the axial length from the front end portion of the motor assembly 710 to the rear end portion of the carrier 126 is smaller than or equal to approximately 4.7 mm, preferably smaller than or equal to approximately 4.3 mm, more preferably smaller than or equal to approximately 3.9 mm. In some implementations, an axial length from a rear end portion of the motor assembly 710 to a front end portion of the tool holder 170 is between approximately 84.9 mm and 103.8 mm. In some examples, the axial length from the rear end portion of the motor assembly 710 to the front end portion of the tool holder 170 is smaller than or equal to approximately 93.4 mm. In some implementations, an inner diameter of the ring gear mount 730 is between approximately 18.9 mm and 23.1 mm. In some examples, the inner diameter of the ring gear mount 730 is smaller than or equal to approximately 21.0 mm. In some implementations, an outer diameter of the ring gear mount 730 is between approximately 46.8 mm and 57.2 mm. In some examples, the outer diameter of the ring gear mount 730 is smaller than or equal to approximately 52.0 mm. In some examples, a maximum operating voltage of the removeable power tool battery pack coupled to the power tool is in the range of approximately 20V to 80V, and a nominal voltage of the battery pack is in the range of 18V to 72V. In some examples, a maximum output power of the motor assembly 710 is between approximately 396.0 W and 484.0 W when using a 20V battery pack, with a current drawn by the motor assembly 310 between approximately 22.0 amps and 27.0 amps. In some examples, the output power of the motor assembly 710 is less than or equal to approximately 440 W when using a 20V max battery pack, with current drawn by the motor assembly 710 being greater than or equal to approximately 24.5 amps. Thus, in power tool 700, a ratio of the maximum power output of the motor assembly 710 to the axial length from the front end portion of the motor assembly 710 to the rear end portion of the carrier 126 is greater than or equal to approximately 93.2 W/mm, preferably greater than or equal to approximately 97.7 W/mm, more preferably greater than or equal to approximately 103 W/mm. In some implementations, an output torque of the example power tool 700 is between approximately 1642.0 in-lbs and 2007 in-lbs when using a 20V max battery pack. In some examples, the output torque of the example power tool 700 is greater than or equal to approximately 1825 in-lbs when using a 20V max battery pack. In some examples, the output torque of the example power tool 700 is greater than or equal to 2400 in-lbs.

Figure 8A:
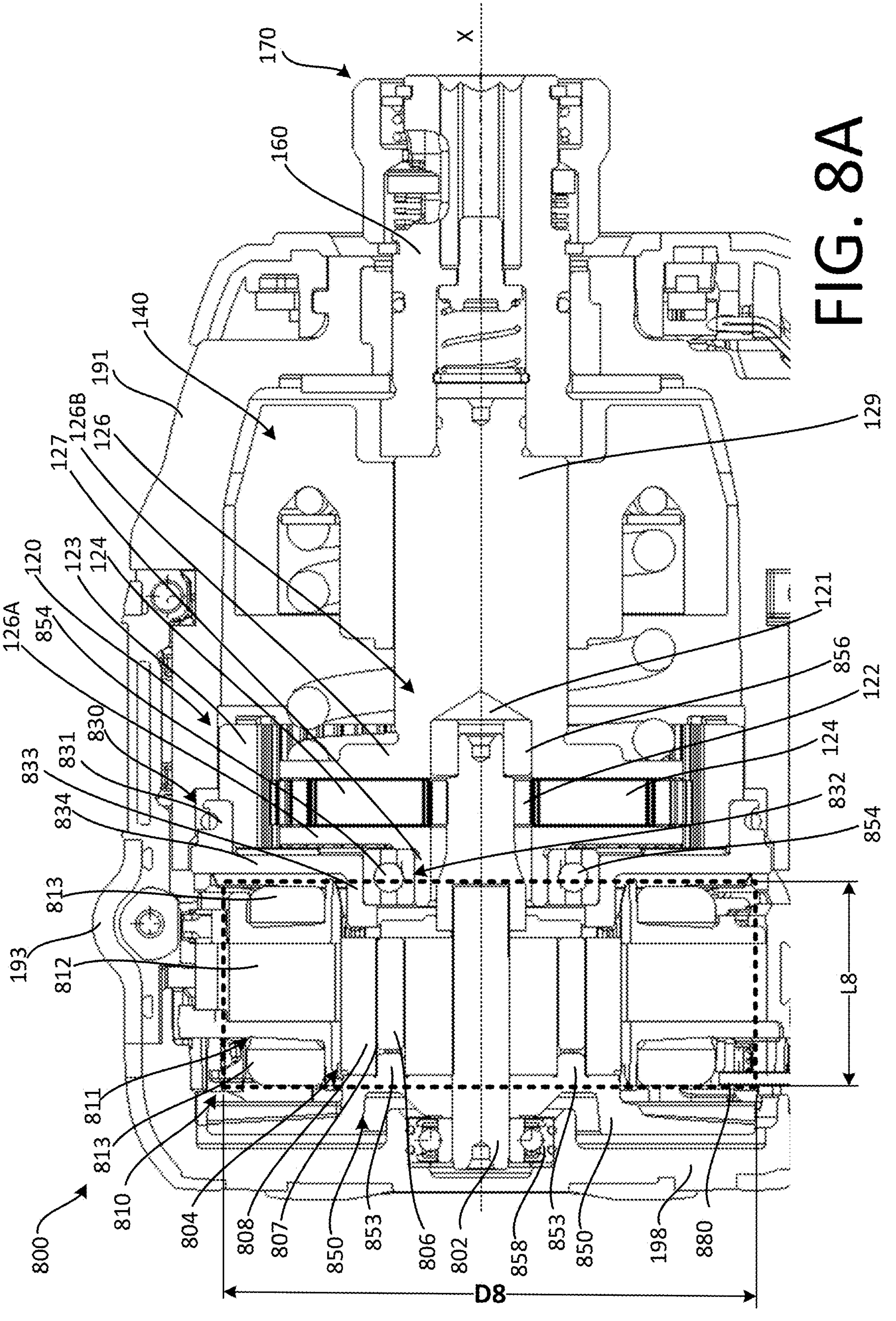
FIG. 8A is a partial cross-sectional view of an example power tool, in accordance with implementations described herein.
Figure 8B:
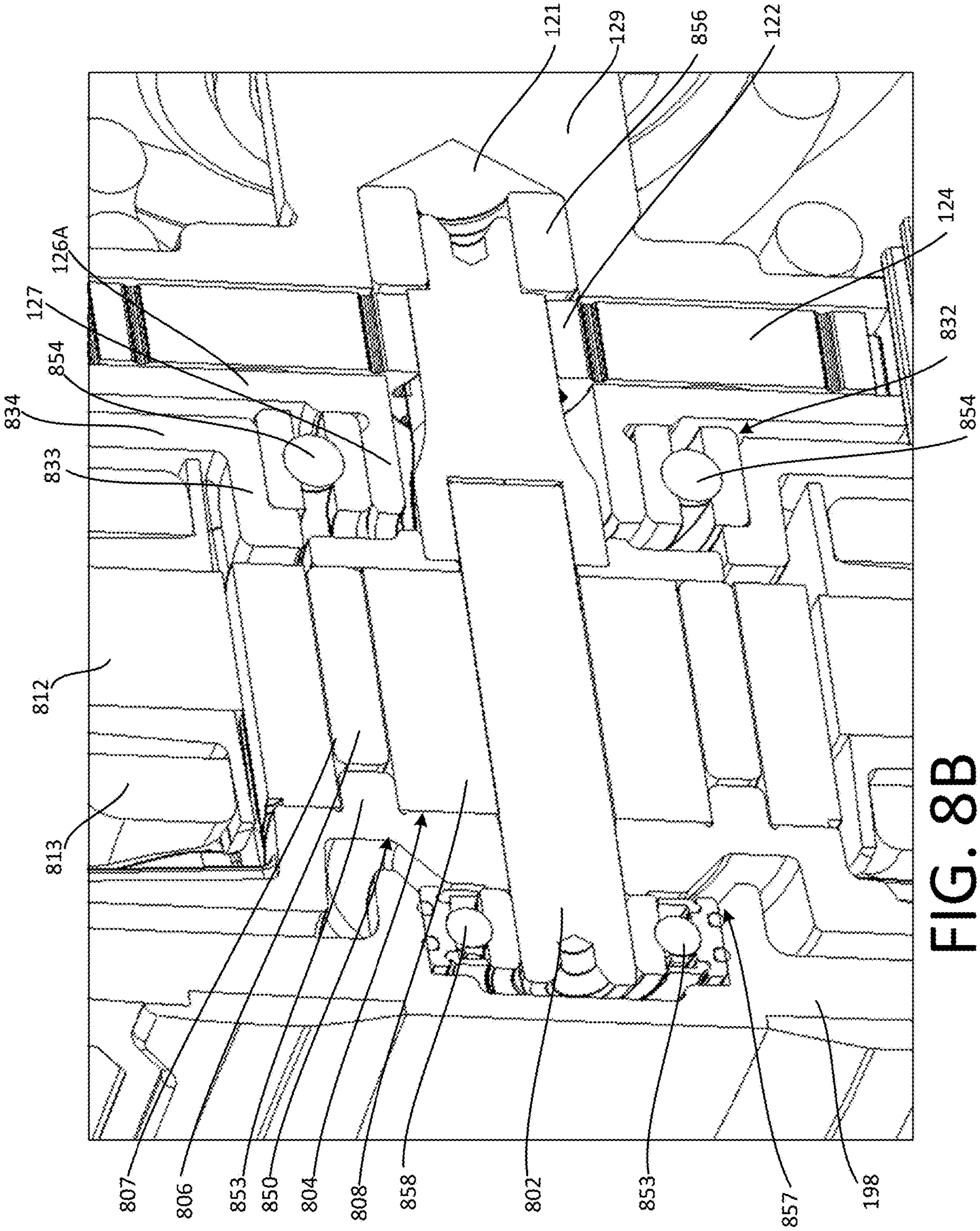
FIG. 8B is a close-in view of an example motor assembly of the example power tool shown in FIG. 8A.
Figure 8C:
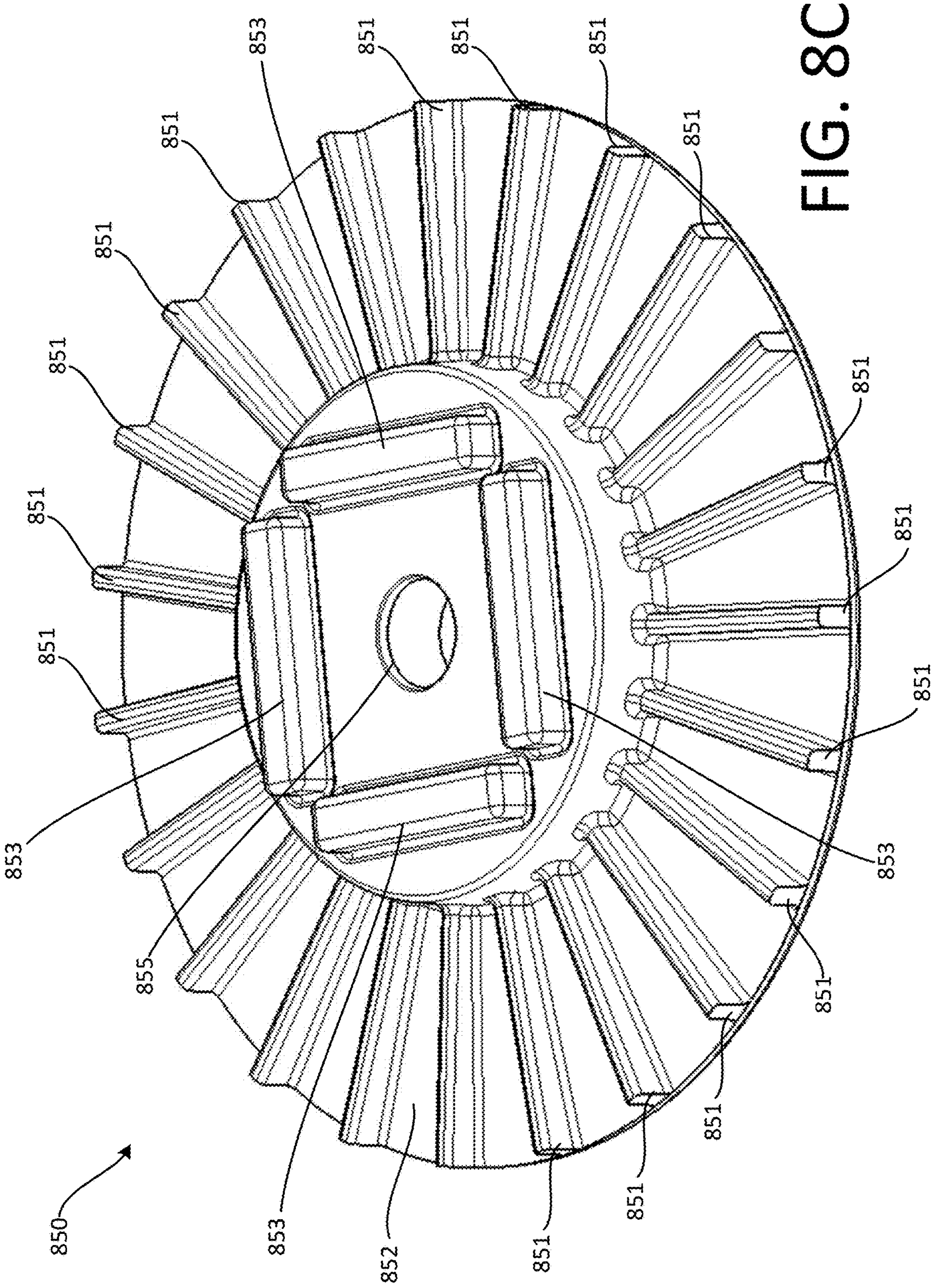
FIG. 8C is a perspective view of an example fan of the example power tool shown in FIG. 8A.

FIGS. 8A and 8B present an example power tool 800, in accordance with implementations described herein. In particular, FIG. 8A is a partial cross-sectional view illustrating internal components of the example power tool 800, and FIG. 8B is a zoomed-in partial cross-sectional view of the internal components of the example power tool 800. FIG. 8C is a perspective view of an example fan 850 of the example power tool 800.

The example power tool 800 shown in FIGS. 8A and 8B includes a motor assembly and a ring gear mount that are physically configured to provide for a reduced overall length and/or girth of the power tool (for example, compared to an overall length and/or girth of the power tool 100 described above with respect to FIGS. 1A-1E), together with the fitting of a front motor bearing within a bearing pocket defined in a cavity formed within a cam shaft. Many features of the example power tool 800 are similar to features of the power tool 100 described above with respect to FIGS. 1A-1E and/or the example power tools 200, 300, 400, 500, 600, 700 described above with respect to FIGS. 2A-7L. Thus, duplicative detailed description thereof will not be repeated except as necessary.

In the example shown in FIGS. 8A and 8B, the motor assembly 810 includes a solid core rotor configuration, with an embedded magnet configuration. As described above, due to the solid core rotor configuration including the embedded, an annular recess is not formed within the motor assembly 810 in which the front motor bearing and/or the rear motor bearing and/or the cam carrier bearing can be accommodated. Rather, in the example motor assembly 810 shown in FIGS. 8A and 8B, the front motor bearing 856 is received in a bearing pocket defined in a cavity 121 formed in the cam shaft 129 of the carrier 126, with a ring gear mount 830 configured such that the cam carrier bearing 854 can be substantially radially aligned with corresponding end portion(s) of stator windings of the motor assembly 810. In the example power tool 800 shown in FIGS. 8A-8C, a geometric interlocking structure allows a fan 850 to be coupled to and rotate together with a rotor 804 of the motor assembly 810. The press fit of the front motor bearing 856 in the bearing pocket defined in the cavity 121 formed in the cam shaft 129 of the carrier 126, with the cam carrier bearing 756 at least partially accommodated within a motor envelope of the motor assembly 810, alone or together with the geometric interlocking of the fan 850 and the rotor 804, allows for a reduced overall length of the example power tool 800 (for example compared to the overall length of the example power tool 100 described above with respect to FIGS. 1A-1E) and/or an overall length that is less than or equal to the overall length of the example power tools 200, 300, 400, 500, 60, 700 shown in FIGS. 2A-7L.

The example motor assembly 810 includes a rotor 804 including magnets 806 mounted in magnet pockets 807 formed in a rotor core 808 mounted on a rotor shaft 802. In this internal permanent magnet configuration, the rotor magnets 806 are essentially embedded in the rotor core 808. A stator assembly 811 is positioned around the rotor 804. The stator assembly 811 includes a stator core 812 having a series of teeth projecting radially inward from the stator core 812, and a series of conductive windings 813 wound around the stator teeth. As the phases of the stator assembly 811 are sequentially energized, they interact with the rotor magnets 806 to cause rotation of the rotor 804 relative to the stator assembly 811.

In the example shown in FIGS. 8A and 8B, the ring gear mount 830 includes a cylindrical or rim-shaped portion 833, and a radial portion 834 extending radially outward from a first axial end portion of the rim-shaped portion 833. An outer rim portion or a lip 831 projects axially forward from the radial portion 834, for coupling with a corresponding portion of the 8 tool housing 190, and for receiving and supporting a component of the transmission assembly 120, such as the ring gear 123.

In the example arrangement shown in FIGS. 8A and 8B, the front motor bearing 856 is received within the bearing pocket defined by the cavity 121 formed in the cam shaft 129 of the carrier 126. In particular, in this example arrangement, the front motor bearing 856 is fitted on an end portion of the pinion forming the sun gear 122, and is press fit within the walls of the cavity 121. In this example, the rim-shaped portion 833 (for example, together with corresponding portions of the rear carrier plate 126A and the rearward projection 127 of the carrier 126) defines a bearing pocket 832 in which the cam carrier bearing 854 is received. Thus, in this example arrangement, the cam carrier bearing 854 remains radially aligned with at least the front end of the conductive windings 813 of the stator assembly 811, at least partially received within the motor envelope 880, while the front motor bearing 856 has been positioned axially forward of the cam carrier bearing 854.

In some examples, axial position of the front motor bearing 856 in this manner provides additional space available in the area of the cam carrier bearing 854. In some examples, this additional space may be used to accommodate a larger, more robust cam carrier bearing 854 as may be required by the torque and power output of the power tool, increasing surface area contact between the cam carrier cam carrier bearing 854 and the ring gear mount 830. In some examples, this additional space may be used to accommodate an increase in size of the rim-shaped portion 833 of the ring gear mount 830, to provide more robust support to the cam carrier bearing 854. In some examples, this additional space may be used to accommodate both a larger cam carrier bearing 854 and also a larger rim-shaped portion 833 of the ring gear mount 830. A more robust cam carrier bearing 854 and/or more robust support of the cam carrier bearing 854 (by a larger rim-shaped portion 833 of the ring gear mount 830) may provide improved resistance to axial rearward movement of the impact mechanism 140 during operation of the example power tool 800 in the impact mode of operation, i.e., rearward axial movement of the impact mechanism 140 toward/into the motor envelope 880. In some examples, a more robust cam carrier bearing 854 and/or more robust support of the cam carrier bearing 854 (by a larger rim-shaped portion 833 of the ring gear mount 830) may direct forces generated due to operation of the impact mechanism 140 back into the housing 190 via the ring gear mount 830, thus reducing vibration experienced by the user operating the power tool 800 in the impact mode of operation. In an embodiment, a thickness of the cam carrier bearing 854 as defined as the radial distance between its inner and outer race is greater than or equal to approximately 30% of the radius of the rotor core 808.

In this example arrangement, the outer race of the cam carrier bearing 454 is supported by the rim-shaped portion 833 of the ring gear mount 830, which is fixed to the housing 190 and thus remains substantially stationary. The inner race of the cam carrier bearing 854 is supported on the rearward projection 127 of the carrier 126, such that the inner race of the cam carrier bearing 854 rotates together with the carrier 126, while the outer race of the cam carrier bearing 854 remains substantially stationary.

In the example arrangement shown in FIGS. 8A and 8B, the press fit of the front motor bearing 856 in the bearing pocket defined by the cavity 121 of the cam shaft 129 limits axial movement of the front motor bearing 856 relative to the carrier 126. The inner race of the front motor bearing 856 is fitted on a distal end portion of the pinion that is coupled on the rotor shaft 802, and that includes the sun gear 122, such that the inner race of the front motor bearing 856 rotates together with/at substantially the same rotational speed as the rotor shaft 402/sun gear 122. The outer race of the front motor bearing 856 is press fit in the cavity 121 formed in the cam shaft 129, such that the outer race of the front motor bearing 856 rotates together with/at substantially the same rotational speed as the carrier 126. Thus, the outer race of the front motor bearing 856 rotates at a slower speed than the inner race of the front motor bearing 856.

In some examples, a fan 850 may be coupled to the rotor 804, so as to rotate together with the rotor 804. The fan 850 and/or the rotor 804 may include geometry that provides for interlocking of the fan 850 and the rotor 804, such that the fan 850 rotates together with the rotor 804. In an example, the fan 850 may be slip fit on the rotor shaft 802 without an intermediary bushing. The interlock mechanism described transmits rotational torque from the rotor 804 to the fan 850 without a need to rigidly mount the fan 850 on the rotor shaft 802. In some examples, a rear motor bearing 858 is seated on a rear end portion of the rotor shaft 802, within a recessed portion 857 of the fan 850, and axially supported by the tool cap 198 coupled to the rear end portion of the tool housing 190.

As shown in 8C, the fan 850 includes a fan plate 852 having a central opening 855. In the assembled configuration, the rotor shaft 802 is received through the central opening 855 in the fan plate 852. A recessed portion 857 (see FIG. 8B) is formed on a first side of the fan plate 852, surrounding the central opening 855, to accommodate the rear motor bearing 858 together with the tool cap 198. This positioning of the rear motor bearing 858 in the recessed portion 857 defined between the fan plate 852 and the tool cap 198 does not pose a significant increase in the overall length of the motor assembly 810. A plurality of blades 851 are provided on a second side of the fan plate 852, for generating axial airflow through the example power tool 800 during operation.

In some examples, a plurality of protrusions 853 are provided on the second side of the fan plate 852. The protrusions 853 may be so as to correspond to positions of the magnet pockets 807 of the rotor 804 when the rotor 804 and the fan 850 are coupled. In some examples, a shape, or a contour, of each of the plurality of protrusions 853 may correspond to a shape, or a contour, of a corresponding magnet pocket 807 in which the protrusion 853 is to be received. As shown in FIGS. 8A and 8B, in some examples, corresponding portions of the rotor core 808 extend beyond, or overhang, a position of rear end portions of the magnets 806 received in the magnet pockets 807. That is, an axial length of the magnet pockets 807 may be greater than an axial length of the corresponding magnets 806 received therein. Accordingly, in some examples, the protrusions 853 are inserted into axial end portions of the corresponding magnet pockets 807 not occupied by the magnets 806 received therein. Thus, the plurality of protrusions 853 may define geometric interlocking features that, together with the corresponding magnet pockets 807, provide for interlocking and coupling of the rotor 804 and the fan 850, such that the fan 850 rotates together with the rotor 804.

In the example power tool 800, the front motor bearing 856 has been moved axially forward, and the cam carrier bearing 854 is substantially radially aligned with the conductive windings 813, so as to be at least partially received within a motor envelope 880. The motor envelope 880 may have a length L8 from the rear plane to the front plane and a diameter D8 defining a cylindrical boundary. In some examples, the length L8 associated with the motor assembly 810 of the example power tool 800 may be less than or equal to the length L2 associated with the motor assembly 210 shown in FIGS. 2A and 2B and/or the length L3 associated with the motor assembly 310 shown in FIGS. 3A and 3B and/or the length L4 associated with the motor assembly 410 shown in FIGS. 4A and 4B and/or the length L5 associated with the motor assembly 510 shown in FIGS. 5A and 5B and/or the length L6 associated with the motor assembly 610 shown in FIGS. 6A and 6B and/or the length L7 associated with the motor assembly 710 shown in FIGS. 7A and 7B. In some examples, the diameter D8 associated with the motor assembly 810 of the example power tool 800 may be less than or equal to the diameter D2 associated with the motor assembly 210 shown in FIGS. 2A and 2B and/or the diameter D3 associated with the motor assembly 310 shown in FIGS. 3A and 3B and/or the diameter D4 associated with the motor assembly 410 shown in FIGS. 4A and 4B and/or the diameter D5 associated with the motor assembly 510 shown in FIGS. 5A and 5B and/or the diameter D6 associated with the motor assembly 610 shown in FIGS. 6A and 6B and/or the diameter D7 associated with the motor assembly 710 shown in FIGS. 7A and 7B.

In some implementations, the length L8 of the example motor assembly 810 may be between approximately 16.5 mm and 20.1 mm. In some examples, the length L8 may be smaller than or equal to approximately 18.2 mm. In some implementations, the diameter D8 of the example power tool 800 may be between approximately 45.9 mm and 56.1 mm. In some examples, the diameter 87 may be smaller than or equal to approximately 51.0 mm. In some implementations, an overall axial length of the example power tool 800 may be between approximately 89.6 mm and 109.0 mm. In some examples, the overall axial length of the example power tool 800 may be smaller than or equal to approximately 99.5 mm. In some implementations, an overall girth of the example power tool 800 may be between approximately 59.4 mm and 72.6 mm. In some examples, the overall girth of the example power tool 800 may be smaller than or equal to approximately 66.0 mm. In some implementations, an axial length from a front end portion of the motor assembly 810 (i.e., frontmost part of the conductive windings 813) to a rear end portion of the carrier 126 i.e., rearmost part of the rear carrier plate 126A) is between approximately 2.6 mm and 4.2 mm. In some examples, the axial length from the front end portion of the motor assembly 810 to the rear end portion of the carrier 126 is smaller than or equal to approximately 4.1 mm, preferably smaller than or equal to approximately 3.7 mm, more preferably smaller than or equal to approximately 3.3 mm. In some implementations, an axial length from a rear end portion of the motor assembly 810 to a front end portion of the tool holder 170 is between approximately 84.3 mm and 103.3 mm. In some examples, the axial length from the rear end portion of the motor assembly 710 to the front end portion of the tool holder 170 is smaller than or equal to approximately 92.8 mm. In some implementations, an inner diameter of the ring gear mount 730 is between approximately 18.9 mm and 23.1 mm. In some examples, the inner diameter of the ring gear mount 830 is smaller than or equal to approximately 21.0 mm. In some implementations, an outer diameter of the ring gear mount 830 is between approximately 46.8 mm and 57.2 mm. In some examples, the outer diameter of the ring gear mount 830 is smaller than or equal to approximately 52.0 mm. In some examples, a maximum operating voltage of the removeable power tool battery pack coupled to the power tool is in the range of approximately 20V to 80V, and a nominal voltage of the battery pack is in the range of 18V to 72V. In some examples, a maximum output power of the motor assembly 810 is between approximately 396.0 W and 484.0 W when using a 20V battery pack, with a current drawn by the motor assembly 310 between approximately 22.0 amps and 27.0 amps. In some examples, the output power of the motor assembly 810 is greater than or equal to approximately 440 W when using a 20V max battery pack, with current drawn by the motor assembly 710 being greater than or equal to approximately 24.5 amps. Thus, in power tool 800, a ratio of the maximum power output of the motor assembly 810 to the axial length from the front end portion of the motor assembly 810 to the rear end portion of the carrier 126 is greater than or equal to approximately 109 W/mm, preferably greater than or equal to approximately 114 W/mm, more preferably greater than or equal to approximately 120 W/mm. In some implementations, an output torque of the example power tool 800 is between approximately 1642.0 in-lbs and 2007 in-lbs when using a 20V max battery pack. In some examples, the output torque of the example power tool 800 is greater than or equal to approximately 1825 in-lbs when using a 20V max battery pack. In some examples, the output torque of the example power tool 800 is greater than or equal to 2400 in-lbs.

Figure 9:
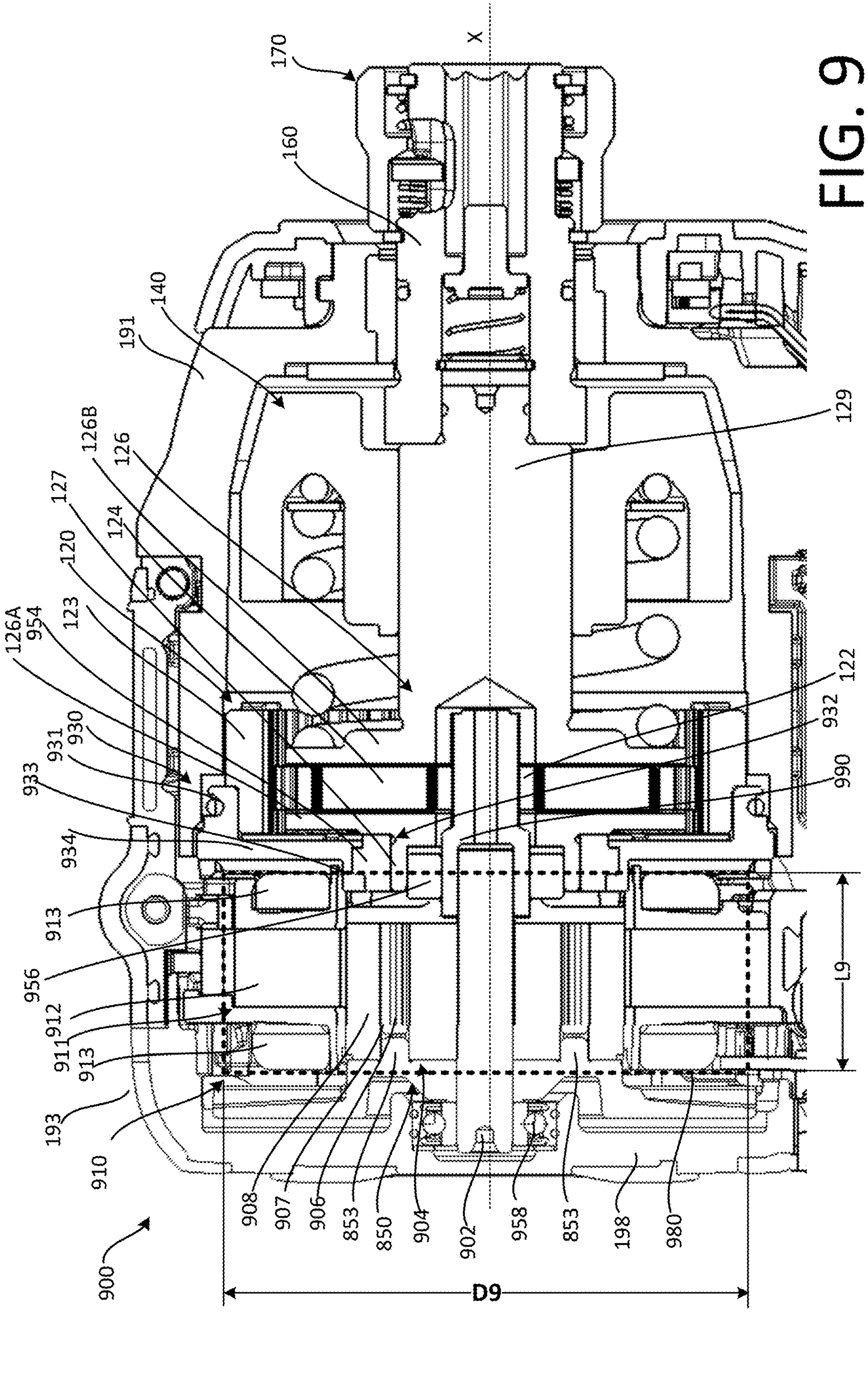
FIG. 9 is a partial cross-sectional view of an example power tool, in accordance with implementations described herein.

FIG. 9 presents an example power tool 900, in accordance with implementations described herein. In particular, FIG. 9 is a partial cross-sectional view illustrating internal components of the example power tool 900.

The example power tool 900 shown in FIGS. 3A and 3B includes a motor assembly 910 and a ring gear mount 930 that are physically configured to provide for a reduced overall length and/or girth of the power tool 900 (for example, compared to an overall length and/or girth of the example power tool 100 described above with respect to FIGS. 1A-1E). Many features of the example power tool 900 are similar to features of the example power tool 100 described above with respect to FIGS. 1A-1E and/or the example power tools 200, 300, 400, 500, 600, 700, 800 described above with respect to FIGS. 2A-8B. Thus, duplicative detailed description thereof will not be repeated except as necessary.

In the example shown in FIG. 9, the motor assembly 010 includes a solid core rotor configuration, including embedded magnets. In the example motor assembly 910 shown in FIG. 9, the solid core rotor configuration including the embedded magnets does not form an annular recess in which the front motor bearing and/or the rear motor bearing and/or the cam carrier bearing can be accommodated. Rather, the example motor assembly 910 includes a ring gear mount 930 configured such that a front motor bearing can be radially aligned with a cam carrier bearing, and for both the front motor bearing and the cam carrier bearing to be substantially radially aligned with corresponding end portion(s) of stator windings of the motor assembly 910. In this example arrangement, the cam carrier may index, or set a location for, or may support a position of the front motor bearing. The configuration of the ring gear mount 930 allows for a reduced overall length of the example power tool 900 (for example compared to the overall length of the example power tool 100 described above with respect to FIGS. 1A-1E) and/or an overall length that is less than or equal to the overall length of the example power tools 200, 300, 400, 500, 600, 700, 800 shown in FIGS. 2A-8B.

In some examples, the motor assembly 910 includes a rotor 904 including magnets 906 mounted in magnet pockets 907 formed in a rotor core 908. The example motor assembly 910 has an internal permanent magnet configuration in which the rotor magnets 906 are mounted in the magnet pockets 907 defined in the rotor core 908, such that the rotor magnets 906 are embedded in the rotor core 908. The rotor core 908 is mounted on the rotor shaft 902. A stator assembly 911 is positioned around the rotor 904. The stator assembly 911 includes a stator core 912 having a series of teeth projecting radially inward from the stator core 912, and a series of conductive windings 913 wound around the stator teeth.

The example ring gear mount 930 includes a cylindrical or rim-shaped portion 933, and a radial portion 934 extending radially outward from the rim-shaped portion 933 of the ring gear mount 930. The ring gear mount 930 includes an outer rim portion or a lip 931 projecting axially forward from the radial portion 934, for coupling with a corresponding portion of the housing 190, and for receiving and supporting a component of the transmission assembly 120, such as the ring gear 123. The rim-shaped portion 933 (for example, together with corresponding portions of the rear carrier plate 126A and the rearward projection 127 of the carrier 126) defines a bearing pocket 932 in which a cam carrier bearing 954 is received.

A front motor bearing 956 is mounted on a pinion 990 which is in turn mounted on the rotor shaft 902, and is piloted, or set in position, or supported by, by the rearward projection 127 of the rear carrier plate 126A of the carrier 126. In this example arrangement, the rearward projection 127 is fitted between the front motor bearing 956 and the cam carrier bearing 954. Thus, in this example arrangement, an outer race of the cam carrier bearing 954 is supported by the (stationary) ring gear mount 930, with an inner race being supported by and rotating with the rearward projection 127 of the carrier 126. The front motor bearing 356 is supported by the rearward projection 127, that rotates with the carrier 126. That is, in this example, the outer race of the front motor bearing 356 rotates together with the carrier 126, at a somewhat lower speed than the inner race of the front motor bearing 956 that rotates together with the rotor shaft 902, via the coupling of the pinion 990 to the rotor shaft 902.

In the example arrangement shown in FIG. 9, the front motor bearing 956 is in an axially rearward position, such that the front motor bearing 956 is substantially radially aligned with the cam carrier bearing 954, and substantially radially aligned with the conductive windings 913, and the front motor bearing 956 and the cam carrier bearing 954 are at least partially received within a motor envelope 980 of the motor assembly 910. The motor envelope 980 may have a length L9 from a rear plane to a front plane and a diameter D9 of a cylindrical boundary. In some examples, at least a portion of the front motor bearing 956 and at least a portion of the cam carrier bearing 954 are received within the motor envelope 980.

In some examples, a fan, such as the fan 850 described above with respect to FIGS. 8A and 8B, may be coupled to the rotor 904, so as to rotate together with the rotor 904. The fan 850 and/or the rotor 904 may include geometry that provides for interlocking of the fan 850 and the rotor 904, such that the fan 850 rotates together with the rotor 904. In some examples, a rear motor bearing 958 is seated on a rear end portion of the rotor shaft 902, within the recessed portion 857 of the fan 850, and axially supported by the tool cap 198 coupled to the rear end portion of the tool housing 190.

The plurality of protrusions 853 provided on the second side of the fan plate 852 may be positioned to correspond to positions of the magnet pockets 907 of the rotor 904 when the rotor 904 and the fan 850 are coupled. In some examples, a shape, or a contour, of each of the plurality of protrusions 853 may correspond to a shape, or a contour, of a corresponding magnet pocket 907 in which the protrusion 853 is to be received. Corresponding portions of the rotor core 908 extend beyond, or overhang, a position of the magnets 906 received in the magnet pockets 907. That is, an axial length of the magnet pockets 907 may be greater than an axial length of the corresponding magnets 906 received therein, so that the protrusions 853 may be inserted into axial end portions of the corresponding magnet pockets 907 not occupied by the magnets 906 received therein. Thus, the plurality of protrusions 853 may define geometric interlocking features that, together with the corresponding magnet pockets 907, provide for interlocking and coupling of the rotor 904 and the fan 850, such that the fan 850 rotates together with the rotor 904.

In the example power tool 900, the front motor bearing 956 and the cam carrier bearing 954 are substantially radially aligned, and at least partially received within the motor envelope 980. In some examples, the length L9 associated with the motor assembly 910 of the example power tool 900 may be less than or equal to the length L2 associated with the motor assembly 210 shown in FIGS. 2A and 2B and/or the length L3 associated with the motor assembly 310 shown in FIGS. 3A and 3B and/or the length L4 associated with the motor assembly 410 shown in FIGS. 4A and 4B and/or the length L5 associated with the motor assembly 510 shown in FIGS. 5A and 5B and/or the length L6 associated with the motor assembly 610 shown in FIGS. 6A and 6B and/or the length L7 associated with the motor assembly 710 shown in FIGS. 7A and 7B and/or the length L8 associated with the motor assembly 810 shown in FIGS. 8A and 8B. In some examples, the diameter D9 associated with the motor assembly 910 of the example power tool 900 may be less than or equal to the diameter D2 associated with the motor assembly 210 shown in FIGS. 2A and 2B and/or the diameter D3 associated with the motor assembly 310 shown in FIGS. 3A and 3B and/or the diameter D4 associated with the motor assembly 410 shown in FIGS. 4A and 4B and/or the diameter D5 associated with the motor assembly 510 shown in FIGS. 5A and 5B and/or the diameter D6 associated with the motor assembly 610 shown in FIGS. 6A and 6B and/or the diameter D7 associated with the motor assembly 710 shown in FIGS. 7A and 7B and/or the diameter D8 associated with the motor assembly 810 shown in FIGS. 8A and 8B.

In some implementations, the length L9 of the example motor assembly 910 may be between approximately 16.5 mm and 20.1 mm. In some examples, the length L9 may be smaller than or equal to approximately 18.3 mm. In some implementations, the diameter D9 of the example power tool 900 may be between approximately 45.9 mm and 56.1 mm. In some examples, the diameter D9 may be smaller than or equal to approximately 51.0 mm. In some implementations, an overall axial length of the example power tool 900 may be between approximately 89.6 mm and 109.0 mm. In some examples, the overall axial length of the example power tool 900 may be smaller than or equal to approximately 99.5 mm. In some implementations, an overall girth of the example power tool 900 may be between approximately 59.4 mm and 72.6 mm. In some examples, the overall girth of the example power tool 900 may be smaller than or equal to approximately 66.0 mm. In some implementations, an axial length from a front end portion of the motor assembly 910 (i.e., frontmost part of the conductive windings 913) to a rear end portion of the carrier 126 i.e., rearmost part of the rear carrier plate 126A) is between approximately 3.2 mm and 5.2 mm. In some examples, the axial length from the front end portion of the motor assembly 910 to the rear end portion of the carrier 126 is smaller than or equal to approximately 4.8 mm, preferably smaller than or equal to approximately 4.4 mm, more preferably smaller than or equal to approximately 4.0 mm. In some implementations, an axial length from a rear end portion of the motor assembly 910 to a front end portion of the tool holder 170 is between approximately 84.9 mm and 103.8 mm. In some examples, the axial length from the rear end portion of the motor assembly 910 to the front end portion of the tool holder 170 is smaller than or equal to approximately 93.4 mm. In some implementations, an inner diameter of the ring gear mount 930 is between approximately 18.9 mm and 23.1 mm. In some examples, the inner diameter of the ring gear mount 930 is smaller than or equal to approximately 21.0 mm. In some implementations, an outer diameter of the ring gear mount 930 is between approximately 46.8 mm and 57.2 mm. In some examples, the outer diameter of the ring gear mount 930 is smaller than or equal to approximately 52.0 mm. In some examples, a maximum operating voltage of the removeable power tool battery pack coupled to the power tool is in the range of approximately 20V to 80V, and a nominal voltage of the battery pack is in the range of 18V to 72V. In some examples, a maximum output power of the motor assembly 910 is between approximately 396.0 W and 484.0 W when using a 20V battery pack, with a current drawn by the motor assembly 910 between approximately 22.0 amps and 27.0 amps. In some examples, the output power of the motor assembly 910 is greater than or equal to approximately 440 W when using a 20V max battery pack, with current drawn by the motor assembly 910 being greater than or equal to approximately 24.5 amps. Thus, in power tool 900, a ratio of the maximum power output of the motor assembly 910 to the axial length from the front end portion of the motor assembly 910 to the rear end portion of the carrier 126 is greater than or equal to approximately 91.8 W/mm, preferably greater than or equal to approximately 96.2 W/mm, more preferably greater than or equal to approximately 101 W/mm. In some implementations, an output torque of the example power tool 900 is between approximately 1642.0 in-lbs and 2007 in-lbs when using a 20V max battery pack. In some examples, the output torque of the example power tool 900 is greater than or equal to approximately 1825 in-lbs when using a 20V max battery pack. In some examples, the output torque of the example power tool 900 is greater than or equal to 2400 in-lbs.

As noted above, in some examples, a power tool, in accordance with implementations described herein, includes an impact mechanism, such as, for example, the impact mechanism 140 described above with respect to the example power tool 100 shown in FIGS. 1A-1E. In some examples, a front end portion of the cam shaft includes a pilot tip that is received in a pilot hole in the anvil, to rotationally support the front end of the cam shaft. This arrangement may guide axial assembly of the front end portion of the cam shaft relative to the anvil but may permit some amount of axial movement of the cam shaft. In this type of arrangement, the cam carrier bearing may constrain some axial movement of the cam carrier.

FIGS. 10A-10J present features of an example power tool 1000, in accordance with implementations described herein. The example power tool 1000 incorporates features into the cam carrier that provide for axial constraint of the cam carrier. The example features may eliminate the need for a cam carrier bearing to provide for axial constraint of the cam carrier. In some examples, the example features may eliminate the need for a front motor bearing to provide for axial constraint.

Figure 10A:
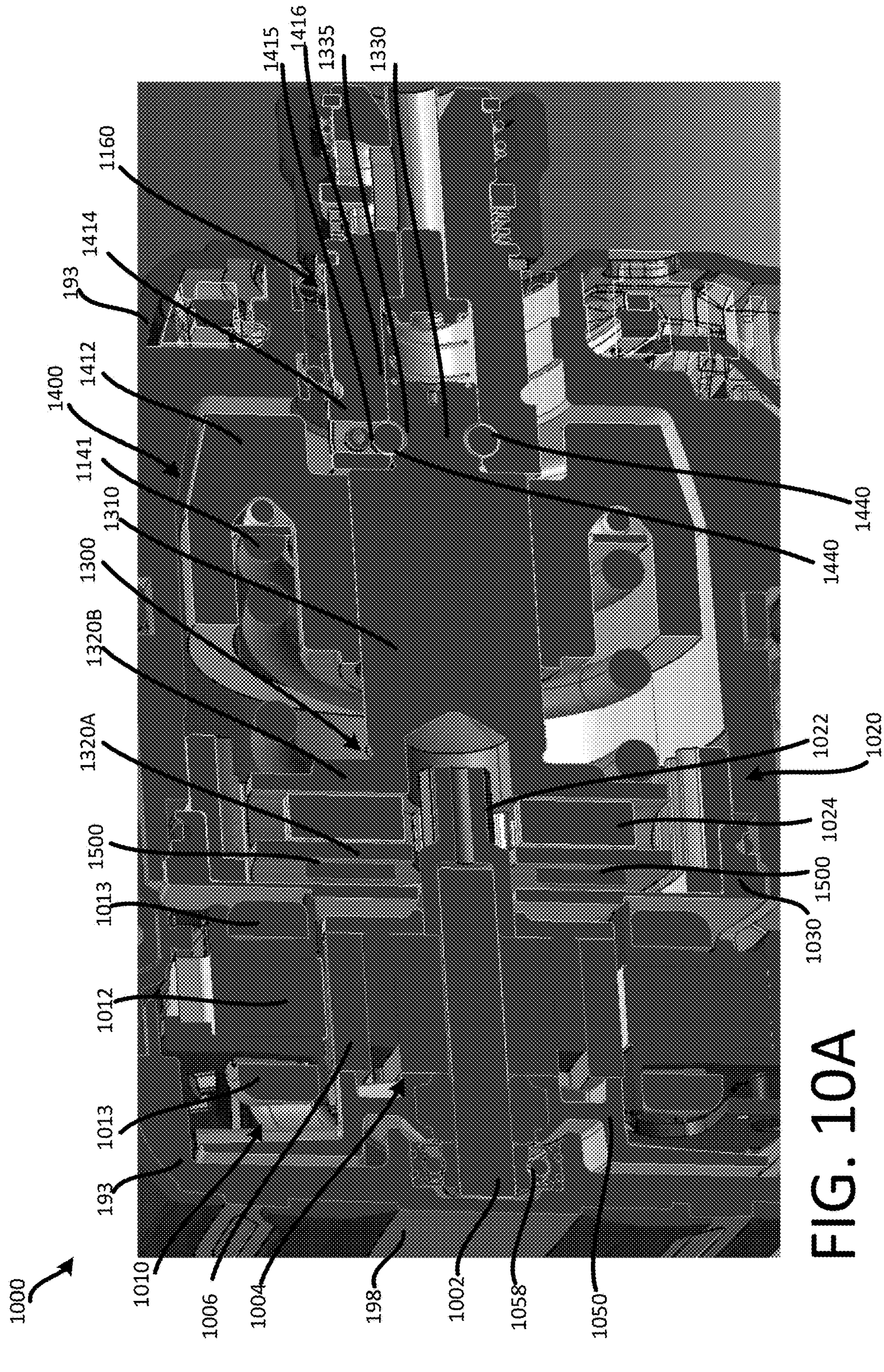
FIG. 10A is a perspective view.
Figure 10B:
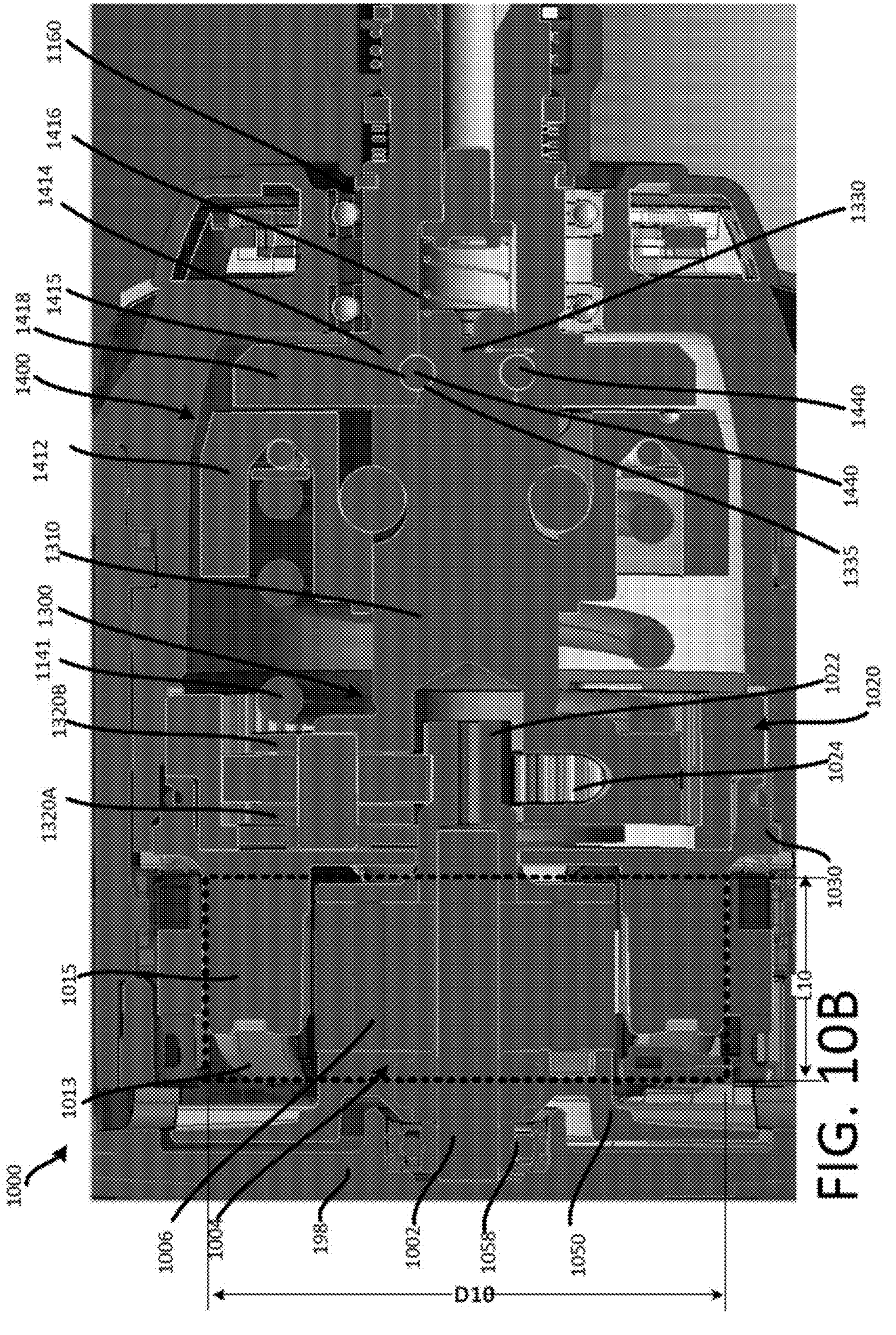
FIG. 10B is a side view, illustrating internal components of the example power tool, in accordance with implementations described herein.
Figure 10C:
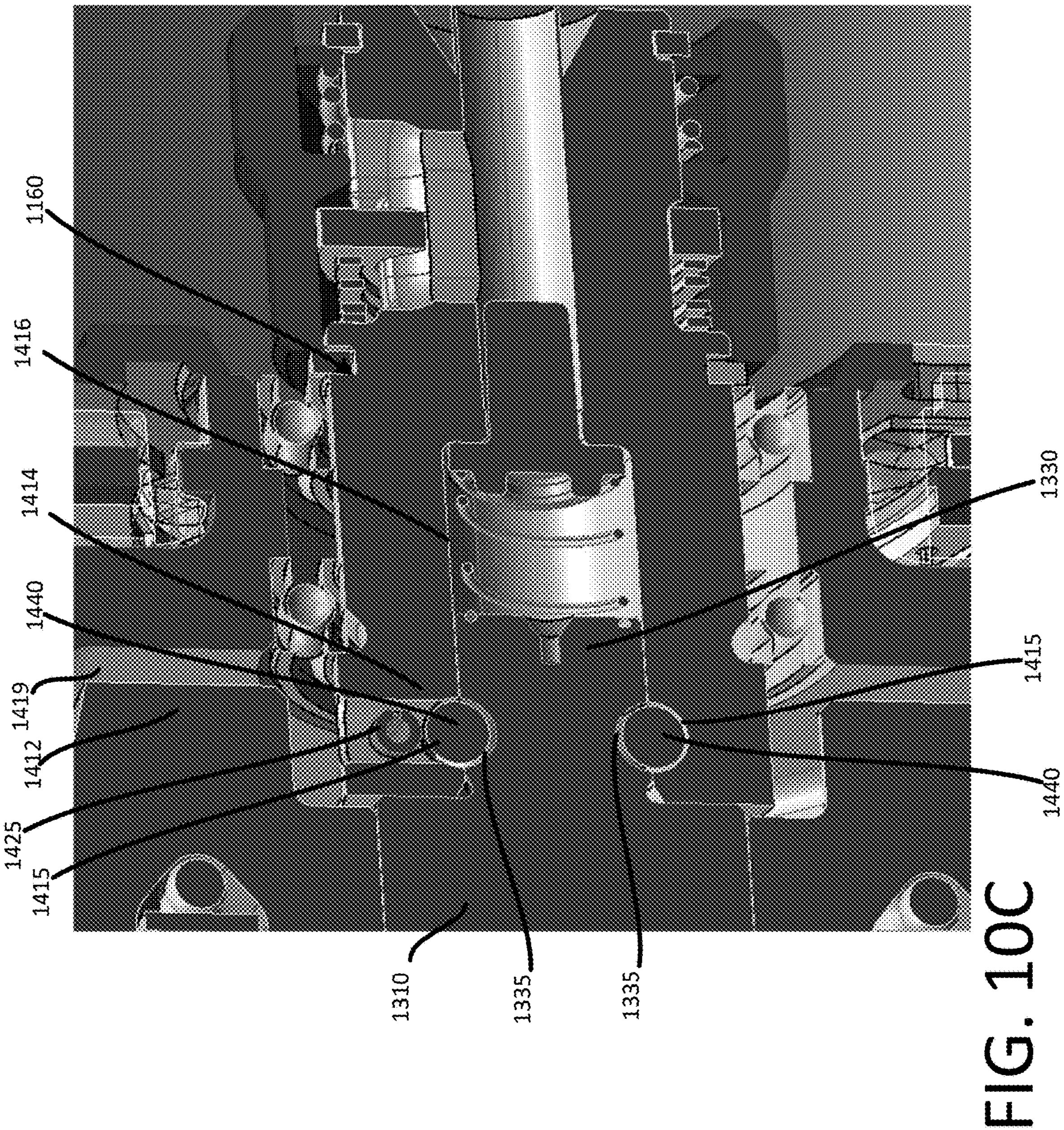
FIGS. 10C and 10D are partial cross-sectional views.
Figure 10D:
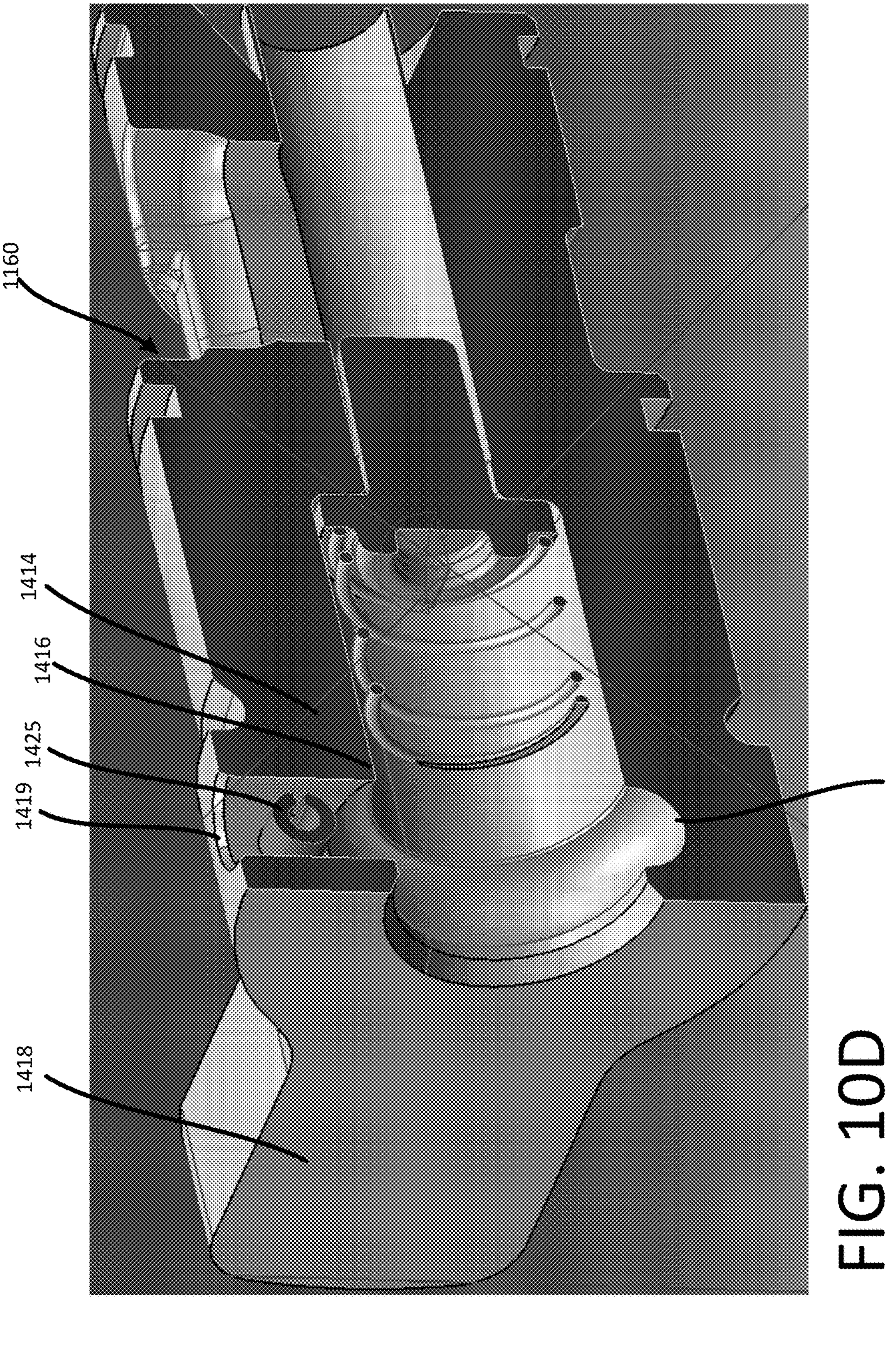
Figure 10E:
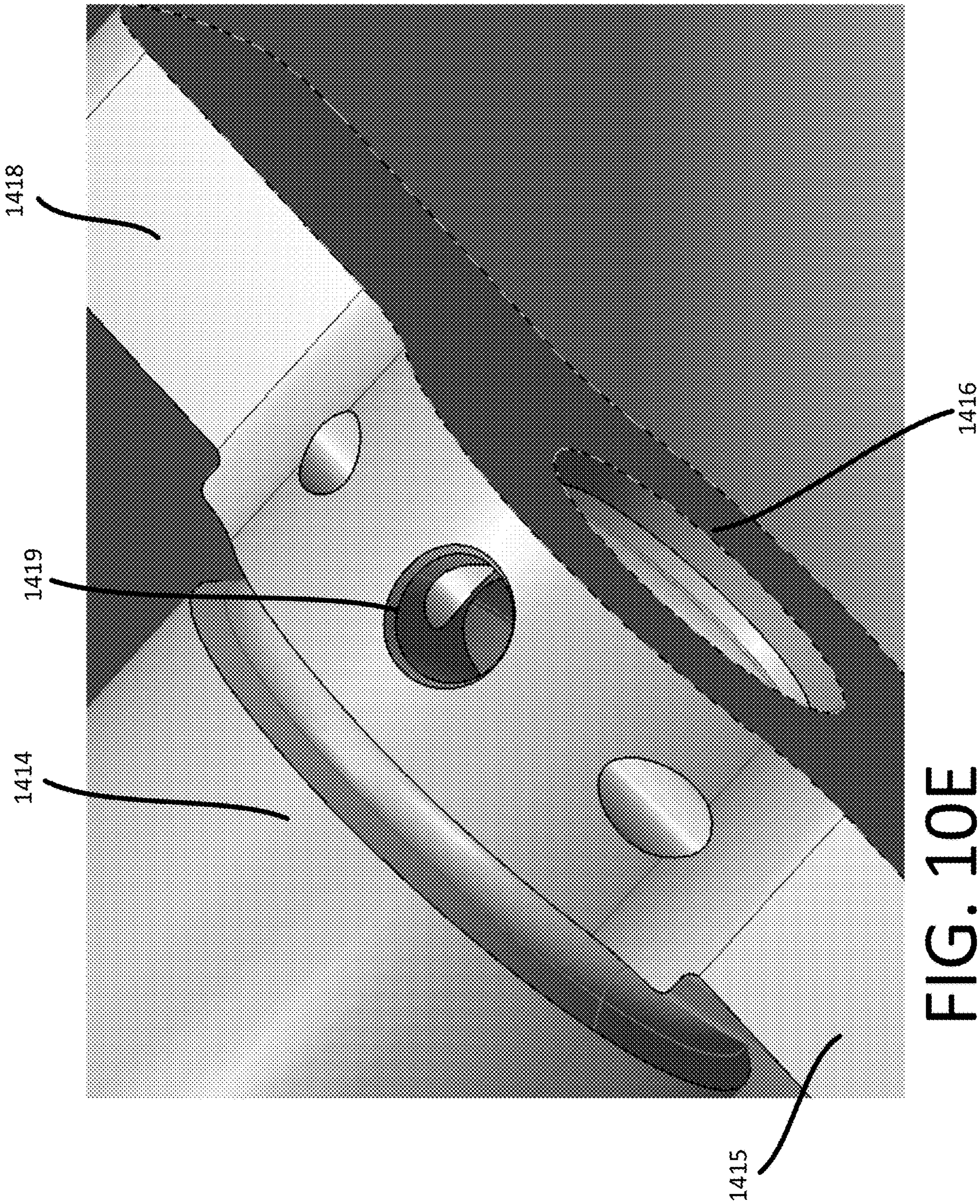
FIGS. 10E-10G are perspective views, of components of an example impact mechanism 1400 of the example power tool shown in FIGS. 10A and 10B.
Figure 10F:
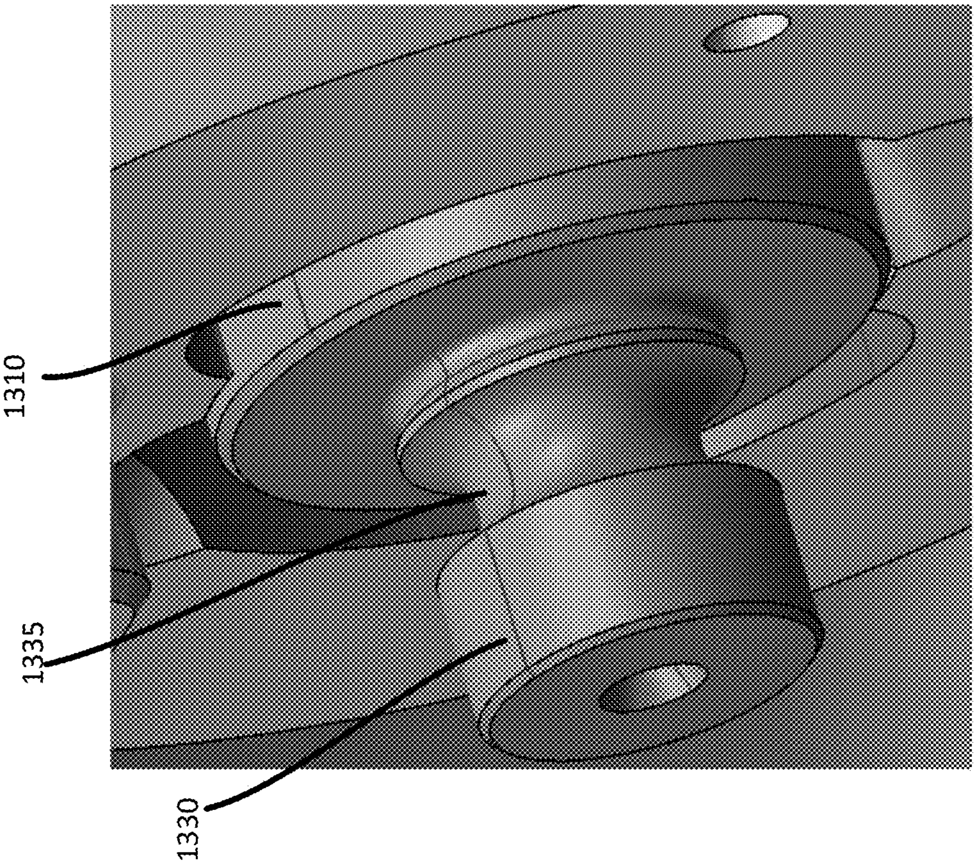
Figure 10G:
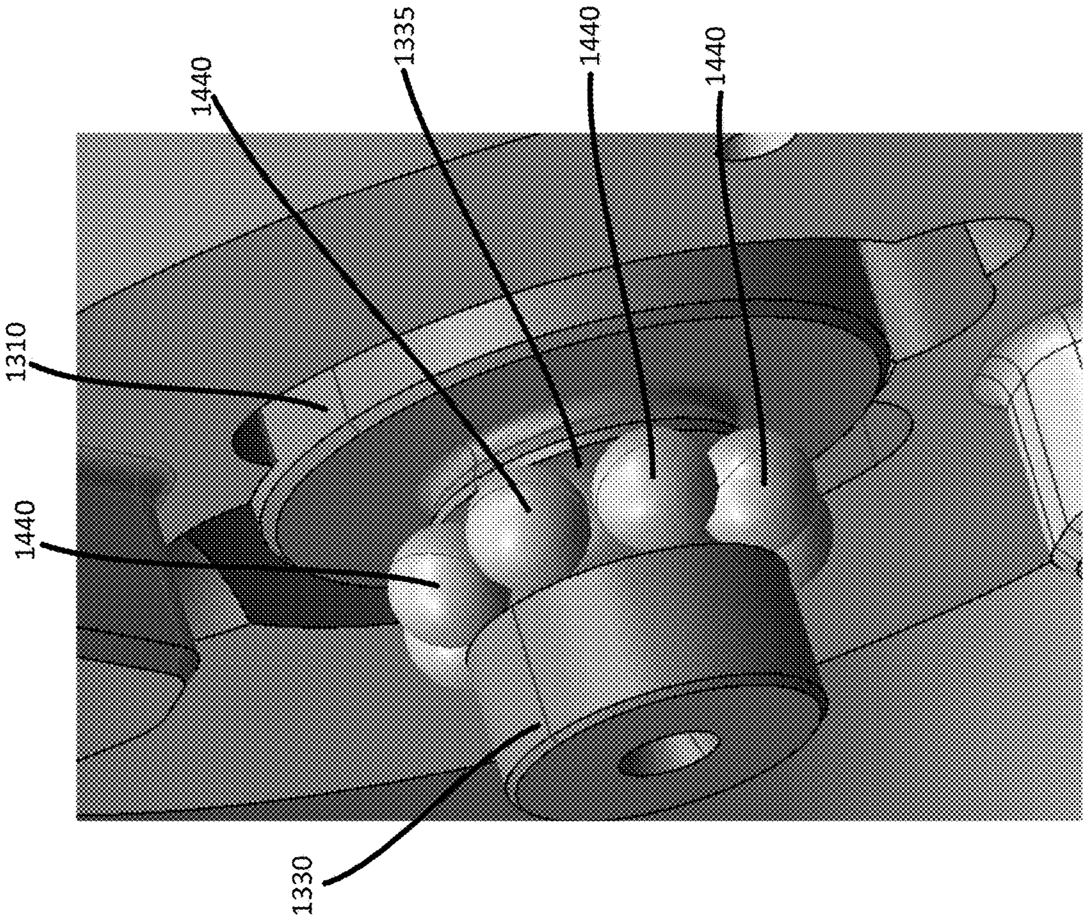
Figure 10H:
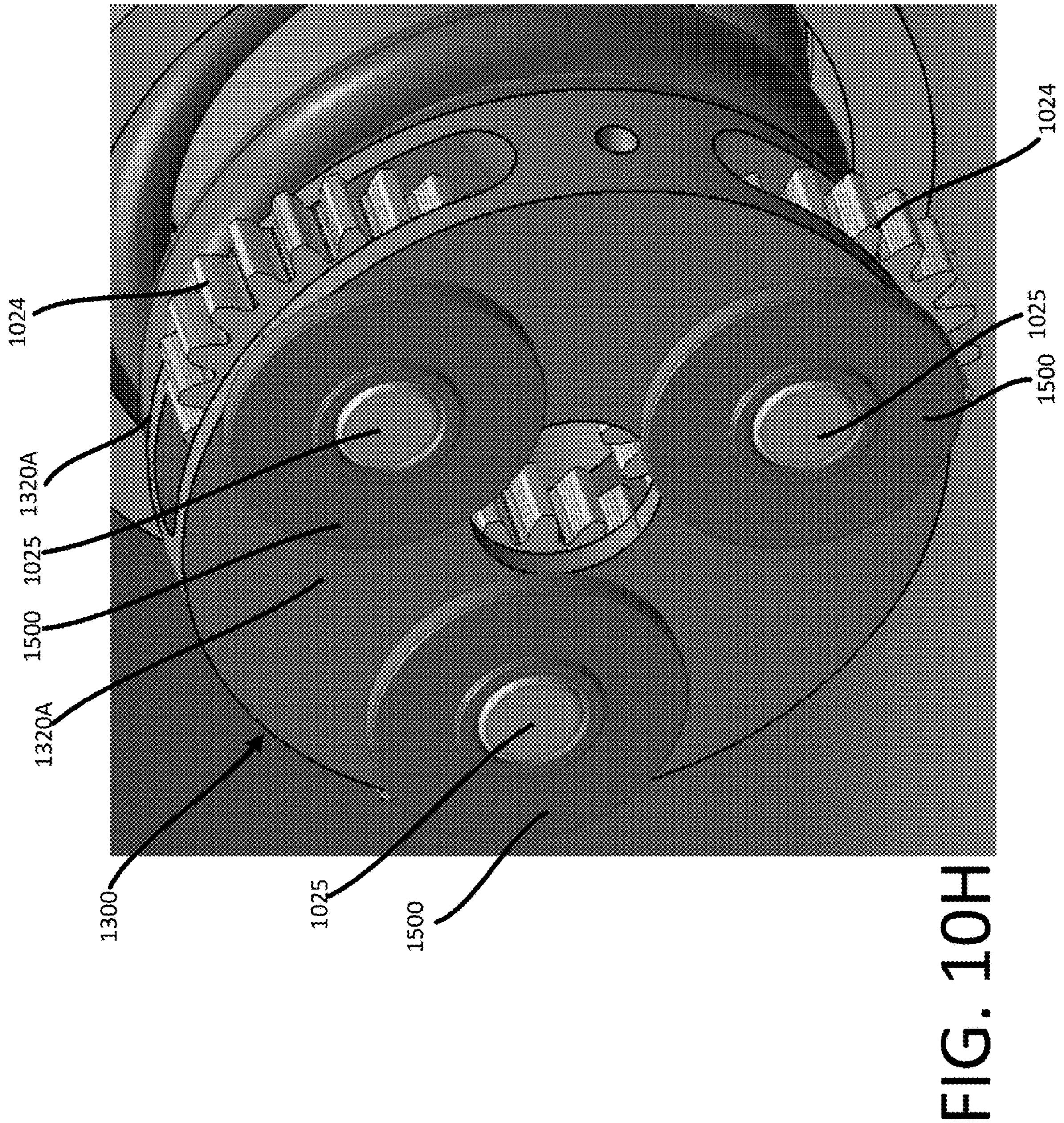
FIGS. 10H-10J are perspective views of an example cam carrier of the example power tool shown in FIGS. 10A and 10B.
Figure 10I:
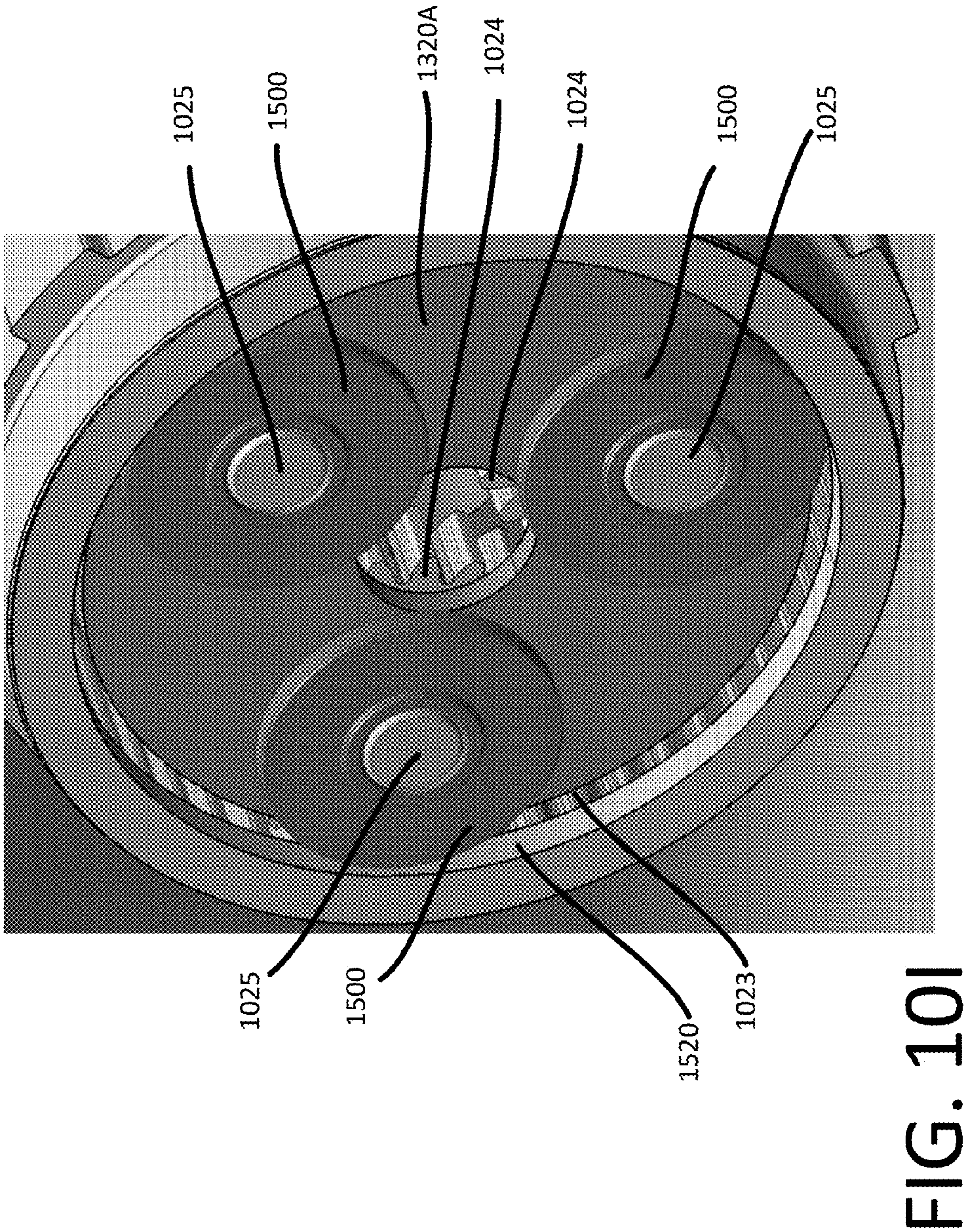
Figure 10J:
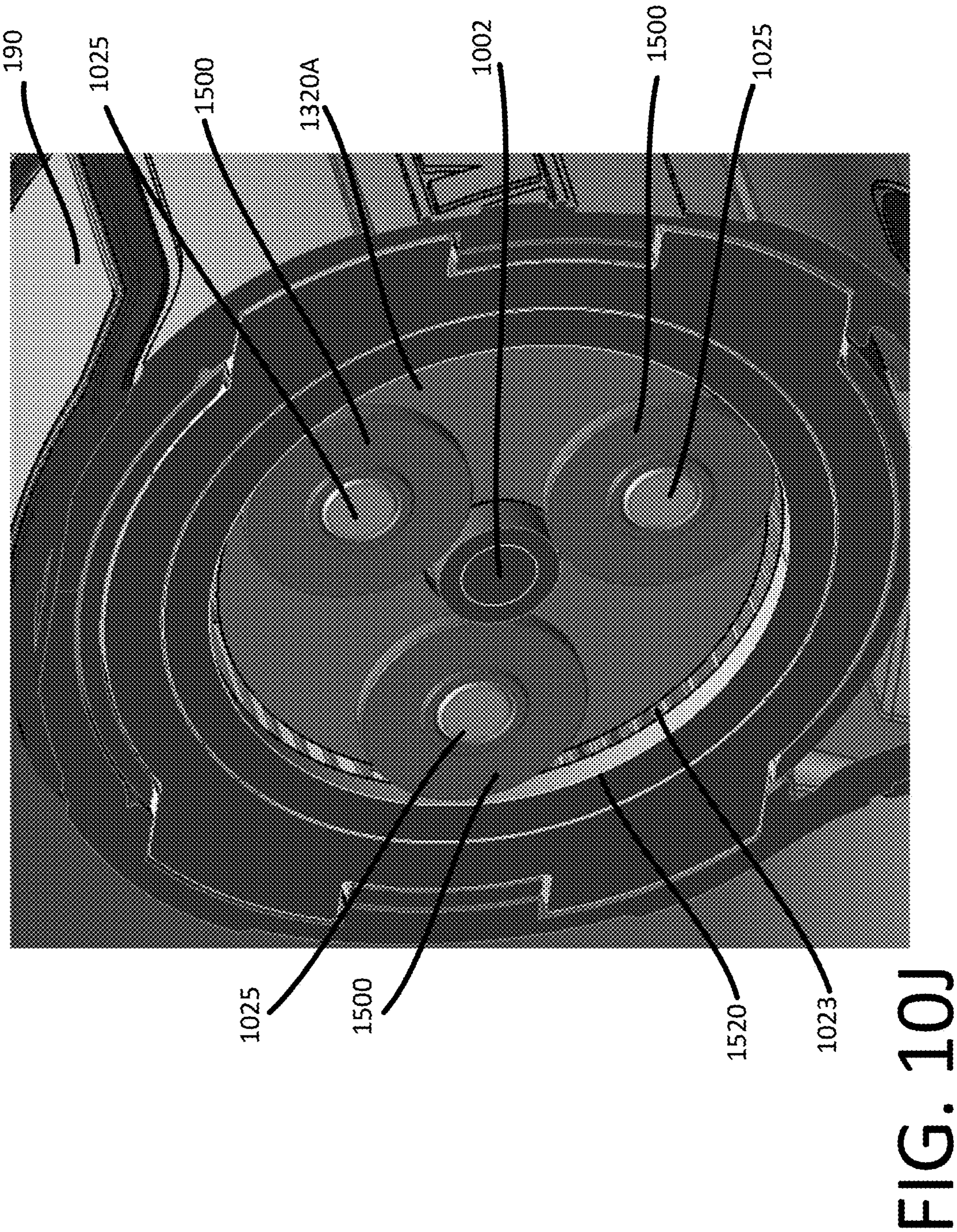

FIG. 10A is a perspective cross-section view, and FIG. 10B is a side cross-section view, illustrating internal components of the example power tool 1000. FIGS. 10C and 10D are partial cross-sectional views, and FIGS. 10E-10G are perspective views, of components of an example impact mechanism 1400 of the example power tool 1000. FIGS. 10H-10J are perspective views of an example cam carrier 1300 of the example power tool 1000.

The example power tool 1000 includes a motor assembly 1010 including a rotor 1004, including magnets 1006, mounted on a rotor shaft 1002, and a stator core 1012 with a series of conductive windings 1013, and may be similar to one or more of the motors assemblies described above. A ring gear mount 1030 is coupled to a corresponding portion of the tool housing 190, for receiving and supporting a component of the transmission assembly 1020. As best shown in FIG. 10B, the ring gear mount 1030 includes a plurality of rearward projections that extend into slots formed between the respective stator teeth of the stator core 1012 to secure the ring gear mount 1030 to at least partially restraint the movement of the stator core 1012 relative to the ring gear mount 1030. It is noted that FIG. 10A depicts a cross-sectional view of the power tool along a plane that intersects the stator teeth, and FIG. 10B depicts a cross0sectional view along a plane that intersects the rearward projections. A rear motor bearing 1058 is mounted at a rear end portion of the rotor shaft 1002, within a corresponding recess formed in the rear tool cap 198. A fan 1050 is coupled so as to rotate together with the rotor 1004, to direct cooling air axially during operation of the power tool 1000. A transmission assembly 1020 is coupled between the rotor 1004 and a cam carrier 1300, to transmit torque from the motor assembly 1010 to the cam carrier 1300. The transmission assembly 1020 includes a pinion coupled on the rotor shaft 1002, having a sun gear 1022 formed on an end portion thereof, and one or more planet gears 1024 in meshed engagement with the sun gear 1022. The one or more planet gears 1024 are mounted in the cam carrier 1300 on pins 1025 that allow for rotation of the planet gears 1024 in response to rotation of the sun gear 1022. This transmission arrangement may be similar to one or more of the transmission arrangements described above.

In this example arrangement, the cam carrier 1300 includes a first, or rear carrier plate 1320A and a second, or front carrier plate 1320B, that support the one or more planet gears 1024, and may be similar to one or more of the cam carriers described above. In other implementations the cam carrier may include only a single carrier plate that supports the pins that support the planet gears. In response to the application of power to the motor assembly 1010, the rotor shaft 1002 and the sun gear 1022 rotate, causing the planet gears 1024 to orbit the sun gear 1022, and the cam carrier 1300 to rotate at a reduced speed relative to the rotational speed of the rotor shaft 1002.

The example power tool 1000 includes an impact mechanism 1400 including the cam shaft 1310, with a generally cylindrical hammer 1412 received over the cam shaft 1310. In some examples, the hammer 1412 may selectively engage an output spindle 1160 of the power tool 1000, based on a position of the hammer 1412 on the cam shaft 1310. The hammer 1412 may be movably coupled on the cam shaft 1310, and may include lugs 1418 configured to engage corresponding projections extending radially from an anvil 1414 fixedly coupled on an output spindle 1160. A compression spring 1141 is received in a cylindrical recess in the hammer 1412, abutting a forward face of the front carrier plate 1320B. The spring 1141 biases the hammer 1412 toward the anvil 1414 so that the lugs engage the corresponding projections formed on the anvil 1414. The impact mechanism may be similar to one or more of the impact mechanisms described above.

In this example arrangement, an external annular groove 1335 is formed in a pilot tip 1330 of the cam shaft 1310. A corresponding interior annular groove 1415 is formed in a pilot hole 1416 of the anvil 1414. A plurality of ball bearings 1440 are received in an annular channel defined by the external annular groove 1335 and the interior annular groove 1415. The plurality of ball bearings may provide for both rotational support and axial support of the cam carrier 1300. In some examples, the anvil 1414 may include a radial opening 1419 to facilitate insertion of the ball bearings 1440 into the annular channel defined by the annular grooves 1415, 1335 during assembly. In some examples, the radial opening 1419 may be closed (for example, after insertion of the plurality of ball bearings 1440) by a closing device 1425 such as, for example, lock spring, a set screw, a plug, or other such closing device.

In this example arrangement, the support provided by the plurality of ball bearings 1440 received in the annular channel defined by the annular grooves 1415, 1335 at the front end portion of the cam shaft 1310 allows for elimination of a cam carrier bearing and/or a front motor bearing that would otherwise be used to support a rear portion of the cam carrier 1300 and/or a front end portion of the rotor shaft 1002. This arrangement reduces the overall length and/or girth of the power tool.

As shown in FIGS. 10H-10J, in some examples, such a cam carrier bearing and/or a front motor bearing may be replaced with rolling disks 1500 supported on a rear side of the rear carrier plate 1320A. In particular, the rolling disks 1500 may be supported on the rear carrier plate 1320A by the same pins 1025 on which the planet gears 1024 are mounted. In response to rotation of the rotor shaft 1002, the rolling disks 1500 may roll against the rotor shaft 1002 and/or a pinion that is press fit onto the rotor shaft 1002. In response to rotation of the rotor shaft 1002, the rolling disks may roll against an interior facing rim portion 1520 of a ring gear 1023 of the transmission assembly 1020. The rolling action of the rolling disks 1500 may provide radial support for the rotor shaft 1002 and the cam carrier 1300. In some examples, the rolling disks 1500 may roll against an inside rim of the ring gear mount 1030 to which the ring gear 1023 is fixed. The rolling disks may have a thickness or axial length that is substantially less than a thickness or axial length of a cam carrier bearing. In some implementations, the rolling disks may have a thickness of between approximately 1.8 mm and 2.2 mm. In some examples, the rolling disks 1500 may have a thickness of approximately 2.0 mm. In some implementations, the rolling disks 1500 may have a diameter of between approximately 11.7 mm and 14.3 mm. In some examples, the rolling disks 1500 may have a diameter of approximately 13.0 mm. This arrangement may reduce an overall length and/or an overall girth of the example power tool 1000.

In some implementations, a length L10 of a motor envelope associated with the motor assembly 1010 of the example power tool 1000 may be between approximately 19.1 mm and 23.3 mm. In some examples, the length L10 may be less than or equal to approximately 21.2 mm. In some implementations, a diameter D10 of the motor envelope associated with the motor assembly 1010 of the example power tool 1000 may be between approximately 45.9 mm and 56.1 mm. In some examples, the diameter D10 may be less than or equal to approximately 51.0 mm. In some implementations, an overall axial length of the example power tool 1000 may be between approximately 88.7 mm and 108.4 mm. In some examples, the overall axial length of the example power tool 1000 may be less than or equal to approximately 98.5 mm. In some implementations, an overall girth of the example power tool 1000 may be between approximately 59.4 mm and 72.6 mm. In some examples, the overall girth of the example power tool 1000 may be less than or equal to approximately 66.0 mm. In some implementations, an axial length from a front end portion of the motor assembly 1010 (i.e., frontmost part of the conductive windings 1013) to a rear end portion of the cam carrier 1300 (i.e., rearmost part of the rear carrier plate 1320A) is between approximately 3.0 mm and 5.0 mm. In some examples, the axial length from the front end portion of the motor assembly 1010 to the rear end portion of the cam carrier 1300 is smaller than or equal to approximately 4.5 mm, preferably smaller than or equal to approximately 4.1 mm, more preferably smaller than or equal to approximately 3.7 mm. In some implementations, an axial length from a rear end portion of the motor assembly 1010 to a front end portion of the tool holder 170 is between approximately 84.9 mm and 103.8 mm. In some examples, the axial length from the rear end portion of the motor assembly 1010 to the front end portion of the tool holder 170 is less than or equal to approximately 94.3 mm. In some implementations, an inner diameter of the ring gear mount 1030 is between approximately 12.6 mm and 15.4 mm. In some examples, the inner diameter of the ring gear mount 1030 is less than or equal to approximately 14.0 mm. In some implementations, an outer diameter of the ring gear mount 1030 is between approximately 46.4 mm and 56.7 mm. In some examples, the outer diameter of the ring gear mount 1030 is less than or equal to approximately 51.5 mm. In some examples, a maximum operating voltage of the removeable power tool battery pack coupled to the power tool is in the range of approximately 20V to 80V, and a nominal voltage of the battery pack is in the range of 18V to 72V. In some examples, a maximum output power of the motor assembly 1010 is between approximately 606.0 W and 737.0 W when using a 20V battery pack, with a current drawn by the motor assembly 1010 between approximately 31.3 amps and 38.3 amps. In some examples, the output power of the motor assembly 1010 is greater than or equal to approximately 670 W when using a 20V max battery pack, with current drawn by the motor assembly 1010 being greater than or equal to approximately 34.8 amps. Thus, in power tool 1000, a ratio of the maximum power output of the motor assembly 1010 to the axial length from the front end portion of the motor assembly 1010 to the rear end portion of the cam carrier 1300 is greater than or equal to approximately 163 W/mm, preferably greater than or equal to approximately 171 W/mm, more preferably greater than or equal to approximately 180 W/mm. In some implementations, an output torque of the example power tool 1000 is between approximately 2498 in-lbs and 3053 in-lbs when using a 20V max battery pack. In some examples, the output torque of the example power tool 1000 is greater than or equal to approximately 2775 in-lbs when using a 20V max battery pack. In some examples, the output torque of the example power tool 1000 is greater than or equal to 3650 in-lbs.

A number of embodiments have been described. Nevertheless, it will be understood that various modifications may be made without departing from the spirit and scope of the specification.

In addition, any logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A power tool, comprising:

a housing having a rear end portion and a front end portion opposite the rear end portion, the front end portion corresponding to a working end of the power tool;

a motor assembly received in the housing, the motor assembly including:

a rotor configured to rotate about a central axis of the power tool; and a stator assembly that includes stator windings and is operably coupled to the rotor;

a rotor shaft extending along the central axis, the rotor shaft being coupled to the rotor so as to be driven by the rotor;

a transmission assembly coupled to the rotor shaft and configured to transmit a torque generated by the motor assembly to an output spindle;

a first bearing configured to support the rotor shaft; and a second bearing configured to support a component of the transmission assembly, wherein:

at least a portion of the second bearing overlaps at least a portion of the first bearing; and at least a portion of at least one of the first bearing or the second bearing axially overlaps at least a portion of the stator windings;

wherein the first bearing is mounted on the rotor shaft, positioned axially between the motor assembly and a cam carrier of the transmission assembly, such that an axial position of the first bearing is constrained by the cam carrier.

2. The power tool of claim 1, wherein the first bearing and the second bearing are at least partially received within a motor envelope defined by a first plane corresponding to a rearmost portion of the stator assembly and a second plane corresponding to a frontmost portion of the stator assembly.

3. The power tool of claim 1, wherein the first bearing includes:

an inner race positioned on the rotor shaft such that the inner race of the first bearing rotates together with the rotor shaft at a first speed; and an outer race supported on a first side surface of a cam carrier plate of the transmission assembly such that the outer race of the first bearing rotates together with the cam carrier plate at a second speed that is less than the first speed; and the second bearing includes:

an inner race positioned on a second side surface of the cam carrier plate, opposite the first side surface thereof, such that the inner race of the second bearing rotates together with cam carrier plate at the second speed; and an outer race supported on a radial projection of a ring gear mount coupled to the housing, such that the outer race of the second bearing is substantially stationary.

4. The power tool of claim 1, further comprising:

a third bearing coupled to an end portion of the rotor shaft, opposite an end portion of the rotor shaft to which the first bearing is coupled, and configured to support the rotor shaft, wherein the third bearing is received in a bearing pocket defined in a corresponding portion of the housing; and a fan coupled to the rotor shaft, positioned axially between the third bearing and the motor assembly.

5. The power tool of claim 4, wherein a central hub portion of the fan is radially aligned with stator end windings of the stator assembly.

6. The power tool of claim 1, further comprising a pinion having a proximal end portion coupled to the rotor shaft, and a distal end portion positioned in a bearing pocket defined in a cam shaft of a cam carrier of the transmission assembly.

7. The power tool of claim 1, wherein the second bearing is positioned axially rearward of a gear assembly of the transmission assembly.

8. The power tool of claim 1, further comprising magnets received in magnet pockets defined in the rotor.

9. A power tool, comprising:

a housing having a rear end portion and a front end portion opposite the rear end portion, the front end portion corresponding to a working end of the power tool;

a motor assembly received in the housing, the motor assembly including:

a rotor that rotates about a central axis of the power tool; and a stator assembly that includes stator windings and is operably coupled to the rotor;

a rotor shaft coupled to the rotor and extending along the central axis and rotatably driven by the rotor;

a transmission assembly coupled to the rotor shaft that transmits a torque generated by the motor assembly to an output spindle, the transmission assembly including a plate that includes an annular projection;

a first bearing that supports the rotor shaft; and a second bearing, at least a portion of the second bearing radially aligned with at least a portion of the first bearing;

wherein the first bearing and the second bearing are on opposing sides of the annular projection and rotationally support the plate and a radial plane intersects the stator windings and the annular projection;

wherein a rear end of the first bearing is radially aligned with a rear end of the second bearing.

10. The power tool of claim 9, wherein the first bearing and the second bearing are at least partially received within a motor envelope defined by a first plane corresponding to a rearmost portion of the stator assembly and a second plane corresponding to a frontmost portion of the stator assembly.

11. The power tool of claim 9, wherein the first bearing includes:

an inner race positioned on the rotor shaft such that the inner race of the first bearing rotates together with the rotor shaft at a first speed; and an outer race supported on a first side surface of the annular projection such that the outer race of the first bearing rotates together with the plate at a second speed that is less than the first speed; and the second bearing includes:

an inner race positioned on a second side surface of the annular projection, opposite the first side surface thereof, such that the inner race of the second bearing rotates together with the plate at the second speed; and an outer race supported on a radial projection of a ring gear mount coupled to the housing, such that the outer race of the second bearing is substantially stationary.

12. The power tool of claim 9, further comprising:

a third bearing coupled to an end portion of the rotor shaft, opposite an end portion of the rotor shaft to which the first bearing is coupled, and configured to support the rotor shaft, wherein the third bearing is received in a bearing pocket defined in a corresponding portion of the housing; and a fan coupled to the rotor shaft, positioned axially between the third bearing and the motor assembly.

13. The power tool of claim 12, wherein a central hub portion of the fan is radially aligned with stator end windings of the stator assembly.

14. The power tool of claim 9, wherein the first bearing is mounted on the rotor shaft, positioned axially between the motor assembly and the plate, such that an axial position of the first bearing is constrained by the plate.

15. The power tool of claim 9, further comprising a pinion having a proximal end portion coupled to the rotor shaft, and a distal end portion positioned in a bearing pocket defined in a cam shaft of a cam carrier of the transmission assembly.

16. The power tool of claim 9, wherein the second bearing is positioned axially rearward of a gear assembly of the transmission assembly.

17. The power tool of claim 9, wherein the annular projection extends from a first side of the plate, the transmission assembly including a pin that extends from a second side of the plate opposite the first side, and a planet gear mounted on the pin.

18. The power tool of claim 17, wherein:

the transmission assembly includes a ring gear mount and a ring gear mounted thereto;

the second bearing is located between the annular projection and a radial projection of the ring gear mount; and the planet gear is in meshed engagement with the ring gear.

* * * * *